United States Patent
Xu et al.

(10) Patent No.: US 11,723,069 B2
(45) Date of Patent: *Aug. 8, 2023

(54) TRANSMITTING DATA ON A SUB-BAND BASED ON A FIRST AND A SECOND LBT OF SUB-BANDS

(71) Applicant: BEIJING XIAOMI MOBILE SOFTWARE CO., LTD., Beijing (CN)

(72) Inventors: Kai Xu, Herndon, VA (US); Esmael Hejazi Dinan, McLean, VA (US); Alireza Babaei, Fairfax, VA (US); Hua Zhou, Herndon, VA (US); Hyoungsuk Jeon, Centreville, VA (US); Ali Cagatay Cirik, Herndon, VA (US); Kyungmin Park, Vienna, VA (US)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 115 days.

This patent is subject to a terminal disclaimer.

(21) Appl. No.: 17/227,737

(22) Filed: Apr. 12, 2021

(65) Prior Publication Data

US 2021/0235495 A1 Jul. 29, 2021

Related U.S. Application Data

(63) Continuation of application No. 16/871,621, filed on May 11, 2020, now Pat. No. 10,980,058, which is a
(Continued)

(51) Int. Cl.
*H04W 74/08* (2009.01)
*H04L 5/00* (2006.01)
(Continued)

(52) U.S. Cl.
CPC ....... *H04W 74/0808* (2013.01); *H04L 5/0092* (2013.01); *H04W 72/0453* (2013.01); *H04W 72/1268* (2013.01); *H04W 72/23* (2023.01)

(58) Field of Classification Search
CPC ......... H04W 74/0808; H04W 72/1268; H04W 72/0453; H04W 72/042; H04W 72/14; H04L 5/0092
See application file for complete search history.

(56) References Cited

U.S. PATENT DOCUMENTS 9,392,614 B2 7/2016 Bhorkar et al.
2017/0013479 A1 1/2017 Sun et al.
(Continued)

FOREIGN PATENT DOCUMENTS

CN 106453182 B 2/2017
CN 106664729 A 5/2017
(Continued)

OTHER PUBLICATIONS

3GPP TSG RAN WG1 Meeting Ad-hoc; R1-151104 Paris, France, Mar. 24-26, 2015; Source: Intel Corporation Title: LBT design for LAA downlink; Agenda Item: 2.2; Document for: Discussion and Decision.
(Continued)

*Primary Examiner* — Dady Chery
(74) *Attorney, Agent, or Firm* — Arch & Lake LLP

(57) ABSTRACT

A wireless device receives a grant scheduling a transmission on sub-bands of a physical uplink shared channel of a cell. The sub-bands comprise a first sub-band and one or more other sub-bands. The wireless device performs, in response to the grant: a first type listen-before-talk (LBT) on the first sub-band; and a second type LBT on each of the one or more other sub-bands. Data is transmitted on a sub-band of the sub-bands, based on a determination that: the first type LBT indicates that the first sub-band is clear; and the second type LBT indicates that each of the one or more other sub-bands are clear.

19 Claims, 27 Drawing Sheets

Related U.S. Application Data continuation of application No. PCT/US2019/045238, filed on Aug. 6, 2019.

(60) Provisional application No. 62/716,800, filed on Aug. 9, 2018.

(51) Int. Cl.
*H04W 72/0453* (2023.01)
*H04W 72/1268* (2023.01)
*H04W 72/23* (2023.01)

(56) References Cited

U.S. PATENT DOCUMENTS

| | | | |
|---|---|---|---|
| 2017/0094683 | A1 | 3/2017 | Sun et al. |
| 2017/0222749 | A1 | 8/2017 | Dinan |
| 2017/0230944 | A1 | 8/2017 | Babaei et al. |
| 2017/0230945 | A1 | 8/2017 | Babaei et al. |
| 2019/0141734 | A1* | 5/2019 | Lei .................. H04L 5/0098 |

FOREIGN PATENT DOCUMENTS

| | | | |
|---|---|---|---|
| CN | 107079494 | A | 8/2017 |
| CN | 107113886 | A | 8/2017 |
| CN | 107439048 | A | 12/2017 |
| CN | 108141338 | A | 6/2018 |
| EP | 3352522 | A1 | 7/2018 |
| KR | 20180061303 | A | 6/2018 |
| WO | 2017047973 | A1 | 3/2017 |
| WO | 2017058466 | A1 | 4/2017 |
| WO | 2017214621 | A1 | 12/2017 |
| WO | 2018038777 | A1 | 3/2018 |
| WO | 2018085150 | A1 | 5/2018 |

OTHER PUBLICATIONS

3GPP TSG RAN WG1 Meeting #84; R1-160297 St. Julian's, Malta, Feb. 15-19, 2016; Source: Huawei, HiSilicon; Title: Analysis on LBT with category 2 and 4 for eLAA; Agenda Item: 7.3.1.5; Document for: Discussion and Decision.
3GPP TSG RAN WG4 Meeting #77; R4-157765 Anaheim, US, Nov. 16-20, 2015; Source: Nokia Networks Title: LBT requirements for LAA; Agenda Item: 7.13.6; Document for: Approval.
Chinese Office Action, dated Sep. 22, 2021, in Chinese Patent Application No. 2019800429200.
3GPP TS 38.211 V15.2.0 (Jun. 2018); Technical Specification; 3rd Generation Partnership Project; Technical Specification Group Radio Access Network; NR; Physical channels and modulation; (Release 15).
3GPP TS 38.212 V15.2.0 (Jun. 2018); Technical Specification; 3rd Generation Partnership Project; Technical Specification Group Radio Access Network; NR; Multiplexing and channel coding; (Release 15).
3GPP TS 38.213 V15.2.0 (Jun. 2018); Technical Specification; 3rd Generation Partnership Project; Technical Specification Group Radio Access Network; NR; Physical layer procedures for control (Release 15).
3GPP TS 38.214 V15.2.0 (Jun. 2018); Technical Specification; 3rd Generation Partnership Project; Technical Specification Group Radio Access Network; NR; Physical layer procedures for data (Release 15).
3GPP TS 38.321 V15.2.0 (Jun. 2018); Technical Specification; 3rd Generation Partnership Project; Technical Specification Group Radio Access Network; NR; Medium Access Control (MAC) protocol specification; (Release 15).
3GPP TS 38.331 V15.2.1 (Jun. 2018); Technical Specification; 3rd Generation Partnership Project; Technical Specification Group Radio Access Network; NR; Radio Resource Control (RRC) protocol specification; (Release 15).

R1-180xxxx; 3GPP TSG RAN WG1 Meeting #94; Gothenburg, Sweden, Aug. 20-24, 2018; Source: MCC Support; Title: Draft Report of 3GPP TSG RAN WG1 #93 v0.2.0 (Busan, South Korea, May 21-25, 2018).
R1-1805919; 3GPP TSG RAN WG1 Meeting #93; Busan, Korea, May 21-May 25, 2018; Agenda Item:7.6.4.1; Source:Huawei, HiSilicon; Title:Coexistence and channel access for NR unlicensed band operations.
R1-1806250; 3GPP TSG-RAN WG1 Meeting #93Tdoc; Busan, Korea, May 21-25, 2018; Agenda Item:7.6.2; Source: Ericsson; Title:Frame structure for NR-U; Document for: Discussion, Decision.
R1-1806569; 3GPP TSG RAN WG1 Meeting #93; Busan, Korea, May 21-25, 2018; Agenda Item:7.6.4.1; Source: Sony; Title:Considerations on channel access for NR unlicensed operations.
R1-1806645; 3GPP TSG RAN WG1 Meeting #93; Busan, Korea, May 21-25, 2018; Agenda Item:7.6.4.1; Source: LG Electronics; Title: Channel access procedure for NR unlicensed operation.
R1-1806670; 3GPP TSG RAN WG1 Meeting #93; Busan, Korea, May 21-25, 2018; Agenda item:7.6.4.1; Source: NEC; Title:Discussion on subband based channel access procedures for NR-U.
R1-1806758; 3GPP TSG RAN WG1 Meeting #93; Busan, Korea, May 21-25, 2018; Agenda item:7.6.2; Source: Samsung; Title:Frame structure for NR-U; Document for:Discussion and Decision.
R1-1806761; 3GPP TSG-RAN WG1 Meeting #93; Busan, Korea, May 21-25, 2018; Agenda item:7.6.4.1; Source: Samsung ; Title: Channel access procedures for NR-U; Document for:Discussion and Decision.
R1-1806797; 3GPP TSG RAN WG1 Meeting #93; Busan, Korea, May 21 - 25, 2018; Agenda item:7.6.4.1; Source: MediaTek Inc.; Title: Channel access to NR-based unlicensed spectrum.
R1-1806852; 3GPP TSG RAN WG1 Meeting #93; Busan, Korea, May 21-25, 2018; Source:OPPO; Title:Channel access mechanisms on NR-U; Agenda Item:7.6.4.1.
R1-1807003; 3GPP TSG RAN WG1 Meeting #93; Busan, Korea, May 21-25, 2018; Agenda Item:7.6.4.1; Source: Apple Inc.; Title:NR Unlicensed Channel Access Procedure Considerations.
R1-1807036; 3GPP TSG RAN WG1 Meeting #93; Busan, Korea, May 21-25, 2018; Agenda Item:7.6.4.1; Source: InterDigital Inc.; Title:On NR-Unlicensed Channel Access Procedures.
R1-1807083; 3GPP TSG RAN WG1 Meeting #93;Busan, Korea, May 21-25, 2018; Source:NTT Docomo, Inc.; Title:Channel access procedures for NR-U operation; Agenda Item: 7.6.4.1; Document for:Discussion and Decision.
R1-1807205; 3GPP TSG RAN WG1 Meeting #93; Busan, Korea, May 21-25, 2018; Source: CATR; Title: Considerations on LBT in NR-U; Agenda Item: 7.6.4.1; Document for: Discussion / Decision.
R1-1807230; 3GPP TSG-RAN WG1 Meeting #93; Busan, Korea, May 21-25, 2018; Agenda item:7.6.4.1 Channel Access Procedures; Title:Discussion on Procedures for LBT in NR-U; Source:Convida Wireless; Document for: Discussion.
R1-1807240; 3GPP TSG-RAN WG1 Meeting #93; Busan, Korea, May 21-25, 2018; Agenda item:7.6.4.1—Channel Access Procedures; Title:Discussion on Channel Access Indication in NR-U; Source:Convida Wireless.
Reference [1]-just mentioned sub-band LBT for D2D but no different LBT types-from NTTDocomo, https://patents.google.com/patent/WO2017026463A1/en?oq=LBT+type+and+sub-band; Reference [2]-in the first uplink subframe, performing LBT with whole bandwidth, in the continuous subframe perform sub-band LBT-from ZTE https://patents.google.com/patent/CN106658742A/en?oq=LBT+type+and+sub-band Reference [3]-just mentioned a channel comprises multiple sub-bands with downlink.
3GPP TS 36.213 V14.7.0 (Jun. 2018); Release 14.
3GPP TSG RAN WG1 #86; R1-166255, Aug. 22-26, 2016, Gothenburg Sweden;Agenda item: 7.2.1.3; Source: Qualcomm Incorporated; Title: Remaining details of UL LBT; Document for: Discussion and Decision.
3GPP TSG RAN WG1 Meeting #86; R1-167132; Gothenburg Sweden; Aug. 22-26, 2016; Source: Huawei, HiSilicon; Title: Discussion on UL multi-carrier LBT foreLAA; Document for: Discussion and decision.

(56) References Cited

OTHER PUBLICATIONS

3GPP TSG RAN WG1 Meeting #93; R1-1806086 Busan Korea, May 21-25, 2018; Source: vivo; Title: Discussion on the channel access procedures; Agenda Item: 7.6.4.1; Document for: Discussion and Decision.
International Search Report for PCT/US/2019/045238 dated Oct. 21, 2019.
Japanese Office Action, dated Sep. 14, 2021, in Japanese Patent Application No. 2020-566215.
First KROA issued in Application No. 10-2021-7006933 dated Aug. 24, 2022, with English translation,(8p).
Korean Patent Notice of Allowance issued in Application No. 10-2021-7006933, dated Feb. 6, 2023,(4p).

* cited by examiner

User Plane Protocol Stack

Control Plane Protocol Stack

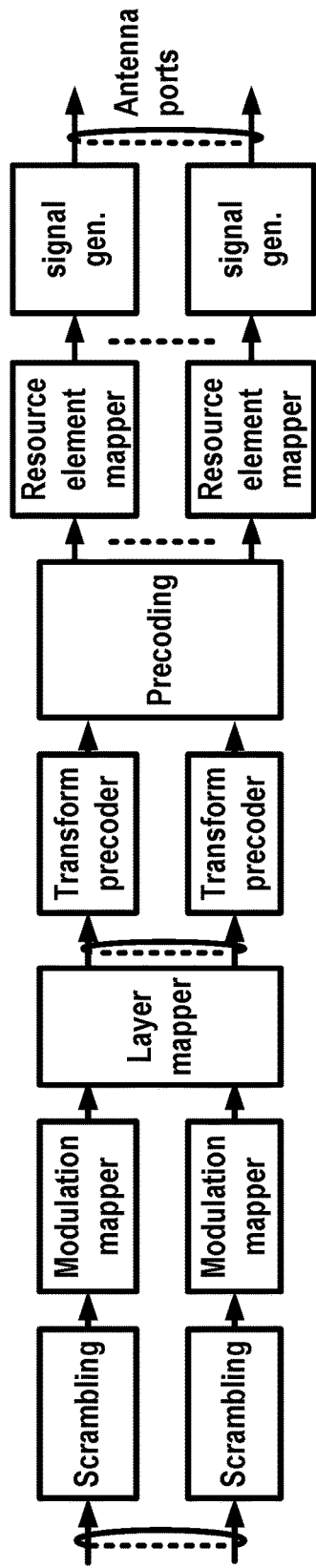
FIG. 4A
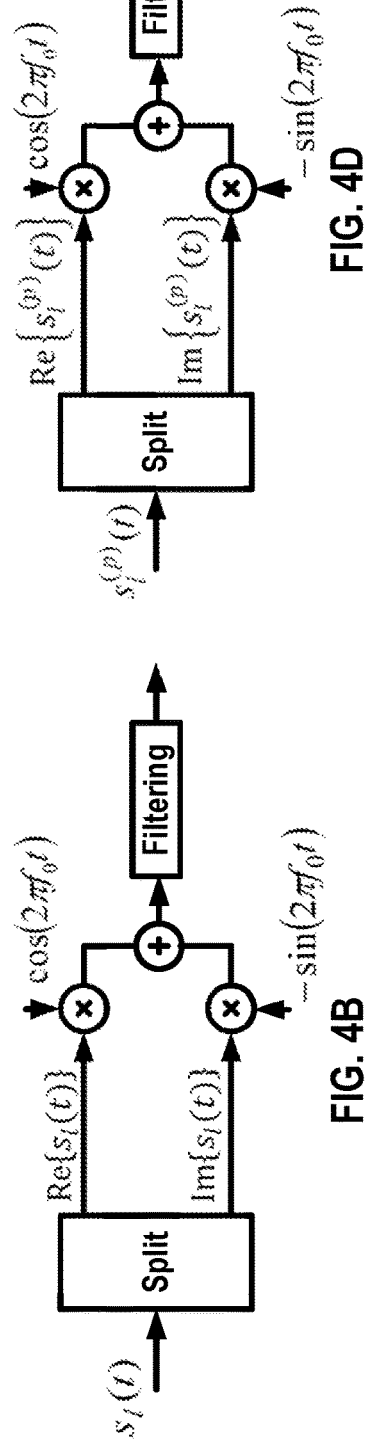
FIG. 4B
FIG. 4D
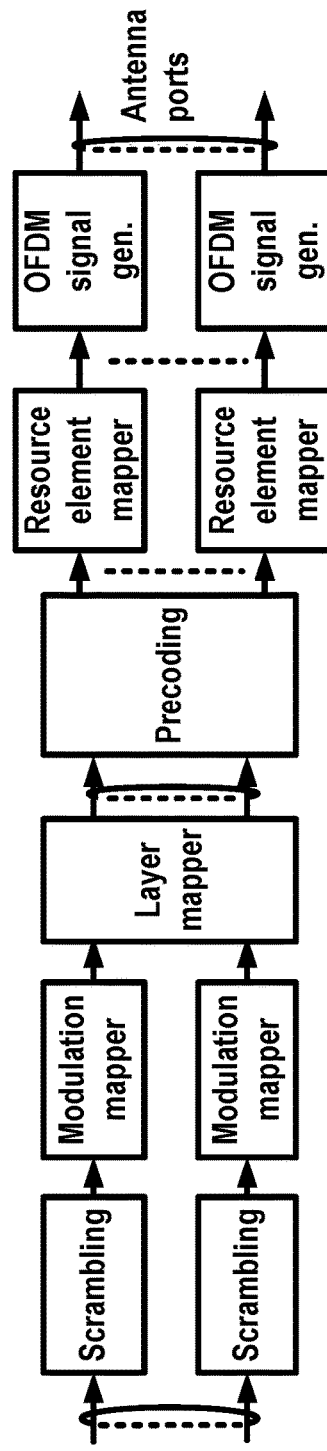
FIG. 4C

| Channel Access Priority Class ($p$) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6ms or 10ms | {15,31,63,127,255,511,1023} |
| 4 | 7 | 15 | 1023 | 6ms or 10ms | {15,31,63,127,255,511,1023} |

FIG. 16

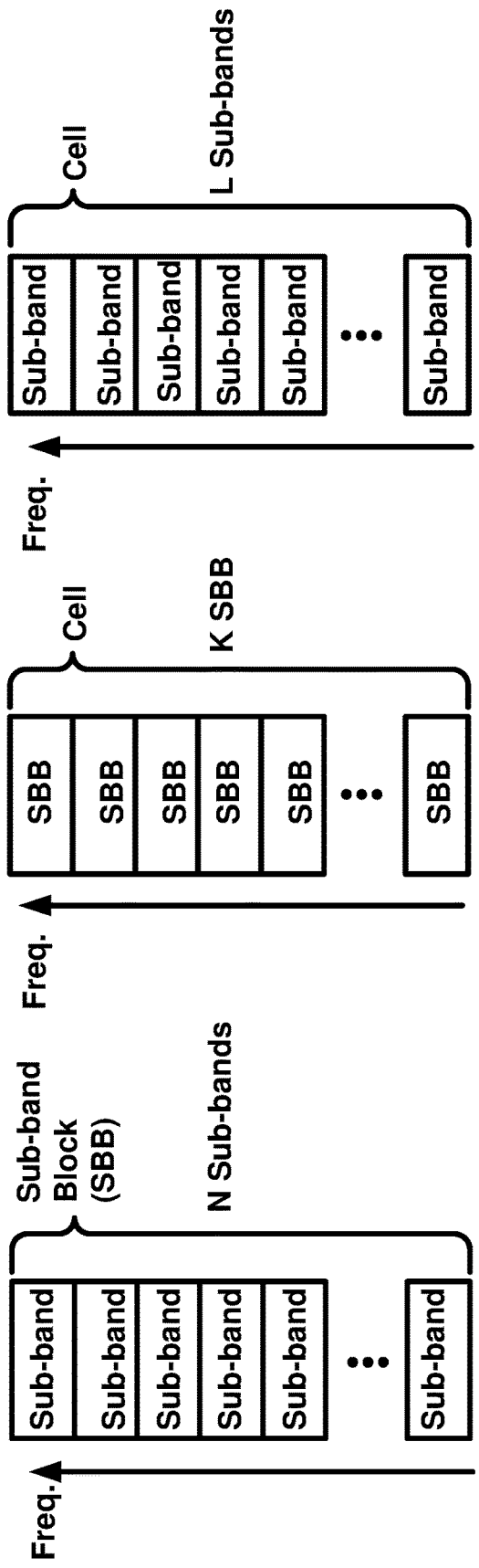
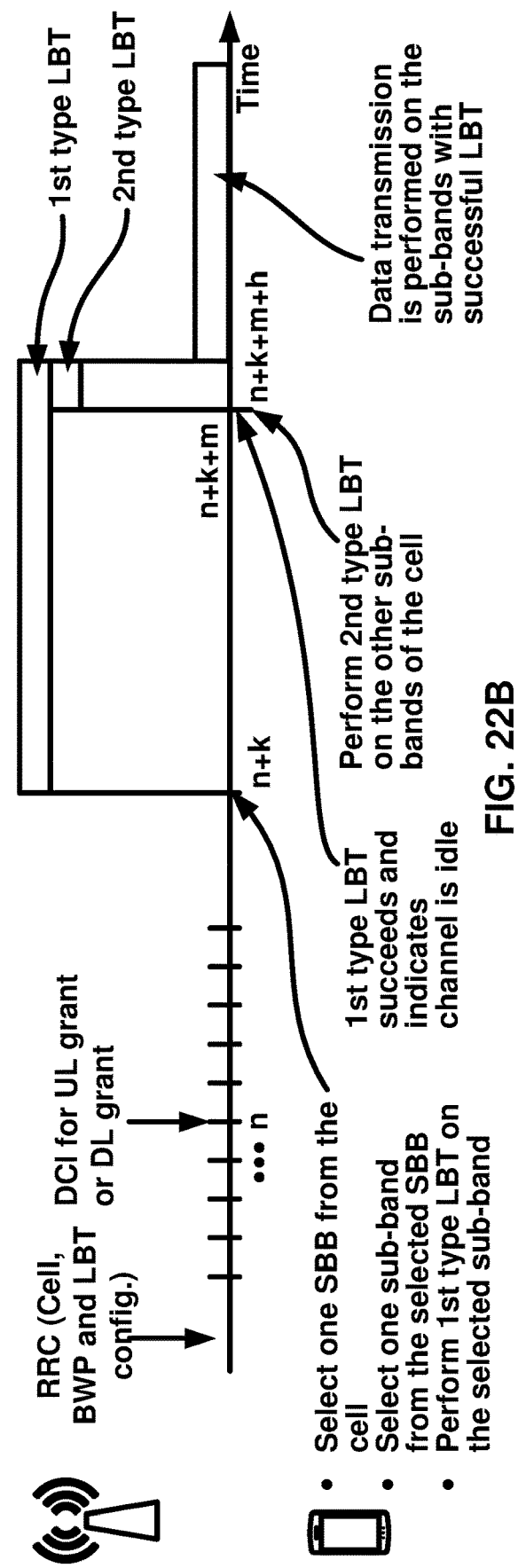
FIG. 22A
FIG. 22B

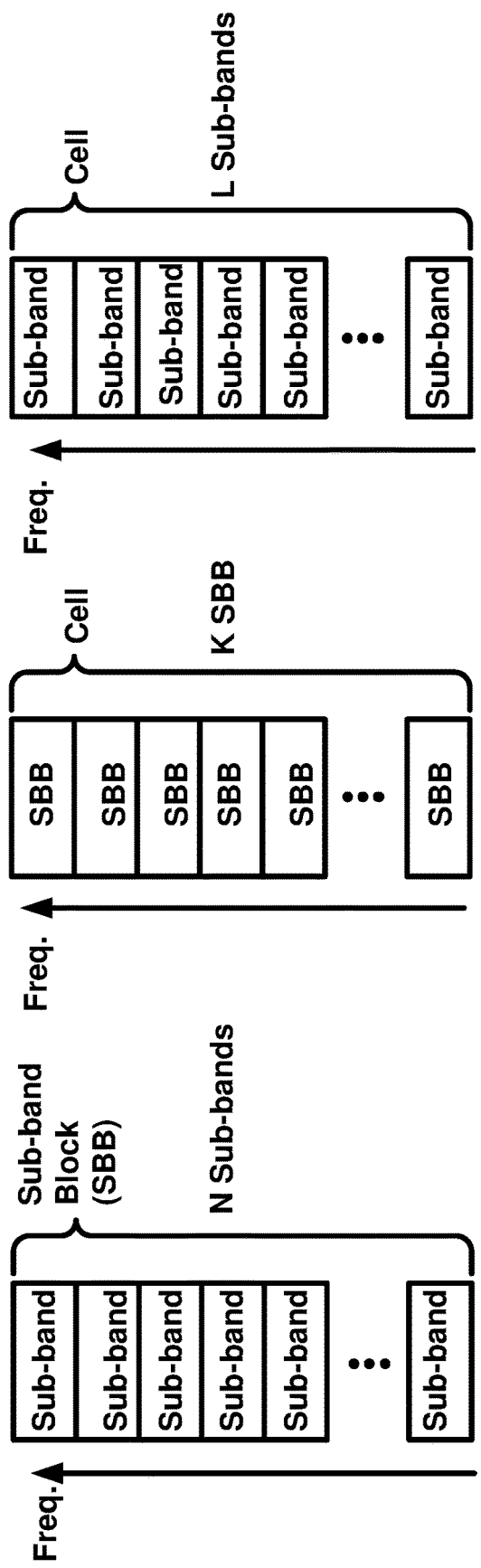
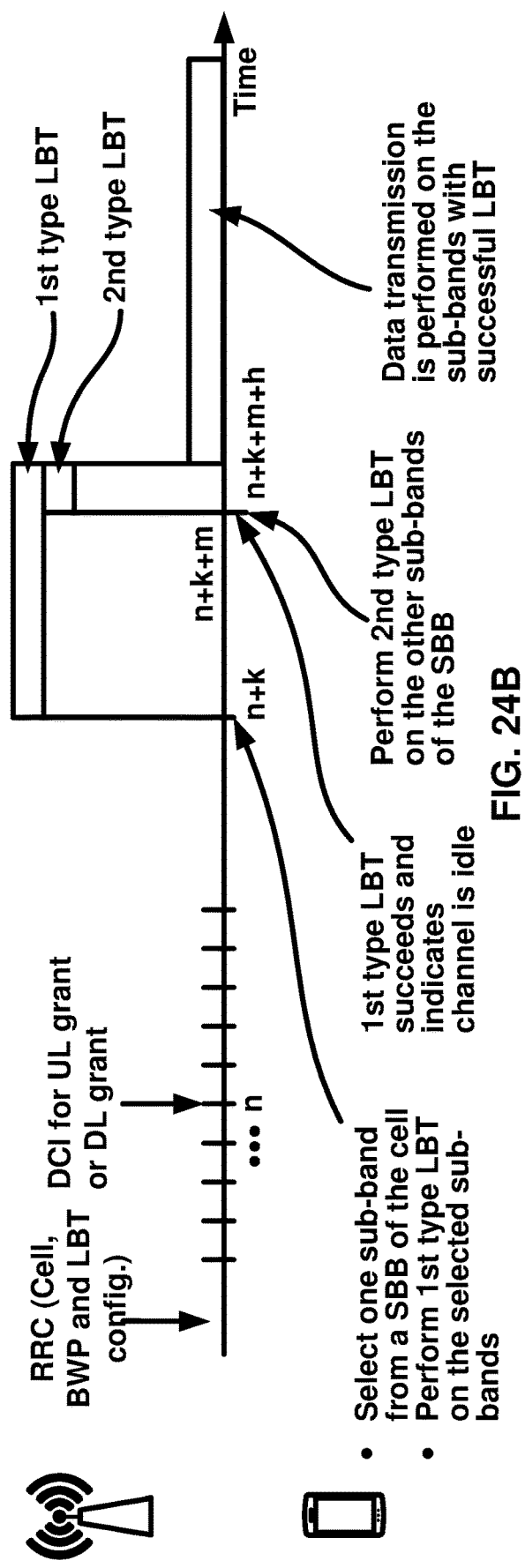
FIG. 24A
FIG. 24B

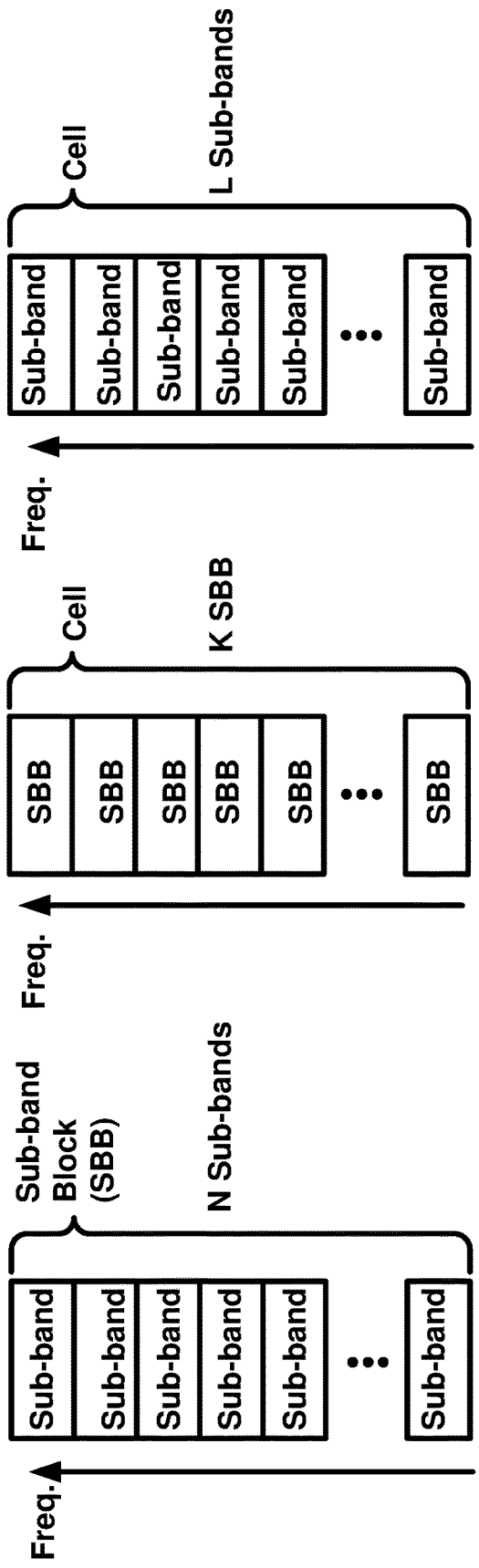
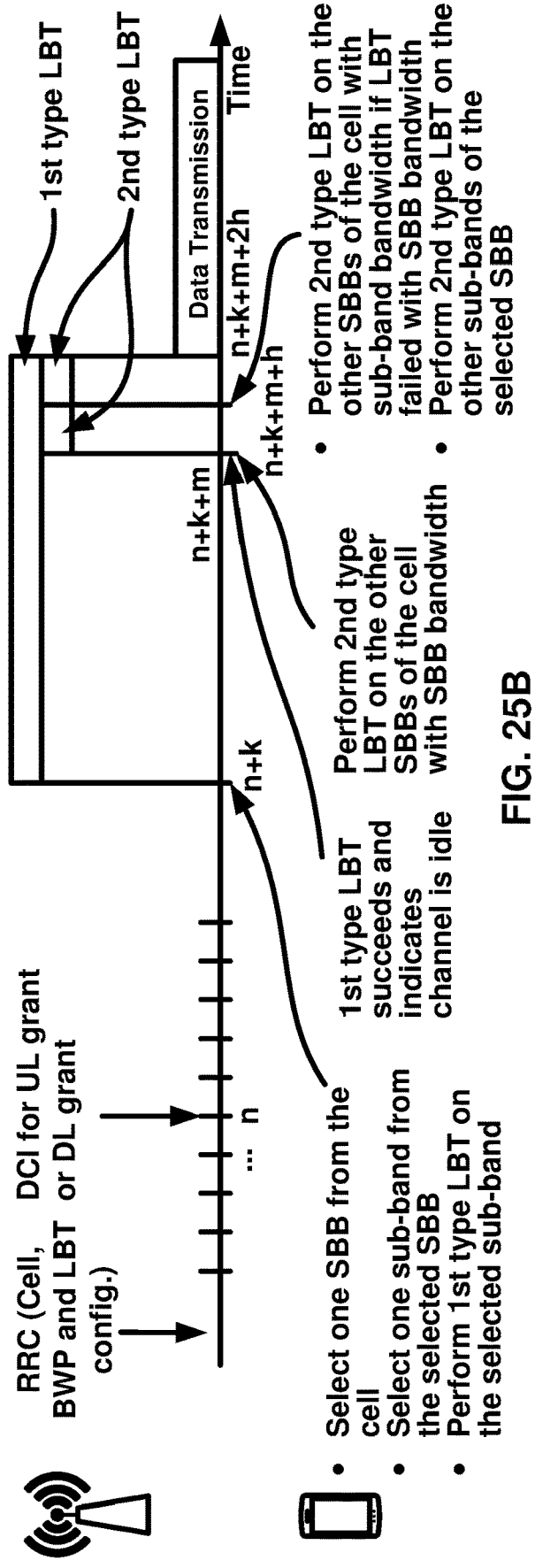
FIG. 25A
FIG. 25B

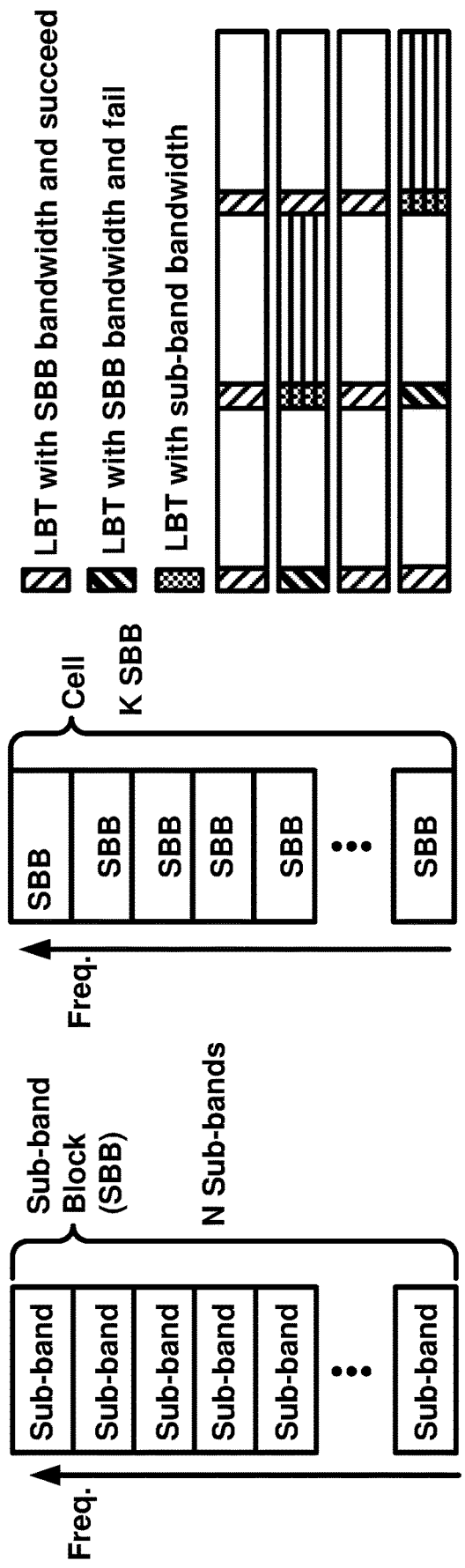
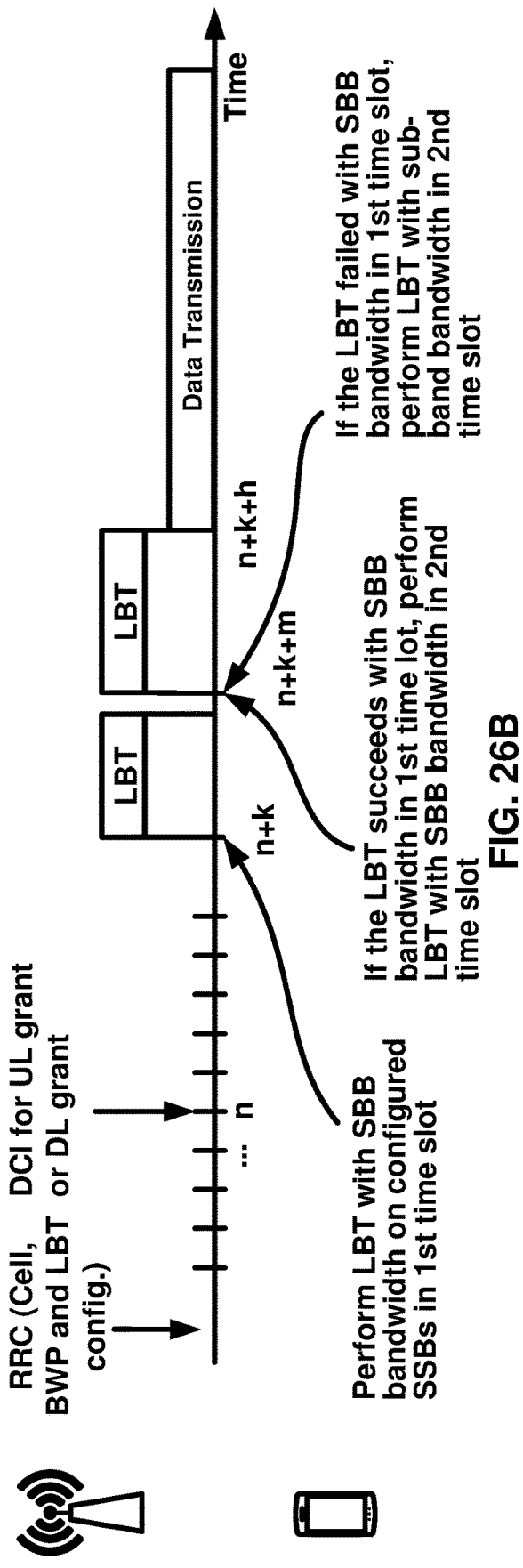
FIG. 26A
FIG. 26B

TRANSMITTING DATA ON A SUB-BAND BASED ON A FIRST AND A SECOND LBT OF SUB-BANDS

CROSS-REFERENCE TO RELATED APPLICATIONS

This application is a continuation of U.S. patent Ser. No. 16/871,621, filed May 11, 2020, which is a continuation of International Application No. PCT/US2019/045238, filed Aug. 6, 2019, which claims the benefit of U.S. Provisional Application No. 62/716,800, filed Aug. 9, 2018, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 16 is a diagram of an example Channel Access Priority Class as per an aspect of an embodiment of the present disclosure.

FIG. 22A is a diagram of an example sub-bands comprised in a cell as per an aspect of an embodiment of the present disclosure FIG. 22B is a diagram of an example Listen Before Talk (LBT) in single carrier wide bandwidth communication as per an aspect of an embodiment of the present disclosure.

FIG. 24A is a diagram of an example sub-bands comprised in a cell as per an aspect of an embodiment of the present disclosure.

FIG. 24B is a diagram of an example Listen Before Talk (LBT) in single carrier wide bandwidth communication as per an aspect of an embodiment of the present disclosure.

FIG. 25A is a diagram of an example sub-bands comprised in a cell as per an aspect of an embodiment of the present disclosure.

FIG. 25B is a diagram of an example Listen Before Talk (LBT) in single carrier wide bandwidth communication as per an aspect of an embodiment of the present disclosure.

FIG. 26A is a diagram of an example sub-bands comprised in a cell as per an aspect of an embodiment of the present disclosure.

FIG. 26B is a diagram of an example Listen Before Talk (LBT) in single carrier wide bandwidth communication as per an aspect of an embodiment of the present disclosure.

DETAILED DESCRIPTION OF EMBODIMENTS

Figure 1:
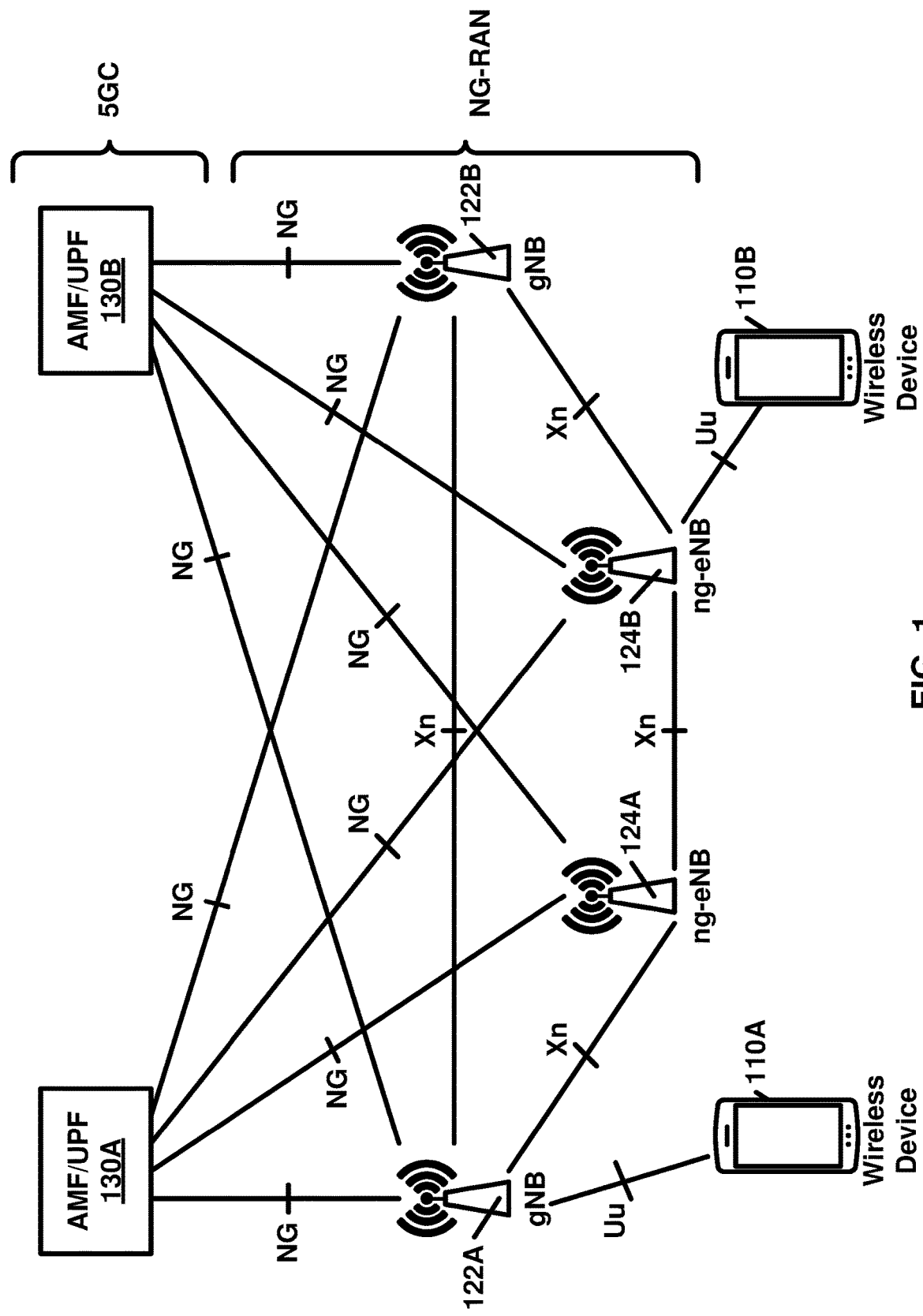
FIG. 1 is a diagram of an example RAN architecture as per an aspect of an embodiment of the present disclosure.

Example embodiments of the present disclosure enable operation of channel access and carrier aggregation. Embodiments of the technology disclosed herein may be employed in the technical field of multicarrier communication and wide bandwidth systems. More particularly, the embodiments of the technology disclosed herein may relate channel access for carrier aggregation and wide bandwidth carrier with listen before talk.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
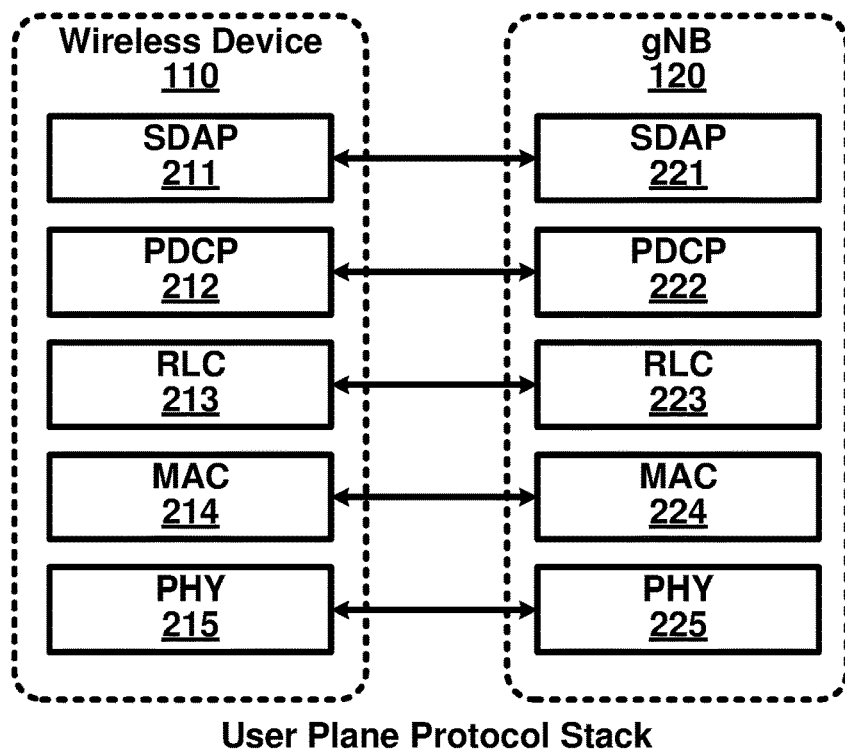
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
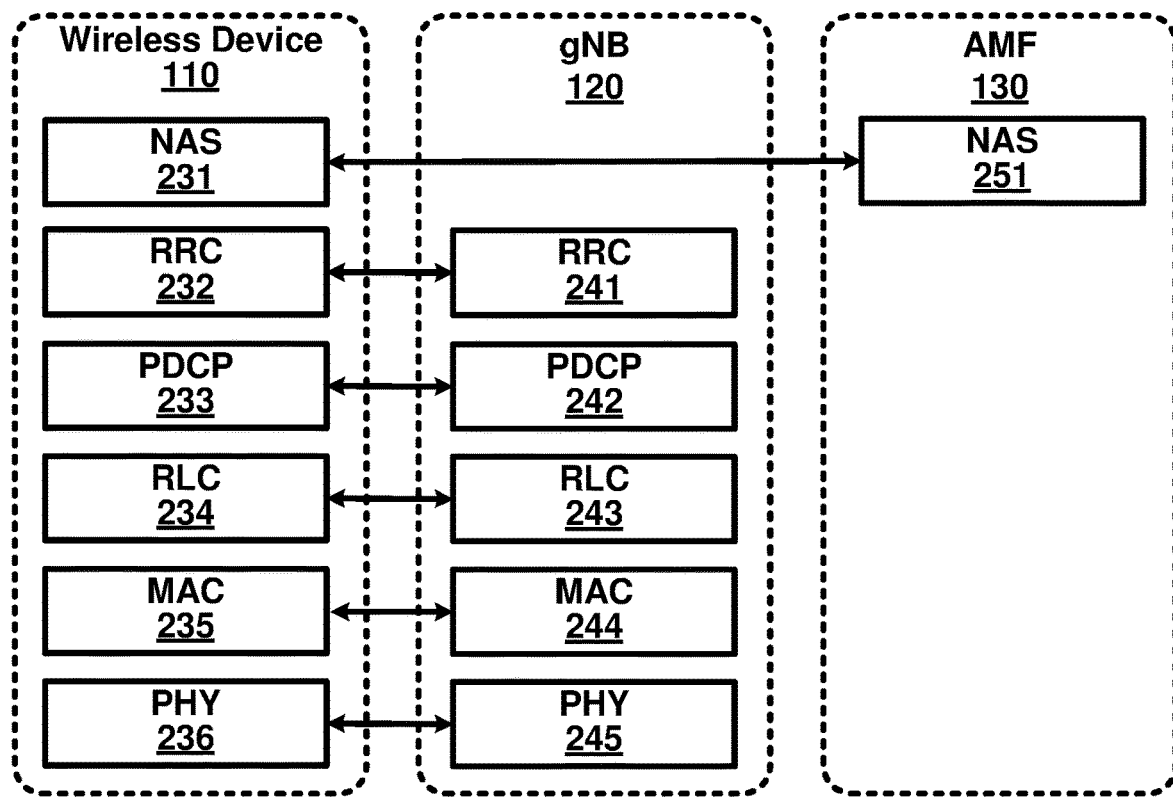
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
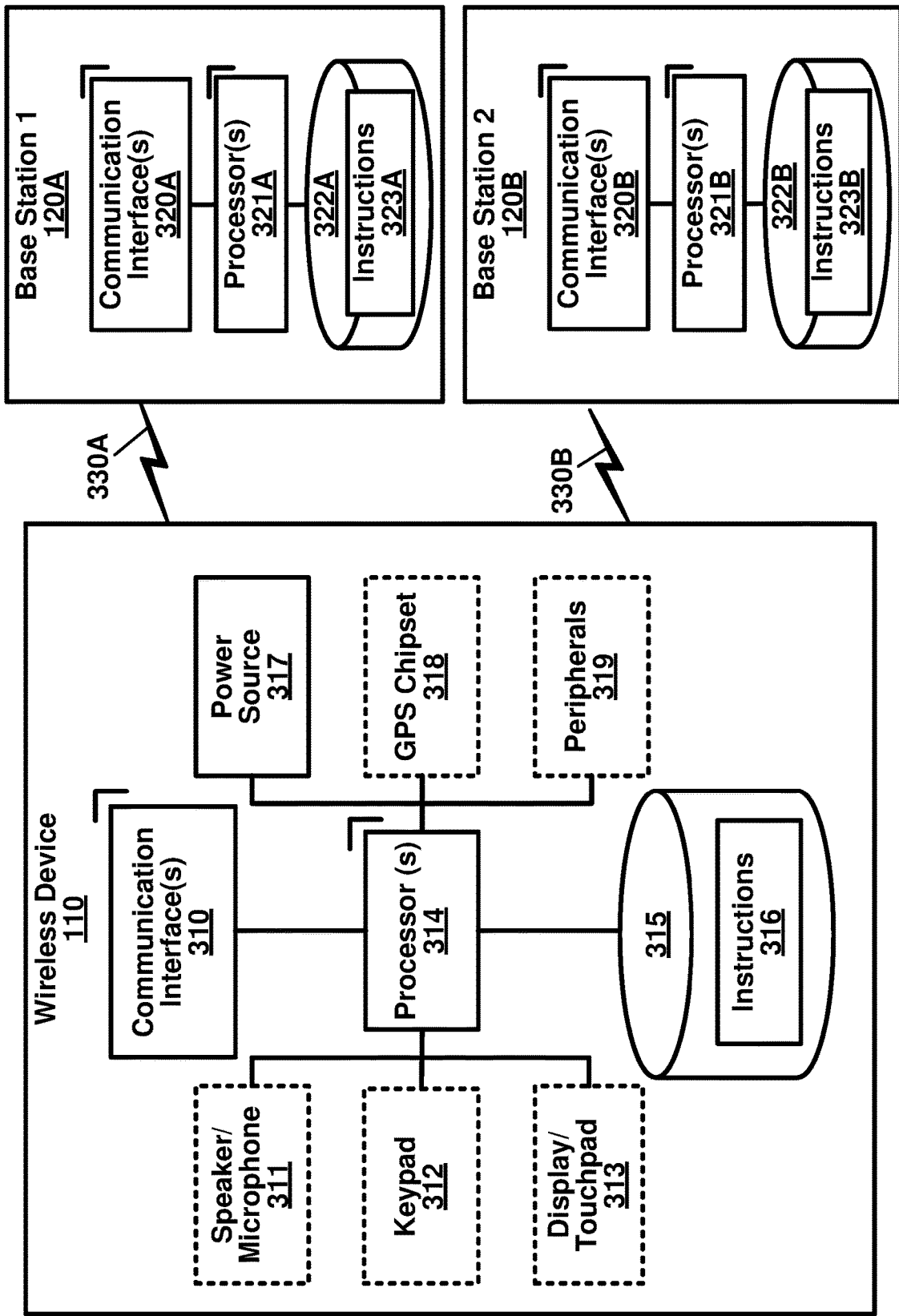
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to reestablish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
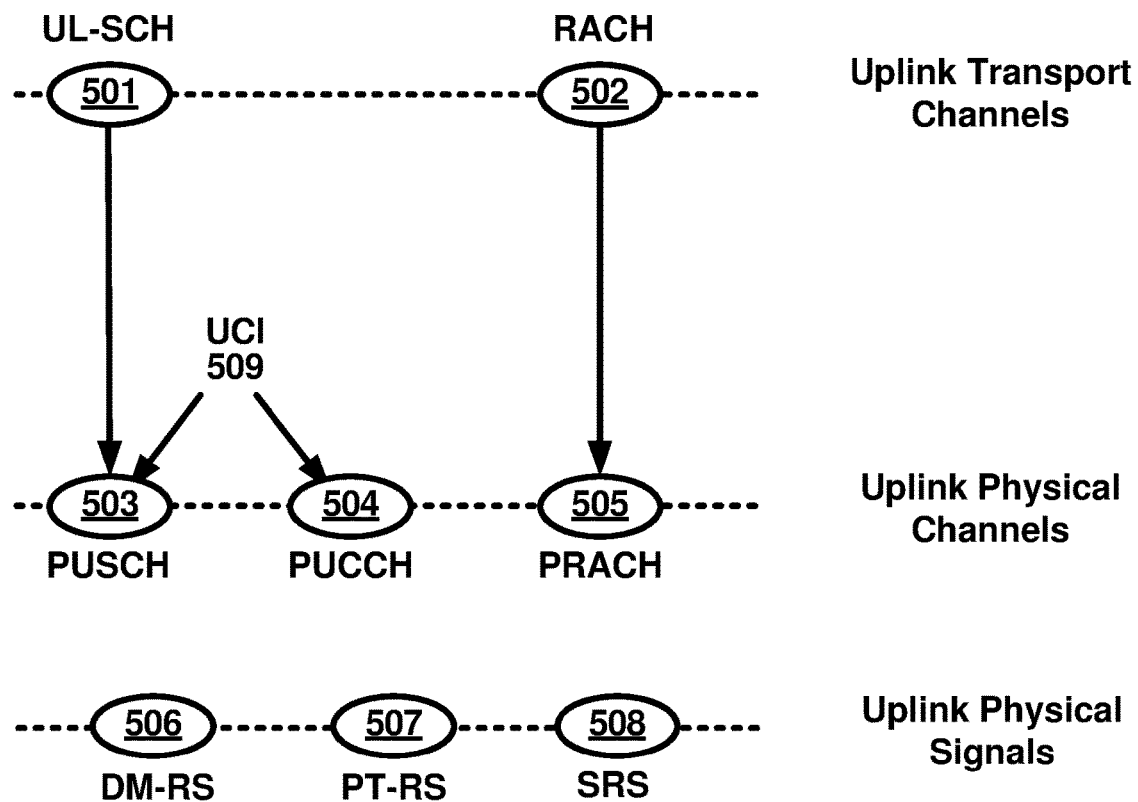
FIG. 5A is a diagram of an example uplink channel mapping and example uplink physical signals as per an aspect of an embodiment of the present disclosure.
Figure 5B:
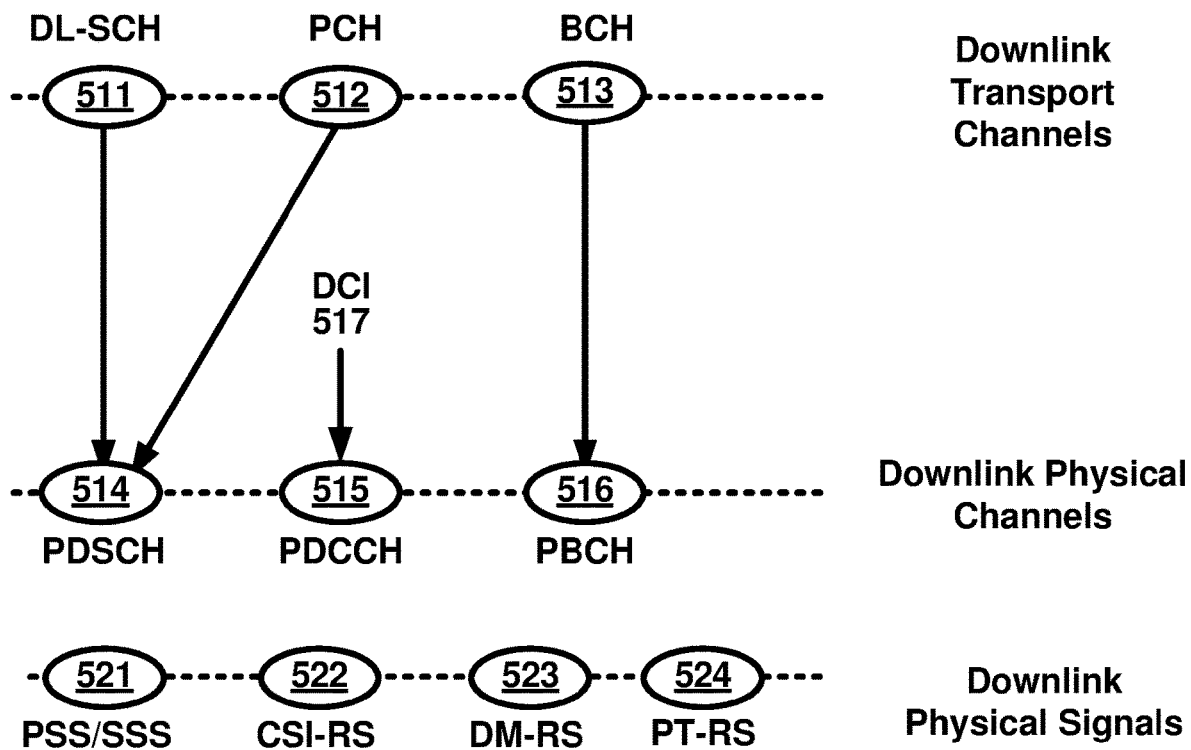
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
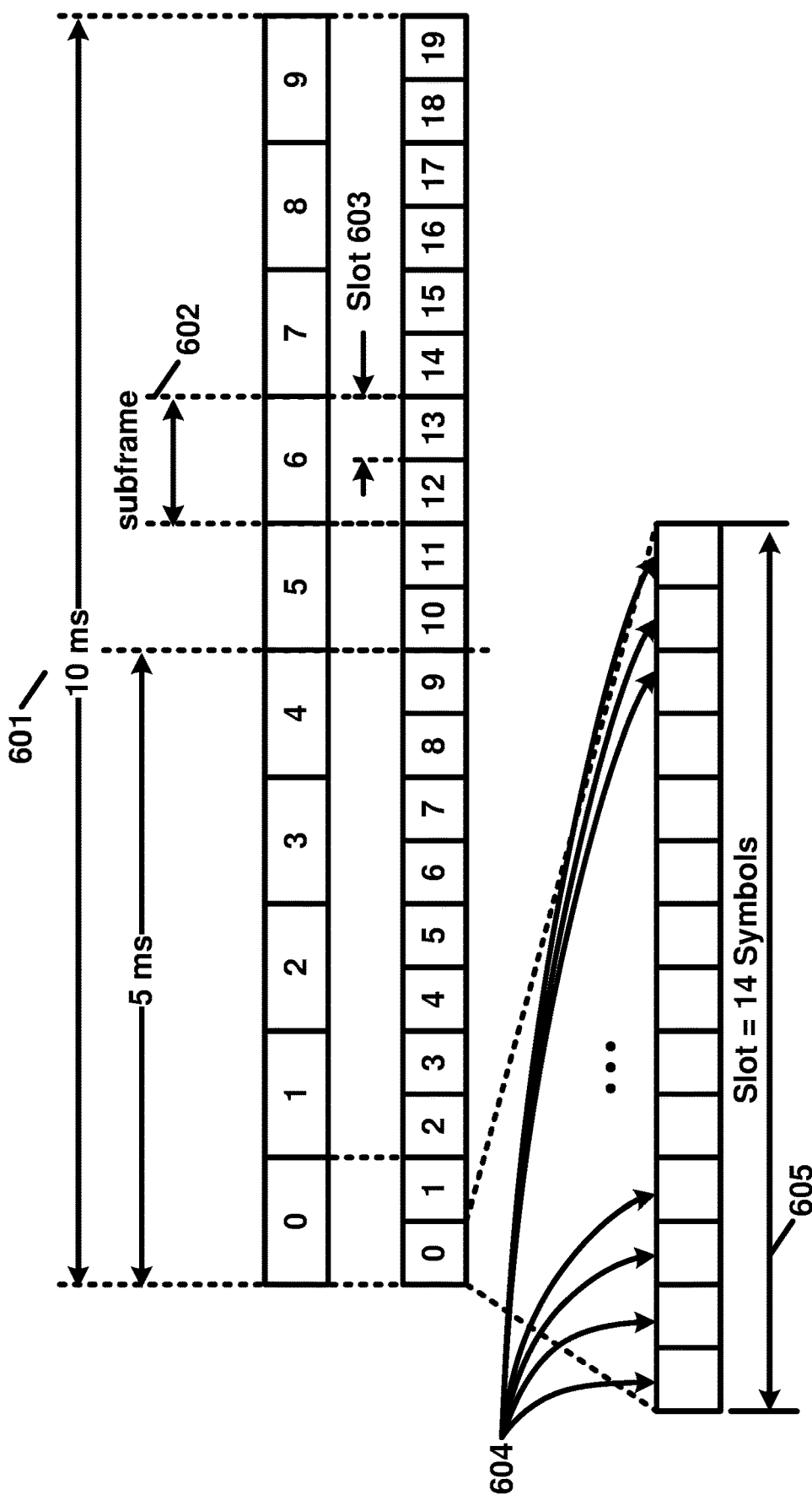
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
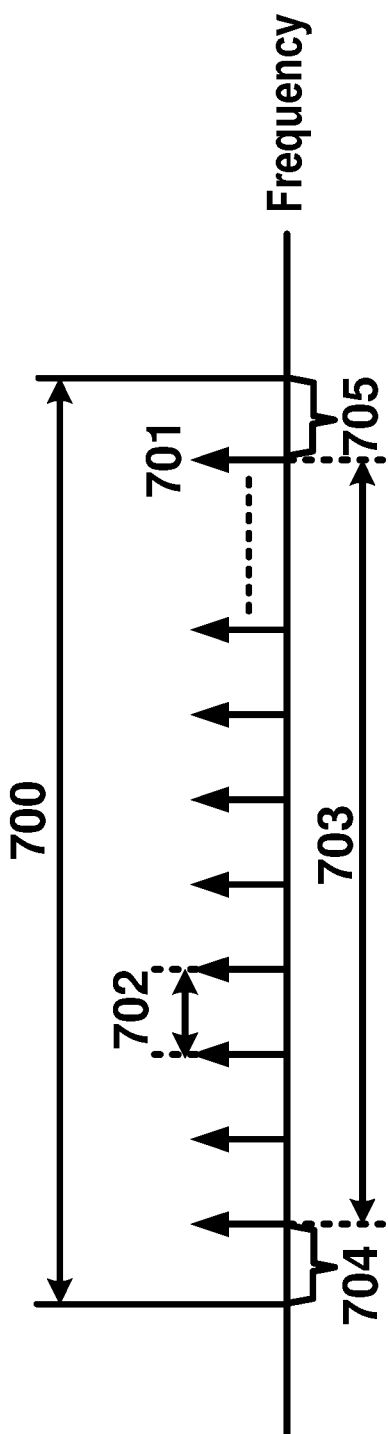
FIG. 7A and FIG. 7B are diagrams depicting example sets of OFDM subcarriers as per an aspect of an embodiment of the present disclosure.
Figure 7B:
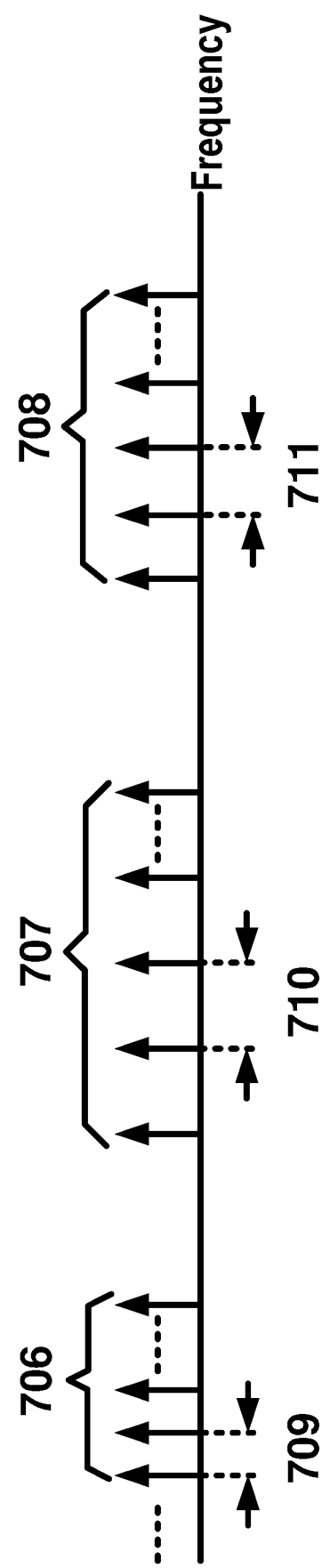

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG.

7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
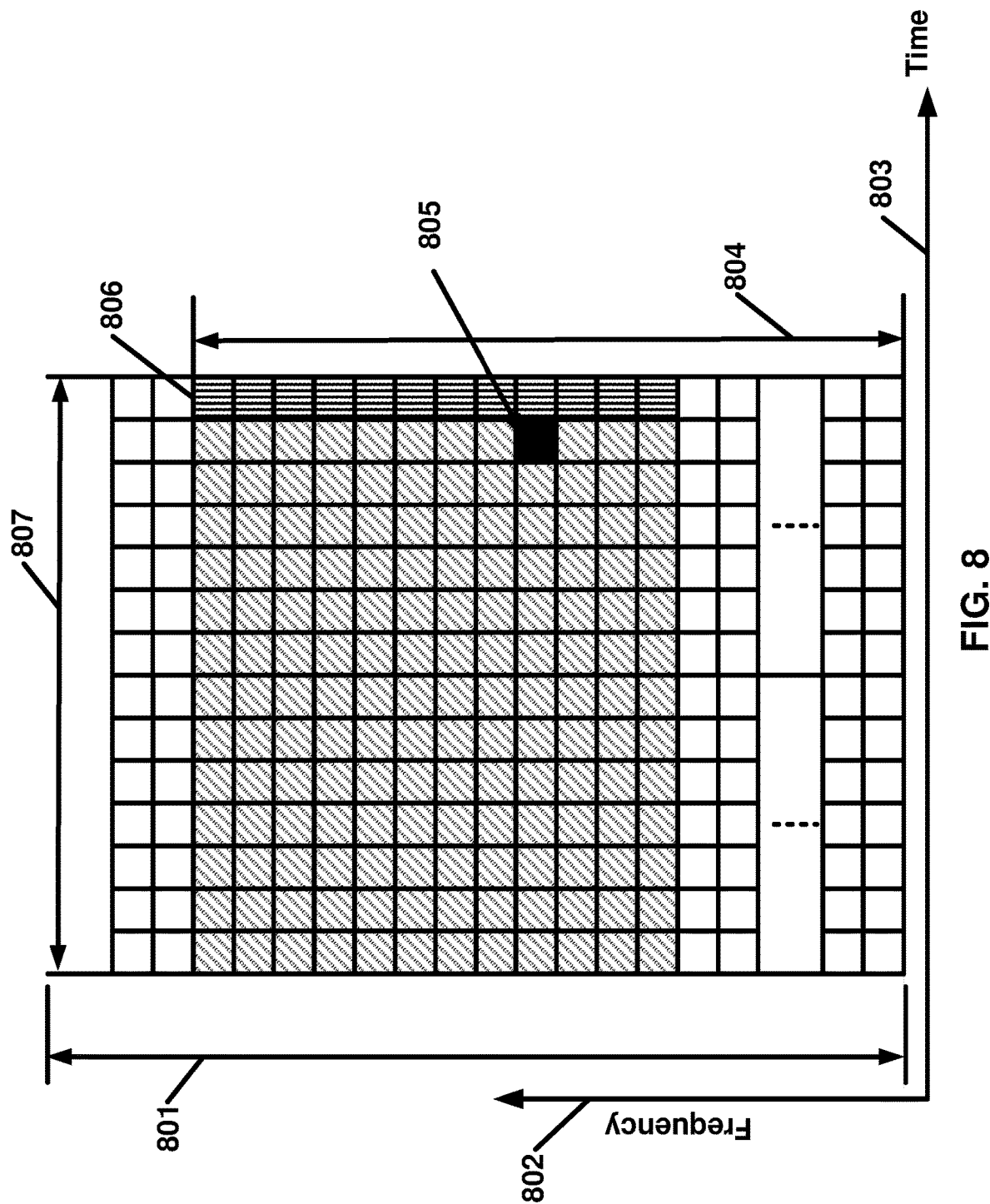
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
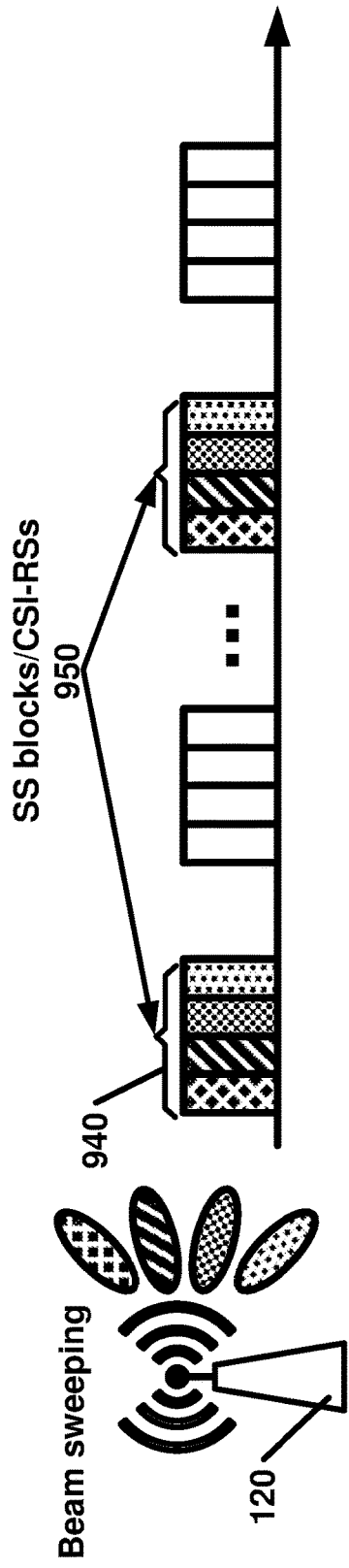
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
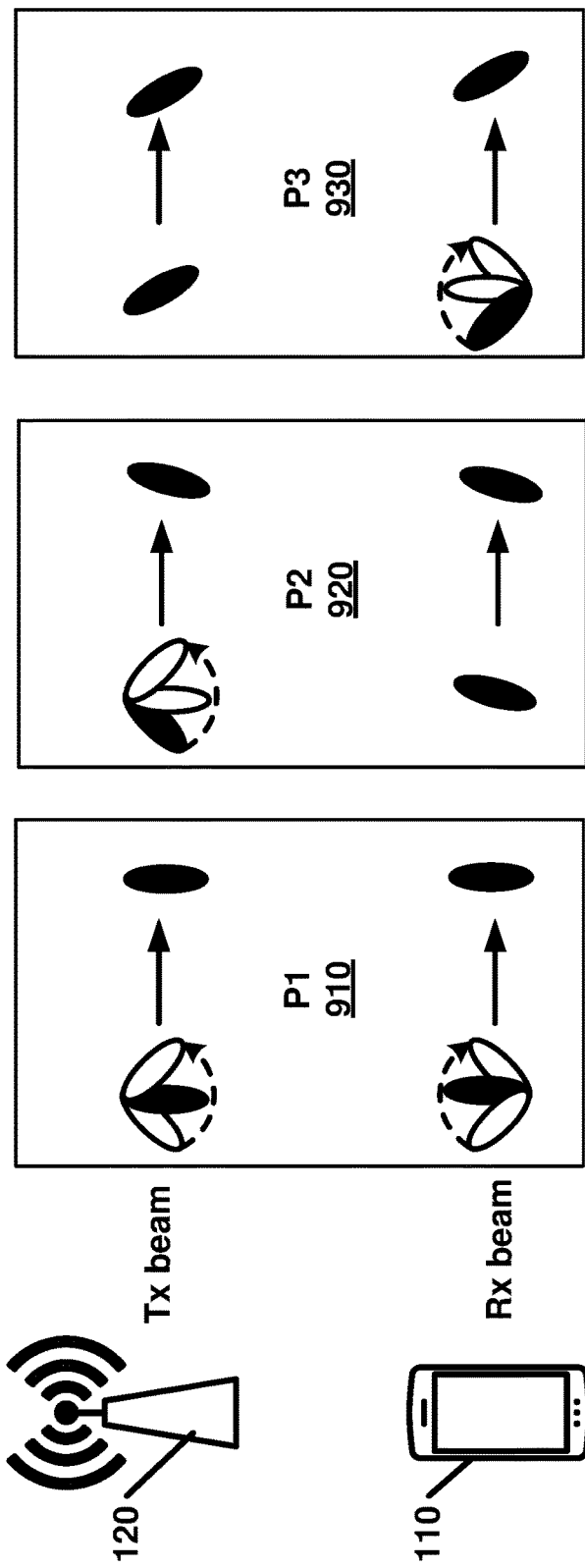
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
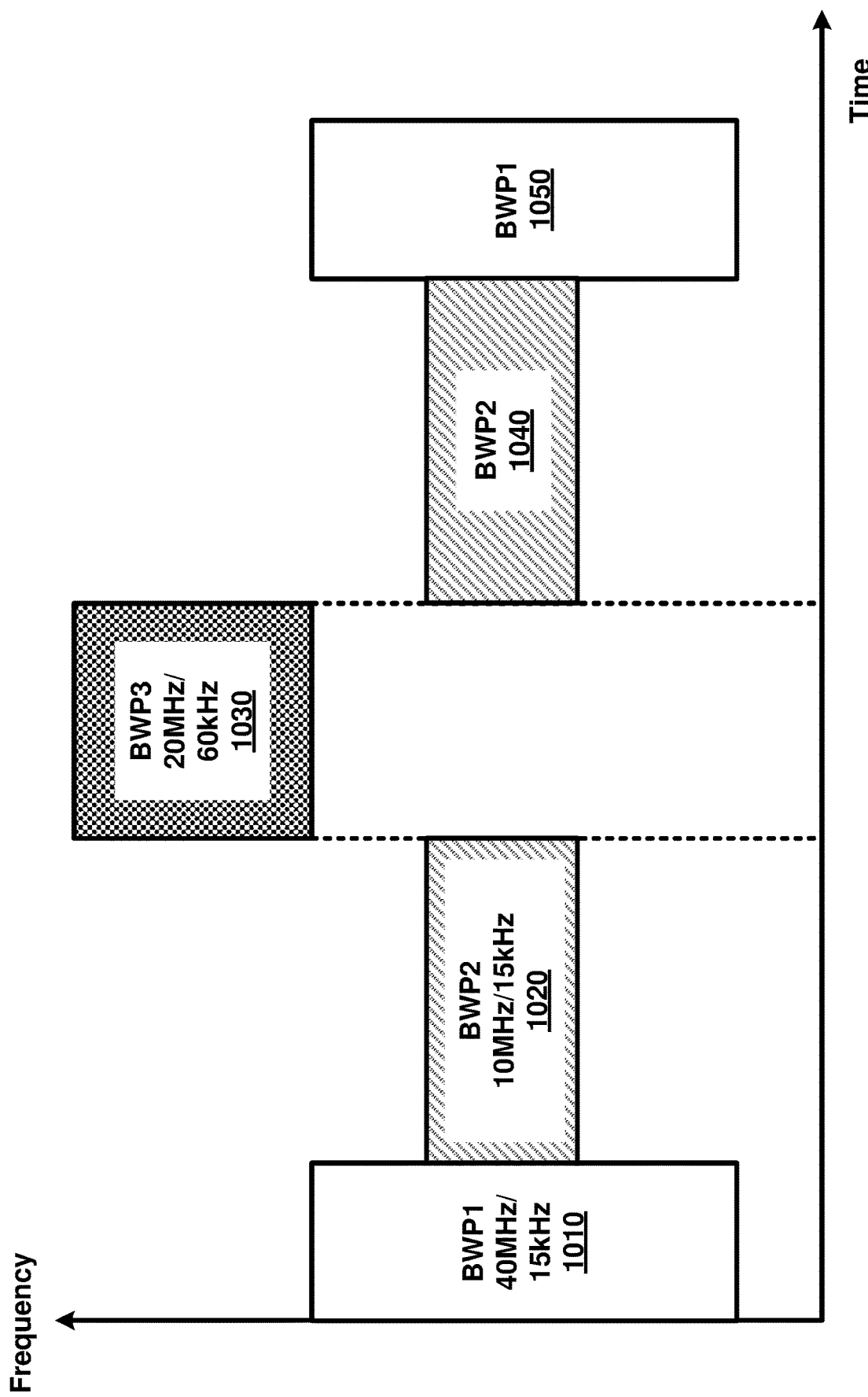
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
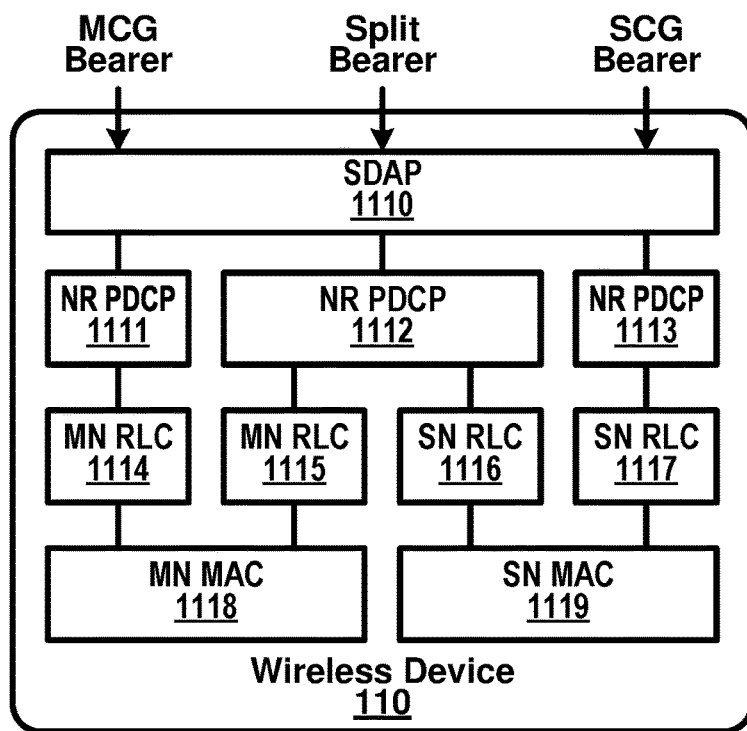
FIG. 11A, and FIG. 11B are diagrams of an example multi connectivity as per an aspect of an embodiment of the present disclosure.
Figure 11B:
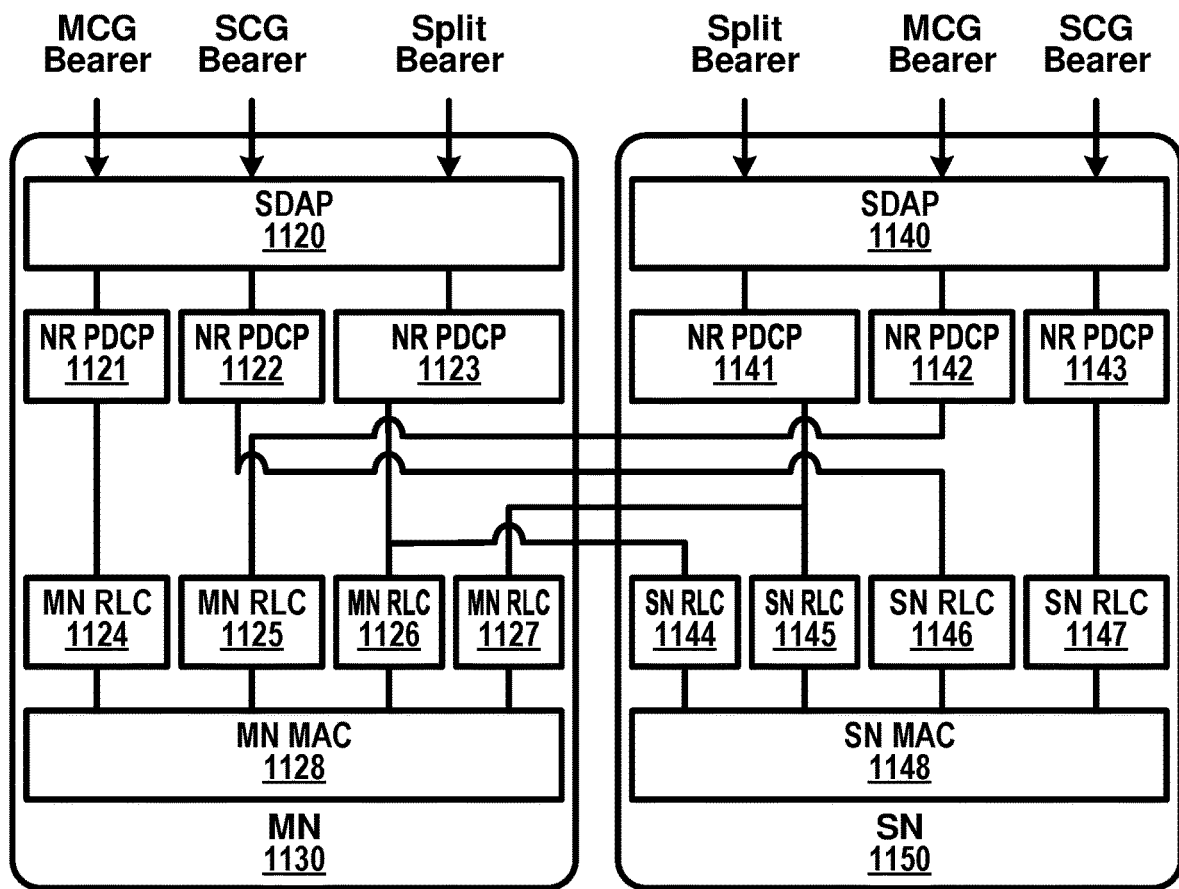

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
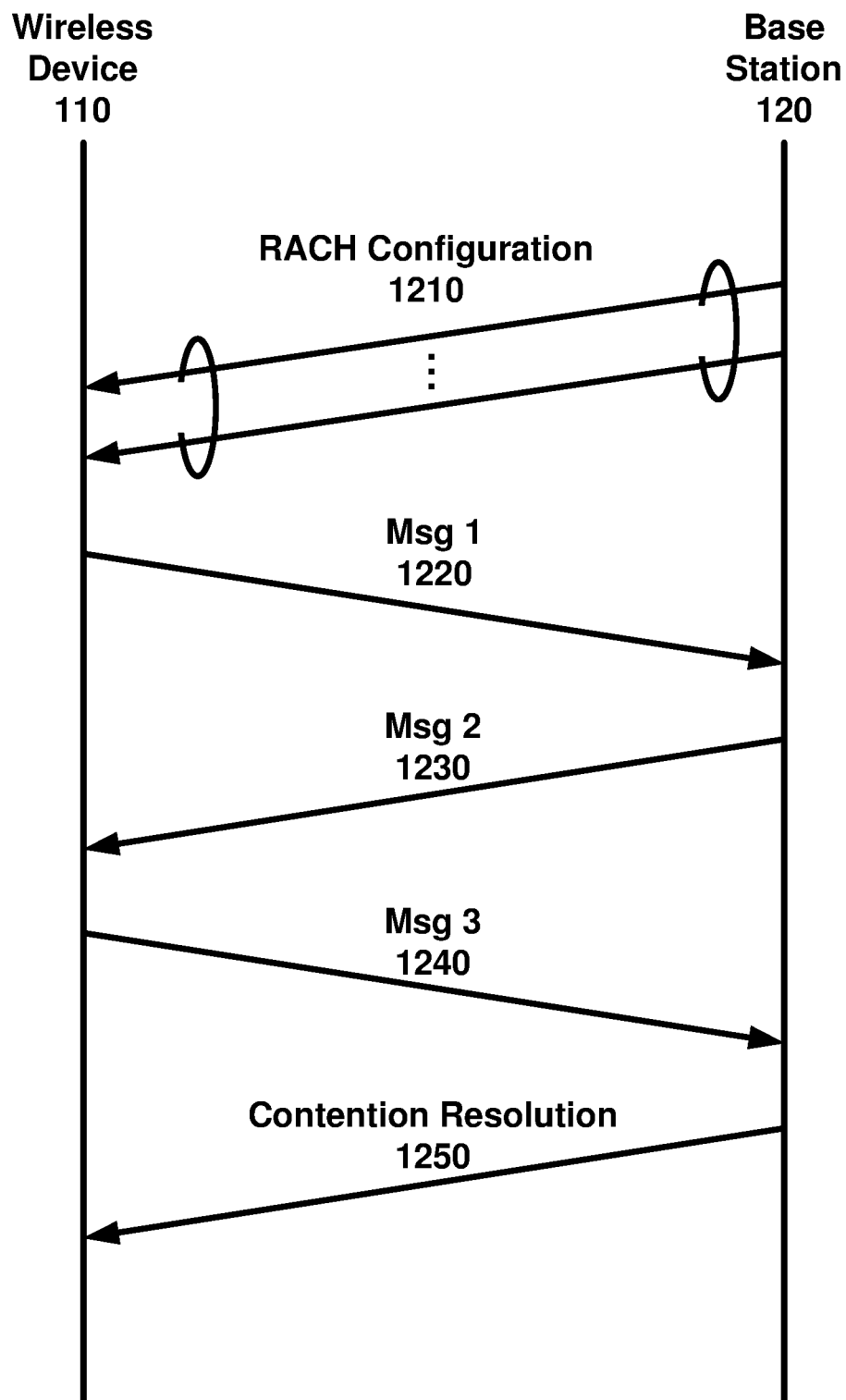
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-Response Window) to monitor response on beam failure recovery request. For example, a UE may start a time window (e.g., ra-Response Window or bfr-Response Window) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
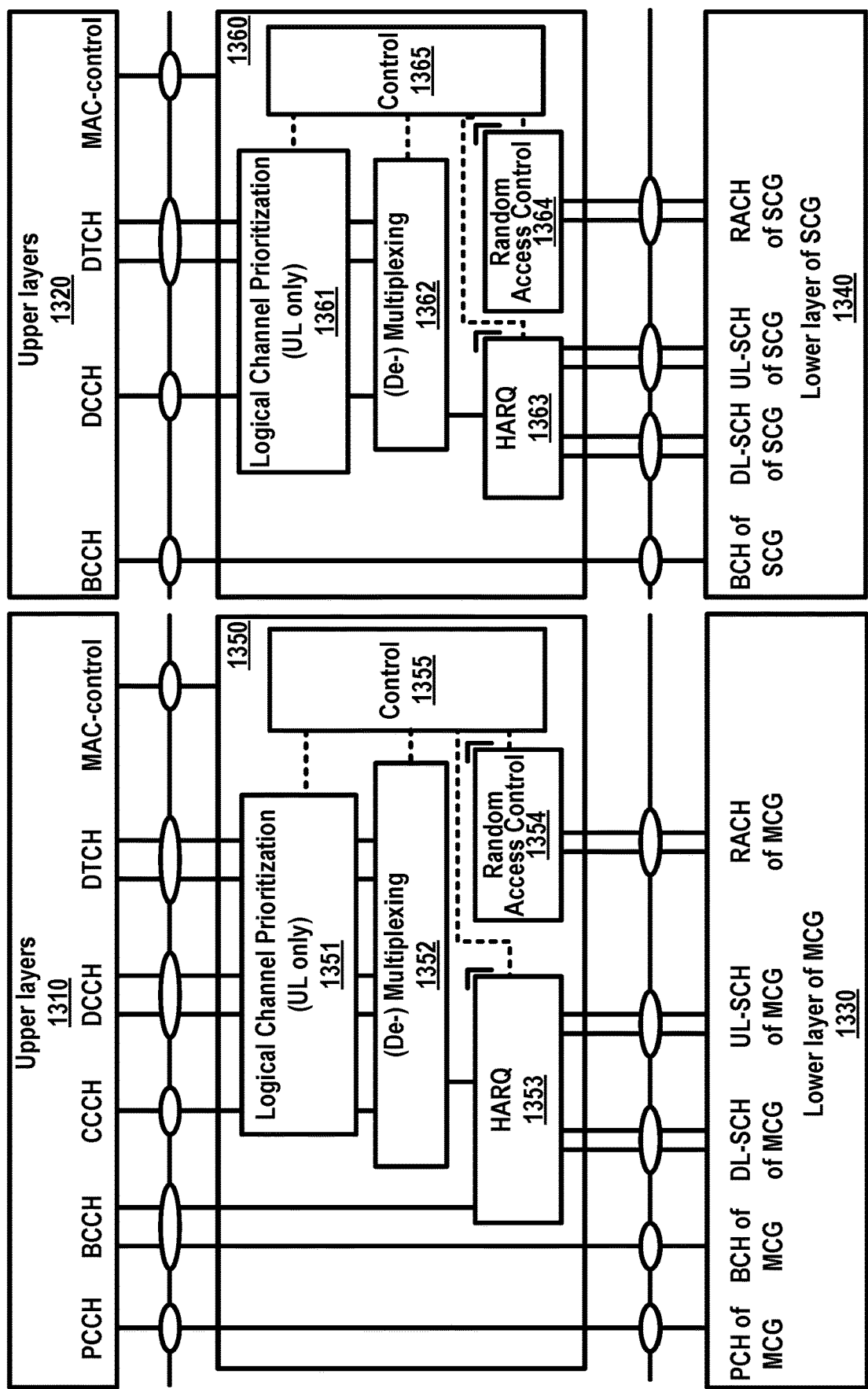
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
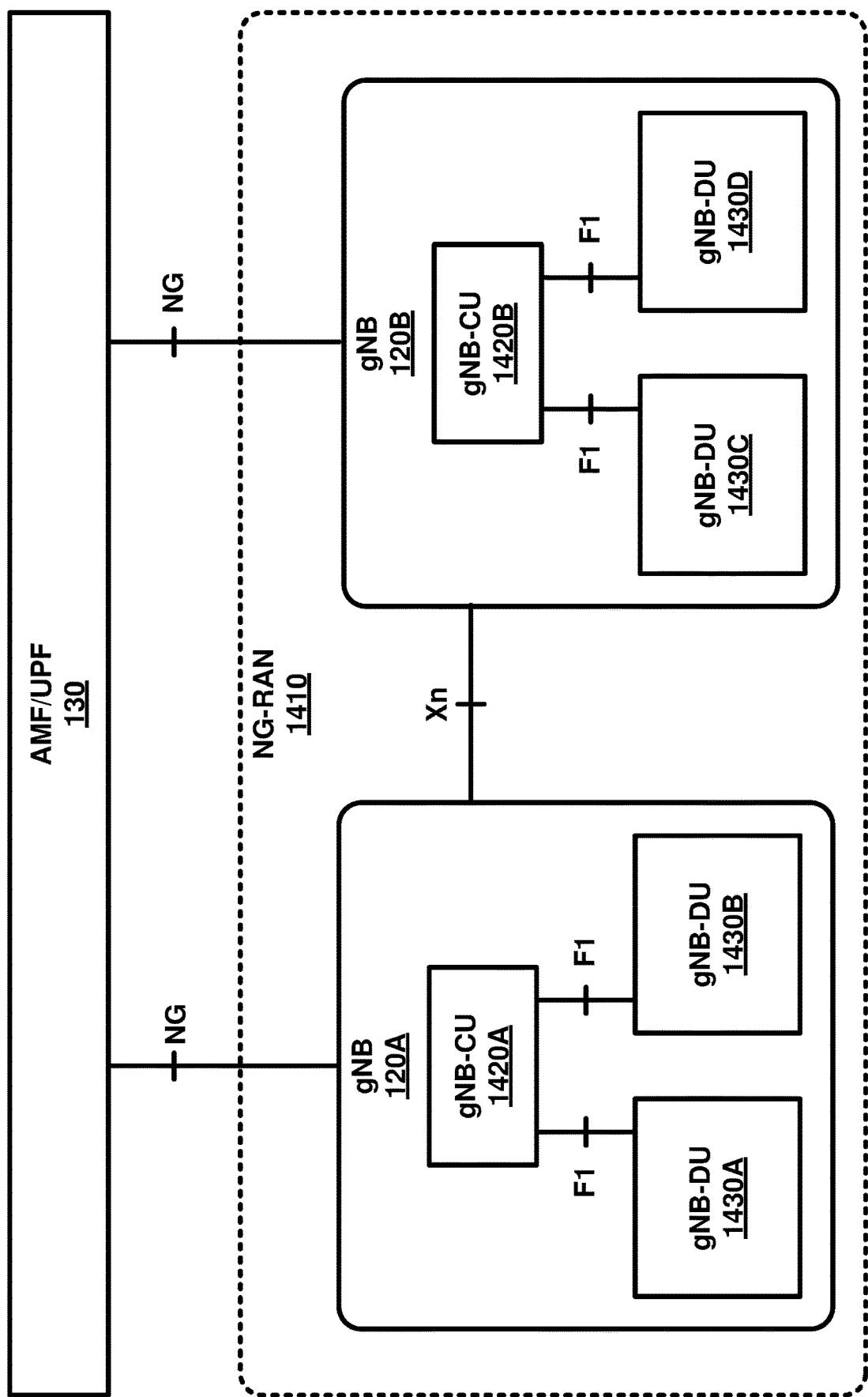
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
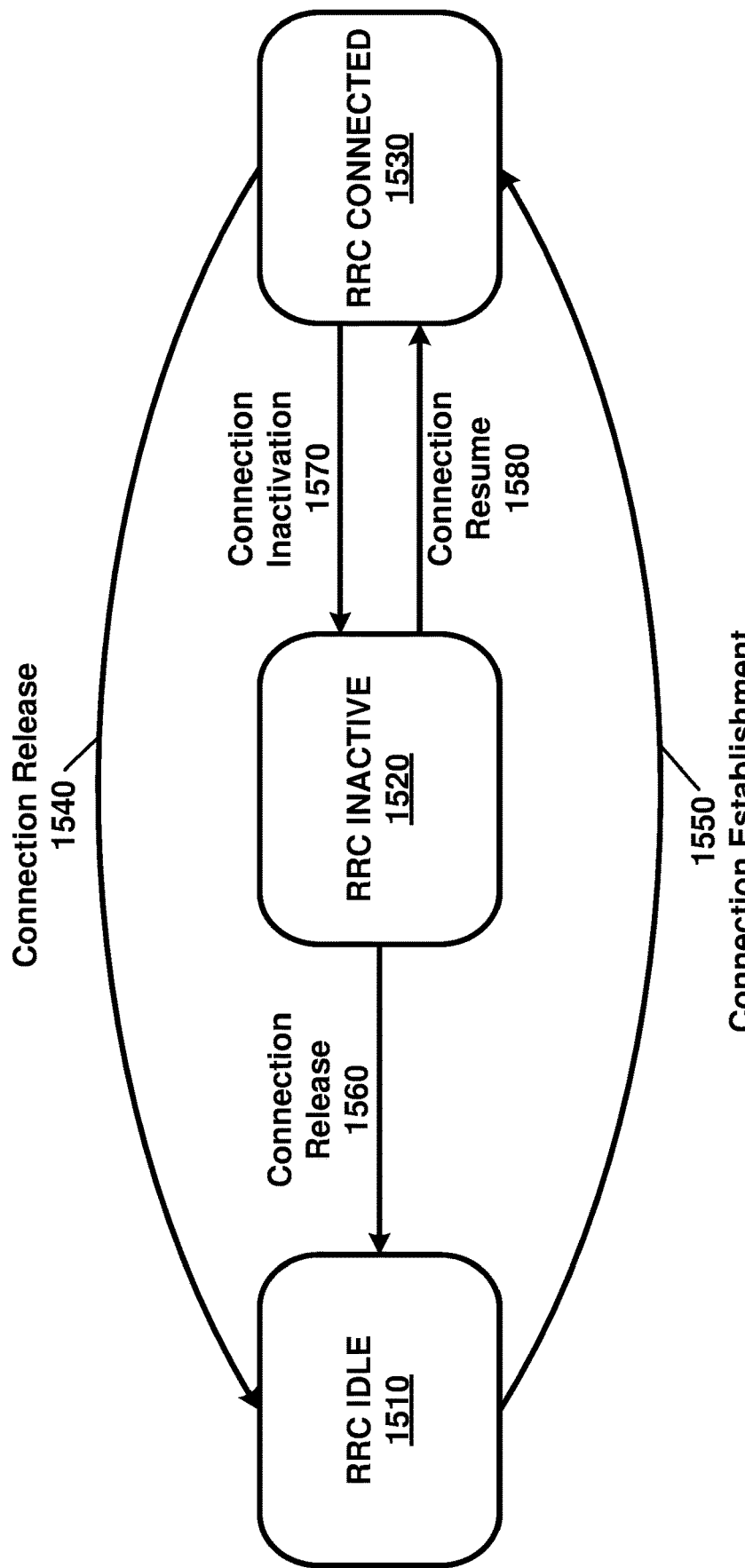
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example, Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g., LBT without random back-off) may be implemented. The duration of time that the channel is sensed to be idle before the transmitting entity transmits may be deterministic. In an example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, single and multiple DL to UL and UL to DL switching within a shared gNB COT may be supported. Example LBT requirements to support single or multiple switching points, may include: for gap of less than 16 us: no-LBT may be used; for gap of above 16 us but does not exceed 25 us: one-shot LBT may be used; for single switching point, for the gap from DL transmission to UL transmission exceeds 25 us: one-shot LBT may be used; for multiple switching points, for the gap from DL transmission to UL transmission exceeds 25 us, one-shot LBT may be used.

In an example, a signal that facilitates its detection with low complexity may be useful for UE power saving; Improved coexistence; Spatial reuse at least within the same operator network, Serving cell transmission burst acquisition, etc.

In an example, operation of new radio on unlicensed bands (NR-U) may employ a signal that contains at least SS/PBCH block burst set transmission. In an example, other channels and signals may be transmitted together as part of the signal. The design of this signal may consider there are no gaps within the time span the signal is transmitted at least within a beam. In an example, gaps may be needed for beam switching. In an example, the occupied channel bandwidth may be satisfied.

In an example, a block-interlaced based PUSCH may be employed. In an example, the same interlace structure for PUCCH and PUSCH may be used. In an example, interlaced based PRACH may be used.

In an example, initial active DL/UL BWP may be approximately 20 MHz for 5 GHz band. In an example, initial active DL/UL BWP may be approximately 20 MHz for 6 GHz band if similar channelization as 5 GHz band is used for 6 GHz band.

In an example, HARQ A/N for the corresponding data may be transmitted in the same shared COT. In some examples, the HARQ A/N may be transmitted in a separate COT from the one the corresponding data was transmitted.

In an example, when UL HARQ feedback is transmitted on unlicensed band, NR-U may consider mechanisms to support flexible triggering and multiplexing of HARQ feedback for one or more DL HARQ processes.

In an example, the dependencies of HARQ process information to the timing may be removed. In an example, UCI on PUSCH may carry HARQ process ID, NDI, RVID. In an example, Downlink Feedback Information (DFI) may be used for transmission of HARQ feedback for configured grant.

In an example, both CBRA and CFRA may be supported on NR-U SpCell and CFRA may be supported on NR-U SCells. In an example, RAR may be transmitted via SpCell. In an example, a predefined HARQ process ID for RAR.

In an example, carrier aggregation between licensed band NR (PCell) and NR-U (SCell) may be supported. In an example, NR-U SCell may have both DL and UL, or DL-only. In an example, dual connectivity between licensed band LTE (PCell) and NR-U (PSCell) may be supported. In an example, Stand-alone NR-U where all carriers are in unlicensed spectrum may be supported. In an example, an NR cell with DL in unlicensed band and UL in licensed band may be supported. In an example, dual connectivity between licensed band NR (PCell) and NR-U (PSCell) may be supported.

In an example, if absence of Wi-Fi cannot be guaranteed (e.g. by regulation) in a band (e.g., sub-7 GHz) where NR-U is operating, the NR-U operating bandwidth may be an integer multiple of 20 MHz. In an example, at least for band where absence of Wi-Fi cannot be guaranteed (e.g. by regulation), LBT can be performed in units of 20 MHz. In an example, receiver assisted LBT (e.g., RTS/CTS type mechanism) and/or on-demand receiver assisted LBT (e.g., for example receiver assisted LBT enabled only when needed) may be employed. In an example, techniques to enhance spatial reuse may be used. In an example, preamble detection may be used.

In an example, with scheduled PUSCH transmissions on an unlicensed carrier, the network first needs to gain access to the channel to transmit PDCCH and then the UE needs to perform LBT again prior to transmitting on the resource. Such procedure tends to increase latency especially when the channel is loaded. In an example, a mechanism of autonomous uplink transmission may be used. In an example, a UE may be pre-allocated a resource for transmission similar to UL SPS and performs LBT prior to using the resource. In an example, autonomous uplink may be based on the Configured Grant functionality (e.g., Type 1 and/or Type 2).

In an example, the HARQ process identity may be transmitted by the UE (e.g., as UCI). This may enable a UE to use the first available transmission opportunity irrespective of the HARQ process. In an example, UCI on PUSCH may be used to carry HARQ process ID, NDI and RVID.

For unlicensed band, UL dynamic grant scheduled transmission may increase the delay and transmission failure possibility due to at least two LBTs of UE and gNB. Pre-configured grant such as configured grant in NR may be used for NR-U, which may decrease the number of LBTs performed and control signaling overhead.

In an example, in a Type 1 configured grant, an uplink grant is provided by RRC, and stored as configured uplink grant. In an example, in Type 2 configured grant, an uplink grant is provided by PDCCH, and stored or cleared as configured uplink grant based on L1 signaling indicating configured grant activation or deactivation.

In an example, there may not be a dependency between HARQ process information to the timing. In an example, UCI on PUSCH may carry HARQ process ID, NDI, RVID, etc. In an example, UE may autonomously select one HARQ process ID which is informed to gNB by UCI.

In an example, a UE may perform non-adaptive retransmission with the configured uplink grant. When dynamic grant for configured grant retransmission is blocked due to LBT, UE may try to transmit in the next available resource with configured grant.

In an example, Downlink Feedback Information (DFI) may be transmitted (e.g., using DCI) may include HARQ feedback for configured grant transmission. The UE may perform transmission/retransmission using configured grant according to DFI including HARQ feedback. In an example, wideband carrier with more than one channels is supported on NR-based unlicensed cell.

In an example, there may be one active BWP in a carrier. In an example, a BWP with multiple channels may be activated. In an example, when absence of Wi-Fi cannot be guaranteed (e.g. by regulation), LBT may be performed in units of 20 MHz. In this case, there may be multiple parallel LBT procedures for this BWP. The actual transmission bandwidth may be subject to subband with LBT success, which may result in dynamic bandwidth transmission within this active wideband BWP.

In an example, multiple active BWPs may be supported. To maximize the BWP utilization efficiency, the BWP bandwidth may be the same as the bandwidth of subband for LBT, e.g., LBT is carried out on each BWP. The network may activate/deactivate the BWPs based on data volume to be transmitted.

In an example, multiple non overlapped BWPs may be activated for a UE within a wide component carrier, which may be similar as carrier aggregation in LTE LAA. To maximize the BWP utilization efficiency, the BWP bandwidth may be the same as the bandwidth of subband for LBT, i.e. LBT is carrier out on each BWP. When more than one subband LBT success, it requires UE to have the capability to support multiple narrow RF or a wide RF which includes these multiple activated BWPs.

In an example, a single wideband BWP may be activated for a UE within a component carrier. The bandwidth of wideband BWP may be in the unit of subband for LBT. For example, if the subband for LBT is 20 MHz in 5 GHz band, the wideband BWP bandwidth may consist of multiple 20 MHz. The actual transmission bandwidth may be subject to subband with LBT success, which may result in dynamic bandwidth transmission within this active wideband BWP.

In an example, active BWP switching may be achieved by use of scheduling DCI. In an example, the network may indicate to the UE a new active BWP to use for an upcoming, and any subsequent, data transmission/reception. In an example, a UE may monitor multiple, configured BWPs to determine which has been acquired for DL transmissions by the gNB. For example, a UE may be configured with monitoring occasion periodicity and offset for each configured BWP. The UE may attempt to determine if a BWP has been acquired by the gNB during those monitoring occasions. In an example, upon successfully determining that the channel is acquired, the UE may continue with that BWP as its active BWP, at least until indicated otherwise or Maximum Channel Occupancy Time (MCOT) has been reached. In an example, when a UE has determined that a BWP is active, it may attempt blind detection of PDCCH in configured CORESETs and it might also perform measurements on aperiodic or SPS resources.

In an example, for UL transmissions, a UE may be configured with multiple UL resources, possibly in different BWPs. The UE may have multiple LBT configurations, each tied to a BWP and possibly a beam pair link. The UE may be granted UL resources tied to one or more LBT configurations. Similarly, the UE may be provided with multiple AUL/grant-free resources each requiring the use of different LBT configurations. Providing a UE with multiple AUL resources over multiple BWPs may ensure that if LBT fails using a first LBT configuration for one AUL resource in one BWP, a UE can attempt transmission in another AUL resource in another BWP. This may reduce the channel access latency and make better use of the over-all unlicensed carrier.

The carrier aggregation with at least one SCell operating in the unlicensed spectrum may be referred to as Licensed-Assisted Access (LAA). In LAA, the configured set of serving cells for a UE may include at least one SCell operating in the unlicensed spectrum according to a first frame structure (e.g., frame structure Type 3). The SCell may be called LAA SCell.

In an example, if the absence of IEEE802.11n/11 ac devices sharing the carrier cannot be guaranteed on a long term basis (e.g., by level of regulation), and for if the maximum number of unlicensed channels that network may simultaneously transmit on is equal to or less than 4, the maximum frequency separation between any two carrier center frequencies on which LAA SCell transmissions are performed may be less than or equal to 62 MHz. In an example, the UE may be required to support frequency separation.

In an example, base station and UE may apply Listen-Before-Talk (LBT) before performing a transmission on LAA SCell. When LBT is applied, the transmitter may listen to/sense the channel to determine whether the channel is free or busy. If the channel is determined to be free/clear, the transmitter may perform the transmission; otherwise, it may not perform the transmission. In an example, if base station uses channel access signals of other technologies for the purpose of channel access, it may continue to meet the LAA maximum energy detection threshold requirement.

In an example, the combined time of transmissions compliant with the channel access procedure by a base station may not exceed 50 ms in any contiguous 1 second period on an LAA SCell.

In an example, which LBT type (e.g., type 1 or type 2 uplink channel access) the UE applies may be signaled via uplink grant for uplink PUSCH transmission on LAA SCells. In an example, for Autonomous Uplink (AUL) transmissions the LBT may not be signaled in the uplink grant.

In an example, for type 1 uplink channel access on AUL, base station may signal the Channel Access Priority Class for a logical channel and UE may select the highest Channel Access Priority Class (e.g., with a lower number in FIG. 16) of the logical channel(s) with MAC SDU multiplexed into the MAC PDU. In an example, the MAC CEs except padding BSR may use the lowest Channel Access Priority Class.

In an example, for type 2 uplink channel access on AUL, the UE may select logical channels corresponding to any Channel Access Priority Class for UL transmission in the subframes signaled by base station in common downlink control signaling.

In an example, for uplink LAA operation, the base station may not schedule the UE more subframes than the minimum necessary to transmit the traffic corresponding to the selected Channel Access Priority Class or lower (e.g., with a lower number in FIG. 16), than the channel Access Priority Class signaled in UL grant based on the latest BSR and received uplink traffic from the UE if type 1 uplink channel access procedure is signaled to the UE; and/or Channel Access Priority Class used by the base station based on the downlink traffic, the latest BSR and received UL traffic from the UE if type 2 uplink channel access procedure is signaled to the UE.

In an example, a first number (e.g., four) Channel Access Priority Classes may be used when performing uplink and downlink transmissions in LAA carriers. In an example in FIG. 16 shows which Channel Access Priority Class may be used by traffic belonging to the different standardized QCIs. A non-standardized QCI (e.g., Operator specific QCI) may use suitable Channel Access Priority Class based on the FIG. 16 for example, e.g., the Channel Access Priority Class used for a non-standardized QCI should be the Channel Access Priority Class of the standardized QCIs which best matches the traffic class of the non-standardized QCI.

In an example, for uplink, the base station may select the Channel Access Priority Class by taking into account the lowest priority QCI in a Logical Channel Group.

In an example, four Channel Access Priority Classes may be used. If a DL transmission burst with PDSCH is transmitted, for which channel access has been obtained using Channel Access Priority Class P (1 . . . 4), the base station may ensure the following where a DL transmission burst refers to the continuous transmission by base station after a successful LBT: the transmission duration of the DL transmission burst may not exceed the minimum duration needed to transmit all available buffered traffic corresponding to Channel Access Priority Class(es)≤P; the transmission duration of the DL transmission burst may not exceed the Maximum Channel Occupancy Time for Channel Access Priority Class P; and additional traffic corresponding to Channel Access Priority Class(s)>P may be included in the DL transmission burst once no more data corresponding to Channel Access Priority Class ≤P is available for transmission. In such cases, base station may maximize occupancy of the remaining transmission resources in the DL transmission burst with this additional traffic.

In an example, when the PDCCH of an LAA SCell is configured, if cross-carrier scheduling applies to uplink transmission, it may be scheduled for downlink transmission via its PDCCH and for uplink transmission via the PDCCH of one other serving cell. In an example, when the PDCCH of an LAA SCell is configured, if self-scheduling applies to both uplink transmission and downlink transmission, it may be scheduled for uplink transmission and downlink transmission via its PDCCH.

In an example, Autonomous uplink may be supported on the SCells. In an example, one or more autonomous uplink configuration may be supported per SCell. In an example, multiple autonomous uplink configurations may be active simultaneously when there is more than one SCell.

In an example, when autonomous uplink is configured by RRC, the following information may be provided in an AUL configuration information element (e.g., AUL-Config): AUL C-RNTI; HARQ process IDs aul-harq-processes that may be configured for autonomous UL HARQ operation, the time period aul-retransmissionTimer before triggering a new transmission or a retransmission of the same HARQ process using autonomous uplink; the bitmap aul-subframes that indicates the subframes that are configured for autonomous UL HARQ operation.

In an example, when the autonomous uplink configuration is released by RRC, the corresponding configured grant may be cleared.

In an example, if AUL-Config is configured, the MAC entity may consider that a configured uplink grant occurs in those subframes for which aul-subframes is set to 1.

In an example, if AUL confirmation has been triggered and not cancelled, if the MAC entity has UL resources allocated for new transmission for this TTI, the MAC entity may instruct a Multiplexing and Assembly procedure to generate an AUL confirmation MAC Control Element; the MAC entity may cancel the triggered AUL confirmation.

In an example, the MAC entity may clear the configured uplink grant for the SCell in response first transmission of AUL confirmation MAC Control Element triggered by the AUL release for this SCell. In an example, retransmissions for uplink transmissions using autonomous uplink may continue after clearing the corresponding configured uplink grant.

In an example, a MAC entity may be configured with AUL-RNTI for AUL operation. In an example, an uplink grant may be received for a transmission time interval for a Serving Cell on the PDCCH for the MAC entity's AUL C-RNTI. In an example, if the NDI in the received HARQ information is 1, the MAC entity may consider the NDI for the corresponding HARQ process not to have been toggled. The MAC entity may deliver the uplink grant and the associated HARQ information to the HARQ entity for this transmission time interval. In an example, if the NDI in the received HARQ information is 0 and if PDCCH contents indicate AUL release, the MAC entity may trigger an AUL confirmation. If an uplink grant for this TTI has been configured, the MAC entity may consider the NDI bit for the corresponding HARQ process to have been toggled. The MAC entity may deliver the configured uplink grant and the associated HARQ information to the HARQ entity for this TTI. In an example, if the NDI in the received HARQ information is 0 and if PDCCH contents indicate AUL activation, the MAC entity may trigger an AUL confirmation.

In an example, if the aul-retransmissionTimer is not running and if there is no uplink grant previously delivered to the HARQ entity for the same HARQ process; or if the previous uplink grant delivered to the HARQ entity for the same HARQ process was not an uplink grant received for the MAC entity's C-RNTI; or if the HARQ_FEEDBACK is set to ACK for the corresponding HARQ process, the MAC entity may deliver the configured uplink grant, and the associated HARQ information to the HARQ entity for this TTI.

In an example, the NDI transmitted in the PDCCH for the MAC entity's AUL C-RNTI may be set to 0.

In an example, for configured uplink grants, if UL HARQ operation is autonomous, the HARQ Process ID associated with a TTI for transmission on a Serving Cell may be selected by the UE implementation from the HARQ process IDs that are configured for autonomous UL HARQ operation by upper layers for example, in AUL-HARQ-processes.

In an example, for autonomous HARQ, a HARQ process may maintain a state variable e.g., HARQ_FEEDBACK, which may indicate the HARQ feedback for the MAC PDU currently in the buffer, and/or a timer aul-retransmission-Timer which may prohibit new transmission or retransmission for the same HARQ process when the timer is running.

In an example, when the HARQ feedback is received for a TB, the HARQ process may set HARQ_FEEDBACK to the received value; and may stop the aul-retransmission-Timer if running.

In an example, when PUSCH transmission is performed for a TB and if the uplink grant is a configured grant for the MAC entity's AUL C-RNTI, the HARQ process start the aul-retransmissionTimer.

In an example, if the HARQ entity requests a new transmission, the HARQ process may set HARQ_FEED-BACK to NACK if UL HARQ operation is autonomous asynchronous. if the uplink grant was addressed to the AUL C-RNTI, set CURRENT_IRV to 0.

In an example, if aperiodic CSI requested for a TTI, the MAC entity may not generate a MAC PDU for the HARQ entity in case the grant indicated to the HARQ entity is a configured uplink grant activated by the MAC entity's AUL C-RNTI.

In an example, if the UE detects on the scheduling cell for UL transmissions on an LAA SCell a transmission of DCI (e.g., Format 0A/4A) with the CRC scrambled by AUL C-RNTI carrying AUL-DFI, the UE may use the autonomous uplink feedback information according to the following procedures: for a HARQ process configured for autonomous uplink transmission, the corresponding HARQ-ACK feedback may be delivered to higher layers. For the HARQ processes not configured for autonomous uplink transmission, the corresponding HARQ-ACK feedback may not delivered to higher layers; for an uplink transmission in subframe/slot/TTI n, the UE may expect HARQ-ACK feedback in the AUL-DFI at earliest in subframe n+4; If the UE receives AUL-DFI in a subframe indicating ACK for a HARQ process, the UE may not be expected to receive AUL-DFI indicating ACK for the same HARQ process prior to 4 ms after the UE transmits another uplink transmission associated with that HARQ process;

In an example, a UE may validate an autonomous uplink assignment PDCCH/EPDCCH if all the following conditions are met: the CRC parity bits obtained for the PDCCH/EPDCCH payload are scrambled with the AUL C-RNTI; and the 'Flag for AUL differentiation' indicates activating/releasing AUL transmission. In an example, one or more fields in an activation DCI may be pre-configured values for validation.

In an example, a Serving Cell may be configured with one or multiple BWPs. In an example, a maximum number of BWP per Serving Cell may be a first number.

In an example, the BWP switching for a Serving Cell may be used to activate an inactive BWP and deactivate an active BWP at a time. In an example, the BWP switching may be controlled by the PDCCH indicating a downlink assignment or an uplink grant, by the bwp-InactivityTimer, by RRC signaling, or by the MAC entity itself upon initiation of Random Access procedure. In an example, upon/in response to addition of SpCell or activation of an SCell, the DL BWP and UL BWP indicated by firstActiveDownlinkBWP-Id and firstActiveUplinkBWP-Id respectively may be active without receiving PDCCH indicating a downlink assignment or an uplink grant. The active BWP for a Serving Cell may be indicated by either RRC or PDCCH. For unpaired spectrum, a DL BWP may be paired with a UL BWP, and BWP switching may be common for both UL and DL.

In an example, for an activated Serving Cell configured with a BWP, if a BWP is activated, the MAC entity may transmit on UL-SCH on the BWP; may transmit on RACH on the BWP; may monitor the PDCCH on the BWP; may transmit PUCCH on the BWP; may transmit SRS on the BWP; may receive DL-SCH on the BWP; and may (re-) initialize any suspended configured uplink grants of configured grant Type 1 on the active BWP according to the stored configuration, if any, and to start in a symbol.

In an example, for an activated Serving Cell configured with a BWP, if a BWP is deactivated, the MAC entity may not transmit on UL-SCH on the BWP; may not transmit on RACH on the BWP; may not monitor the PDCCH on the BWP; may not transmit PUCCH on the BWP; may not report CSI for the BWP; may not transmit SRS on the BWP; may not receive DL-SCH on the BWP; may clear any configured downlink assignment and configured uplink grant of configured grant Type 2 on the BWP; and may suspend any configured uplink grant of configured grant Type 1 on the inactive BWP.

In an example, upon/in response to initiation of the Random Access procedure on a Serving Cell, if PRACH occasions are not configured for the active UL BWP, the MAC entity may switch the active UL BWP to BWP indicated by initialUplinkBWP and if the Serving Cell is a SpCell, the MAC entity may switch the active DL BWP to BWP indicated by initialDownlinkBWP. The MAC entity may perform the Random Access procedure on the active DL BWP of SpCell and active UL BWP of this Serving Cell.

In an example, upon/in response to initiation of the Random Access procedure on a Serving Cell, if PRACH occasions are configured for the active UL BWP, if the Serving Cell is a SpCell and if the active DL BWP does not have the same bwp-Id as the active UL BWP, the MAC entity may switch the active DL BWP to the DL BWP with the same bwp-Id as the active UL BWP. The MAC entity may perform the Random Access procedure on the active DL BWP of SpCell and active UL BWP of this Serving Cell.

In an example, if the MAC entity receives a PDCCH for BWP switching of a serving cell, if there is no ongoing Random Access procedure associated with this Serving Cell; or if the ongoing Random Access procedure associated with this Serving Cell is successfully completed upon reception of this PDCCH addressed to C-RNTI the MAC entity may perform BWP switching to a BWP indicated by the PDCCH.

In an example, if the MAC entity receives a PDCCH for BWP switching for a Serving Cell while a Random Access procedure associated with that Serving Cell is ongoing in the MAC entity, it may be up to UE implementation whether to switch BWP or ignore the PDCCH for BWP switching, except for the PDCCH reception for BWP switching addressed to the C-RNTI for successful Random Access procedure completion in which case the UE may perform BWP switching to a BWP indicated by the PDCCH. In an example, upon/in response to reception of the PDCCH for BWP switching other than successful contention resolution, if the MAC entity decides to perform BWP switching, the MAC entity may stop the ongoing Random Access procedure and may initiate a Random Access procedure on the new activated BWP; if the MAC decides to ignore the PDCCH for BWP switching, the MAC entity may continue with the ongoing Random Access procedure on the active BWP.

In an example, a UE configured for operation in bandwidth parts (BWPs) of a serving cell, may be configured by higher layers for the serving cell a set of at most X (e.g., four) bandwidth parts (BWPs) for receptions by the UE (DL BWP set) in a DL bandwidth by a parameter (e.g., BWP-Downlink) and a set of at most Y (e.g., four) BWPs for transmissions by the UE (UL BWP set) in an UL bandwidth by a parameter (e.g., BWP-Uplink) for the serving cell.

An initial active DL BWP may be defined by a location and number of contiguous PRBs, a subcarrier spacing, and a cyclic prefix, for the control resource set for Type0-PDCCH common search space. For operation on the primary cell or on a secondary cell, a UE may be provided an initial active UL BWP by higher layer parameter initialuplinkBWP. If the UE is configured with a supplementary carrier, the UE may be provided an initial UL BWP on the supplementary carrier by higher layer parameter (e.g., initialUplinkBWP) in supplementaryUplink.

In an example, if a UE has dedicated BWP configuration, the UE may be provided by a higher layer parameter (e.g., firstActiveDownlinkBWP-Id) a first active DL BWP for receptions and by a higher layer parameter (e.g., firstActiveUplinkBWP-Id) a first active UL BWP for transmissions on the primary cell.

In an example, for each DL BWP or UL BWP in a set of DL BWPs or UL BWPs, respectively, the UE may be configured the following parameters for the serving cell: a subcarrier spacing provided by a higher layer parameter (e.g., subcarrierSpacing); a cyclic prefix provided by a higher layer parameter (e.g., cyclicPrefix); a first PRB and a number of contiguous PRBs indicated by a higher layer parameter (e.g., locationAndBandwidth) that is interpreted as RIV, setting $N_{BWP}^{size}=275$, and the first PRB is a PRB offset relative to the PRB indicated by higher layer parameters (e.g., offsetToCarrier and subcarrierSpacing); an index in the set of DL BWPs or UL BWPs by respective a higher layer parameter (e.g., bwp-Id); a set of BWP-common and a set of BWP-dedicated parameters by higher layer parameters (e.g., bwp-Common and bwp-Dedicated).

In an example, for unpaired spectrum operation, a DL BWP from the set of configured DL BWPs with index provided by higher layer parameter (e.g., bwp-Id) for the DL BWP is linked with an UL BWP from the set of configured UL BWPs with index provided by higher layer parameter (e.g., bwp-Id) for the UL BWP when the DL BWP index and the UL BWP index are equal. In an example, for unpaired spectrum operation, a UE may not expect to receive a configuration where the center frequency for a DL BWP is different than the center frequency for an UL BWP when the bwp-Id of the DL BWP is equal to the bwp-Id of the UL BWP.

In an example, for each DL BWP in a set of DL BWPs on the primary cell, a UE may be configured control resource sets for every type of common search space and for UE-specific search space. In an example, the UE may not expect to be configured without a common search space on the PCell, or on the PSCell, in the active DL BWP.

In an example, for each UL BWP in a set of UL BWPs, the UE may be configured resource sets for PUCCH transmissions.

In an example, a UE may receive PDCCH and PDSCH in a DL BWP according to a configured subcarrier spacing and CP length for the DL BWP. A UE may transmit PUCCH and PUSCH in an UL BWP according to a configured subcarrier spacing and CP length for the UL BWP.

In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

If a bandwidth part indicator field is configured in DCI format 0_1 or DCI format 1_1 and indicates an UL BWP or a DL BWP different from the active UL BWP or DL BWP, respectively, for each information field in the received DCI format 0_1 or DCI format 1_1, in an example, if the size of the information field is smaller than the one required for the DCI format 0_1 or DCI format 1_1 interpretation for the UL BWP or DL BWP that is indicated by the bandwidth part indicator, respectively, the UE may prepend zeros to the information field until its size is the one required for the interpretation of the information field for the UL BWP or DL BWP prior to interpreting the DCI format 0_1 or DCI format 1_1 information fields, respectively. In an example, if the size of the information field is larger than the one required for the DCI format 0_1 or DCI format 1_1 interpretation for the UL BWP or DL BWP that is indicated by the bandwidth part indicator, respectively, the UE may use a number of least significant bits of DCI format 0_1 or DCI format 1_1 equal to the one required for the UL BWP or DL BWP indicated by bandwidth part indicator prior to interpreting the DCI format 0_1 or DCI format 1_1 information fields, respectively. In an example, the UE may set the active UL BWP or DL BWP to the UL BWP or DL BWP indicated by the bandwidth part indicator in the DCI format 0_1 or DCI format 1_1, respectively.

In an example, a UE may expect to detect a DCI format 0_1 indicating active UL BWP change, or a DCI format 1_1 indicating active DL BWP change, if a corresponding PDCCH is received within the first X (e.g., 3) symbols of a slot.

In an example, for the primary cell, a UE may be provided by a higher layer parameter (e.g., defaultDownlinkBWP-Id) a default DL BWP among the configured DL BWPs. In an example, if a UE is not provided a default DL BWP by higher layer parameter defaultDownlinkBWP-Id, the default DL BWP may be the initial active DL BWP.

In an example, if a UE is configured for a secondary cell with higher layer parameter defaultDownlinkBWP-Id indicating a default DL BWP among the configured DL BWPs and the UE is configured with higher layer parameter bwp-InactivityTimer indicating a timer value, the UE procedures on the secondary cell may be same as on the primary cell using the timer value for the secondary cell and the default DL BWP for the secondary cell.

In an example, if a UE is configured by higher layer parameter bwp-InactivityTimer a timer value for the primary cell and the timer is running, the UE may increment the timer every interval of 1 millisecond for frequency range 1 or every 0.5 milliseconds for frequency range 2 if the UE does not detect a DCI format for PDSCH reception on the primary cell for paired spectrum operation or if the UE does not detect a DCI format for PDSCH reception or a DCI format for PUSCH transmission on the primary cell for unpaired spectrum operation during the interval.

In an example, if a UE is configured by higher layer parameter BWP-InactivityTimer a timer value for a secondary cell and the timer is running, the UE may increment the timer every interval of 1 millisecond for frequency range 1 or every 0.5 milliseconds for frequency range 2 if the UE does not detect a DCI format for PDSCH reception on the secondary cell for paired spectrum operation or if the UE does not detect a DCI format for PDSCH reception or a DCI format for PUSCH transmission on the secondary cell for unpaired spectrum operation during the interval. In an example, the UE may deactivate the secondary cell when the timer expires.

In an example, if a UE is configured by higher layer parameter firstActiveDownlinkBWP-Id a first active DL BWP and by higher layer parameter firstActiveUplinkBWP-Id a first active UL BWP on a secondary cell or supplementary carrier, the UE uses the indicated DL BWP and the indicated UL BWP on the secondary cell as the respective first active DL BWP and first active UL BWP on the secondary cell or supplementary carrier.

In an example, for paired spectrum operation, a UE does not expect to transmit HARQ-ACK information on a PUCCH resource indicated by a DCI format 1_0 or a DCI format 1_1 if the UE changes its active UL BWP on the PCell between a time of a detection of the DCI format 1_0 or the DCI format 1_1 and a time of a corresponding HARQ-ACK information transmission on the PUCCH.

In an example, a UE may not expect to monitor PDCCH when the UE performs RRM over a bandwidth that is not within the active DL BWP for the UE.

In an example, a BWP IE may be used to configure a bandwidth part. In an example, for each serving cell the network may configure at least an initial bandwidth part comprising of at least a downlink bandwidth part and one (if the serving cell is configured with an uplink) or two (if using supplementary uplink (SUL)) uplink bandwidth parts. Furthermore, the network may configure additional uplink and downlink bandwidth parts for a serving cell.

In an example, the bandwidth part configuration may be split into uplink and downlink parameters and into common and dedicated parameters. Common parameters (in BWP-UplinkCommon and BWP-DownlinkCommon) may be "cell specific" and the network ensures the necessary alignment with corresponding parameters of other UEs. The common parameters of the initial bandwidth part of the PCell may be provided via system information. In an example, the network may provide the common parameters via dedicated signaling.

In an example, cyclic prefix may indicate whether to use the extended cyclic prefix for this bandwidth part. If not set, the UE may use the normal cyclic prefix. Normal CP may be supported for all numerologies and slot formats. Extended CP may be supported only for 60 kHz subcarrier spacing. In an example, locationAndBanddwidth may indicate frequency domain location and bandwidth of this bandwidth part. The value of the field may be interpreted as resource indicator value (RIV). The first PRB may be a PRB determined by subcarrierSpacing of this BWP and offsetToCarrier (configured in SCS-SpecificCarrier contained within FrequencyInfoDL) corresponding to this subcarrier spacing. In case of TDD, a BWP-pair (UL BWP and DL BWP with the same bwp-Id) may have the same center frequency. In an example, subcarrierSpacing may indicate subcarrier spacing to be used in this BWP for all channels and reference signals unless explicitly configured elsewhere. In an example, the value kHz15 may corresponds to $\mu$=0, kHz30 to $\mu$=1, and so on. In an example, the values 15, 30, or 60 kHz may be used. In an example, bwp-Id may indicate an identifier for this bandwidth part. Other parts of the RRC configuration may use the BWP-Id to associate themselves with a particular bandwidth part. The BWP ID=0 may be associated with the initial BWP and may hence not be used here (in other bandwidth parts). The NW may trigger the UE to switch UL or DL BWP using a DCI field. The four code points in that DCI field may map to the RRC-configured BWP-ID as follows: For up to 3 configured BWPs (in addition to the initial BWP) the DCI code point may be equivalent to the BWP ID (initial=0, first dedicated=1, . . . ). If the NW configures 4 dedicated bandwidth parts, they may be identified by DCI code points 0 to 3. In this case it is not possible to switch to the initial BWP using the DCI field. In an example, bwp-Id may indicate an identifier for this bandwidth part. Other parts of the RRC configuration may use the BWP-Id to associate themselves with a particular bandwidth part. The BWP ID=0 may be associated with the initial BWP and may hence may not be used here (in other bandwidth parts). The NW may trigger the UE to switch UL or DL BWP using a DCI field. The four code points in that DCI field map to the RRC-configured BWP-ID as follows: For up to 3 configured BWPs (in addition to the initial BWP) the DCI code point may be equivalent to the BWP ID (initial=0, first dedicated=1, . . . ). If the NW configures 4 dedicated bandwidth parts, they may be identified by DCI code points 0 to 3. In this case it may not be possible to switch to the initial BWP using the DCI field. In an example, rach-ConfigCommon may indicate configuration of cell specific random access parameters which the UE may use for contention based and contention free random access as well as for contention based beam failure recovery. In an example, the NW may configure SSB-based RA (and hence RACH-ConfigCommon) only for UL BWPs if the linked DL BWPs allows the UE to acquire the SSB associated to the serving cell. In an example, PUCCH-config may indicate PUCCH configuration for one BWP of the regular UL or SUL of a serving cell. If the UE is configured with SUL, the network may configure PUCCH only on the BWPs of one of the uplinks (UL or SUL).

In an example, an information element (e.g., LBT-Config) may indicate one or more parameters for listen before talk operation at the wireless device. In an example, maxEnergyDetectionThreshold may indicate an absolute maximum energy detection threshold value. In an example, the units of maxEnergyDetectionThreshold may be in dBm. For example, value −85 may correspond to −85 dBm, value −84 may correspond to −84 dBm, and so on (e.g., in steps of 1 dBm). If the field is not configured, the UE shall use a default maximum energy detection threshold value. In an example, energyDetectionThresholdOffset may indicate an offset to the default maximum energy detection threshold value. The unit of energyDetectionThresholdOffset may be in dB. For example, value −13 may correspond to −13 dB, value −12 may correspond to −12 dB, and so on (e.g., in steps of 1 dB). In an example, an information element (e.g., laa-SCellSubframeConfig) may indicate a bit-map indicating unlicensed SCell subframe configuration. For example, 1 denotes that the corresponding subframe is allocated as MBSFN subframe. The bitmap may be interpreted as follows: Starting from the first/leftmost bit in the bitmap, the allocation applies to subframes #1, #2, #3, #4, #6, #7, #8, and #9. In an example, a cell/bandwidth part may be configured with an information element (e.g., CrossCarrierSchedulingConfigLAA) that may indicate a scheduling cell ID and a CIF value. In an example, an information element schedulingCellId may indicate which cell signals the downlink allocations and uplink grants, if applicable, for the concerned SCell. In case the UE is configured with DC, the scheduling cell may be part of the same cell group (e.g., MCG or SCG) as the scheduled cell. In case the UE is configured with crossCarrierSchedulingConfigLAA-UL, schedulingCellId indicated in crossCarrierSchedulingConfigLAA-UL may indicate which cell signals the uplink grants. In an example, an information element (e.g., cifInSchedulingCell) may indicate the CIF value used in the scheduling cell to indicate the cell.

In an example, a UE and a base station scheduling UL transmission(s) for the UE may perform channel access procedures for the UE to access the channel(s) on which the unlicensed Scell(s) transmission(s) are performed.

In an example, the UE may access a carrier on which unlicensed Scell(s) UL transmission(s) are performed according to one of a plurality of channel access procedures. In an example, the plurality of channel access procedures may comprise a first Type or a second Type UL channel access procedures.

In an example, if an UL grant scheduling a PUSCH transmission indicates a first Type channel access procedure, the UE may use the first Type channel access procedure for transmitting transmissions including the PUSCH transmission.

In an example, a UE may use a first Type channel access procedure for transmitting transmissions including the PUSCH transmission on autonomous UL resources.

In an example, if an UL grant scheduling a PUSCH transmission indicates a second Type channel access procedure, the UE may use the second Type channel access procedure for transmitting transmissions including the PUSCH transmission.

Figure 17:
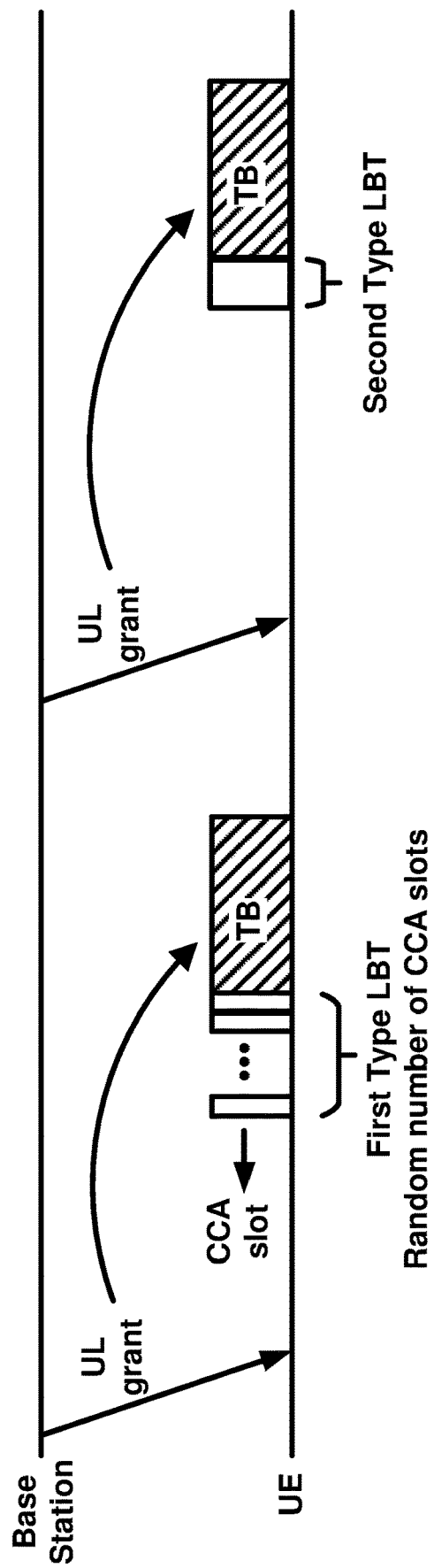
FIG. 17 is a diagram of an example Listen Before Talk (LBT) as per an aspect of an embodiment of the present disclosure.

In an example and as shown in FIG. 17, channel access procedure for transmission of a first PUSCH may be based on a first Type channel access. The first Type channel access may be based on sensing the channel for a first number of durations (e.g., CCA slots). The first duration may have a first fixed value. The first number may be based on a random number drawn from an interval based on the priority class. In an example, channel access procedure for transmission of a second PUSCH may be based on a second Type channel access. The second Type channel access procedure may be based on sensing the channel based on a second fixed duration.

In an example, the UE may use the first Type channel access procedure for transmitting SRS transmissions not including a PUSCH transmission. In an example, UL channel access priority class p=1 may be used for SRS transmissions not including a PUSCH.

In an example, if the UE is scheduled to transmit PUSCH and SRS in subframe/slot/mini-slot/TTI n, and if the UE cannot access the channel for PUSCH transmission in subframe/slot/mini-slot/TTI n, the UE may attempt to make SRS transmission in subframe/slot/mini-slot/TTI n according to uplink channel access procedures specified for SRS transmission.

In an example, channel access priority classes and its associated parameters are shown in FIG. 16. In an example, for p=3, 4, $T_{ulm\_cot,p}$ may be 10 ms if a higher layer parameter (e.g., absenceOfAnyOtherTechnology) indicates TRUE, otherwise, $T_{ulm\_cot,p}$ be 6 ms.

In an example, when $T_{ulm\_cot,p}$ is Ems it may be increased to 8 ms by inserting one or more gaps. The minimum duration of a gap may be 100 μs. The maximum duration before including any such gap may be 6 ms.

In an example, if a first field (e.g., an UL duration and offset field) configures an UL offset l and an UL duration d for subframe/slot/mini-slot/TTI n, the scheduled UE may use the second Type channel access for transmissions in subframes/slots/mini-slots/TTIs n+l+i where i=0, 1, . . . d−1, irrespective of the channel access Type signaled in the UL grant for those subframes/slots/mini-slots/TTIs, if the end of UE transmission occurs in or before subframe/slot/mini-slot/TTI n+l+d−1.

In an example, if one or more first fields (e.g., an UL duration and offset field) configure an UL offset l and an UL duration d for subframe/slot/mini-slot/TTI n and one or more second fields (e.g., COT sharing indication for AUL field) are set to true, a UE configured with autonomous UL may use the second Type channel access for autonomous UL transmissions corresponding to any priority class in subframes/slots/mini-slots/TTIs n+l+i where i=0, 1, . . . d−1, if the end of UE autonomous UL transmission occurs in or before subframe/slot/mini-slot/TTI n+l+d−1 and the autonomous UL transmission between n+l and n+l+d−1 may be contiguous.

In an example, if one or more first fields (e.g., an UL duration and offset field) configures an UL offset l and an UL duration d for subframe/slot/mini-slot/TTI n and one or more second fields (e.g., a COT sharing indication for AUL field) is set to false, a UE configured with autonomous UL may not transmit autonomous UL in subframes/slots/mini-slots/TTIs n+l+i where i=0, 1, . . . d−1.

In an example, if the UE scheduled to transmit transmissions including PUSCH in a set subframes/slots/mini-slots/TTIs $n_0, n_1, \ldots, n_{w-1}$ using one or more PDCCH DCI Formats and if the UE cannot access the channel for a transmission in subframe/slot/mini-slot/TTI $n_k$, the UE may attempt to make a transmission in subframe/slot/mini-slot/TTI $n_{k+1}$ according to a channel access type indicated in the DCI, where k∈{0, 1, . . . w−2}, and w is the number of scheduled subframes/slots/mini-slots/TTIs indicated in the DCI.

In an example, if the UE is scheduled to transmit transmissions without gaps including PUSCH in a set of subframes/slots/mini-slots/TTIs $n_0, n_1, \ldots, n_{w-1}$ using one or more PDCCH DCI Formats and the UE performs a transmission in subframe/slot/mini-slot/TTI $n_k$ after accessing the carrier according to one of first Type or second Type UL channel access procedures, the UE may continue transmission in subframes/slots/mini-slots/TTIs after $n_k$ where $k \in \{0, 1, \ldots w-1\}$.

In an example, if the beginning of UE transmission in subframe/slot/mini-slot/TTI n+1 immediately follows the end of UE transmission in subframe/slot/mini-slot/TTI n, the UE may not be expected to be indicated with different channel access types for the transmissions in those subframes/slots/mini-slots/TTIs.

In an example, if a UE is scheduled to transmit transmissions including a first mode PUSCH in a set subframes/slots/mini-slots/TTIs $n_0, n_1, \ldots, n_{w-1}$ using one or more PDCCH DCI Formats and a first Type channel access procedure, and if the UE cannot access the channel for a transmission in subframe/slot/mini-slot/TTI $n_k$ according to the PUSCH starting position indicated in the DCI, the UE may attempt to make a transmission in subframe/slot/mini-slot/TTI $n_k$ with an offset of $o_i$ OFDM symbol and according to the channel access type indicated in the DCI, where $k \in \{0, 1, \ldots w-1\}$ and $i \in \{0,7\}$, for i=0 the attempt is made at the PUSCH starting position indicated in the DCI, and w is the number of scheduled subframes/slots/mini-slots/TTIs indicated in the DCI. In an example, there may be no limit on the number of attempts the UE should make for the transmission.

In an example, if the UE is scheduled to transmit transmissions including a first mode PUSCH in a set subframes/slots/mini-slots/TTIs $n_0, n_1, \ldots, n_{w-1}$ using one or more PDCCH DCIs and a second Type channel access procedure, and if the UE cannot access the channel for a transmission in subframe/slot/mini-slot/TTI $n_k$ according to the PUSCH starting position indicated in the DCI, the UE may attempt to make a transmission in subframe/slot/mini-slot/TTI $n_k$ with an offset of $o_i$ OFDM symbol and according to the channel access type indicated in the DCI, where $k \in \{0, 1, \ldots w-1\}$ and $i \in \{0,7\}$, for i the attempt is made at the PUSCH starting position indicated in the DCI, and w is the number of scheduled subframes/slots/mini-slots/TTIs indicated in the DCI. In an example, the number of attempts the UE may make for the transmission may be limited to w+1, where w is the number of scheduled subframes/slots/mini-slots/TTIs indicated in the DCI.

In an example, if a UE is scheduled to transmit without gaps in subframes/slots/mini-slots/TTIs $n_0, n_1, \ldots, n_{w-1}$ using one or more PDCCH DCI Formats, and if the UE has stopped transmitting during or before subframe/slot/mini-slot/TTI $n_{k1}$, $k1 \in \{0, 1, \ldots w-2\}$, and if the channel is sensed by the UE to be continuously idle after the UE has stopped transmitting, the UE may transmit in a later subframe/slot/mini-slot/TTI $n_{k2}$, $k2 \in \{1, \ldots w-1\}$ using a second Type channel access procedure. If the channel sensed by the UE is not continuously idle after the UE has stopped transmitting, the UE may transmit in a later subframe/slot/mini-slot/TTI $n_{k2}$, $k2 \in \{1, \ldots w-1\}$ using a first Type channel access procedure with the UL channel access priority class indicated in the DCI corresponding to subframe/slot/mini-slot/TTI $n_{k2}$.

In an example, if the UE receives an UL grant and the DCI indicates a PUSCH transmission starting in subframe/slot/mini-slot/TTI n using s first Type channel access procedure, and if the UE has an ongoing first Type channel access procedure before subframe/slot/mini-slot/TTI n: if a UL channel access priority class value $p_1$ used for the ongoing first Type channel access procedure is same or larger than the UL channel access priority class value $p_2$ indicated in the DCI, the UE may transmit the PUSCH transmission in response to the UL grant by accessing the carrier by using the ongoing first Type channel access procedure.

In an example, if the UE receives an UL grant and the DCI indicates a PUSCH transmission starting in subframe/slot/mini-slot/TTI n using s first Type channel access procedure, and if the UE has an ongoing first Type channel access procedure before subframe/slot/mini-slot/TTI n: if the UL channel access priority class value $p_1$ used for the ongoing first Type channel access procedure is smaller than the UL channel access priority class value $p_2$ indicated in the DCI, the UE may terminate the ongoing channel access procedure.

In an example, if the UE is scheduled to transmit on a set of carriers C in subframe/slot/mini-slot/TTI n, and if the UL grants scheduling PUSCH transmissions on the set of carriers C indicate a first Type channel access procedure, and if the same PUSCH starting position is indicated for all carriers in the set of carriers C, or if the UE intends to perform an autonomous uplink transmission on the set of carriers C in subframe/slot/mini-slot/TTI n with first Type channel access procedure, and if the same $N_{Start}^{FS3}$ is used for all carriers in the set of carriers C: the UE may transmit on carrier $c_i \in C$ using a second Type channel access procedure, if the second Type channel access procedure is performed on carrier $c_i$ immediately before the UE transmission on carrier $c_j \in C$, $i \neq j$, and if the UE has accessed carrier $c_j$ using first Type channel access procedure, where carrier $c_j$ is selected by the UE uniformly randomly from the set of carriers C before performing the first Type channel access procedure on any carrier in the set of carriers C.

In an example, if the UE is scheduled to transmit on carrier $c_i$ by a UL grant received on carrier $c_j$, $i \neq j$, and if the UE is transmitting using autonomous UL on carrier $c_i$, the UE may terminate the ongoing PUSCH transmissions using the autonomous UL at least one subframe/slot/mini-slot/TTI before the UL transmission according to the received UL grant.

In an example, if the UE is scheduled by a UL grant received on a carrier to transmit a PUSCH transmission(s) starting from subframe/slot/mini-slot/TTI n on the same carrier using first Type channel access procedure and if at least for the first scheduled subframe/slot/mini-slot/TTI occupies $N_{RB}^{UL}$ resource blocks and the indicated 'PUSCH starting position is OFDM symbol zero, and if the UE starts autonomous UL transmissions before subframe/slot/mini-slot/TTI n using first Type channel access procedure on the same carrier, the UE may transmit UL transmission(s) according to the received UL grant from subframe/slot/mini-slot/TTI n without a gap, if the priority class value of the performed channel access procedure is larger than or equal to priority class value indicated in the UL grant, and the autonomous UL transmission in the subframe/slot/mini-slot/TTI preceding subframe/slot/mini-slot/TTI n may end at the last OFDM symbol of the subframe/slot/mini-slot/TTI regardless of the higher layer parameter AulEndingPosition. The sum of the lengths of the autonomous UL transmission(s) and the scheduled UL transmission(s) may not exceed the maximum channel occupancy time corresponding to the priority class value used to perform the autonomous uplink channel access procedure. Otherwise, the UE may terminate the ongoing autonomous UL transmission at least one subframe/slot/mini-slot/TTI before the start of the UL transmission according to the received UL grant on the same carrier.

In an example, a base station may indicate a second Type channel access procedure in the DCI of an UL grant scheduling transmission(s) including PUSCH on a carrier in subframe/slot/mini-slot/TTI n when the base station has transmitted on the carrier according to a channel access procedure, or when a base station may indicate using the 'UL duration and offset' field that the UE may perform a second Type channel access procedure for transmissions(s) including PUSCH on a carrier in subframe/slot/mini-slot/TTI n when the base station has transmitted on the carrier according to a channel access procedure, or when a base station may indicate using the 'UL duration and offset' field and 'COT sharing indication for AUL' field that a UE configured with autonomous UL may perform a second Type channel access procedure for autonomous UL transmissions(s) including PUSCH on a carrier in subframe/slot/mini-slot/TTI n when the base station has transmitted on the carrier according to a channel access procedure and acquired the channel using the largest priority class value and the base station transmission includes PDSCH, or when or when a base station may schedule transmissions including PUSCH on a carrier in subframe/slot/mini-slot/TTI n, that follows a transmission by the base station on that carrier with a duration of $T_{short\_ul}$=25 us, if subframe/slot/mini-slot/TTI n occurs within the time interval starting at $t_0$ and ending at $t_0+T_{CO}$, where $T_{CO}=T_{m\,cot,p}+T_g$, where $t_0$ may be the time instant when the base station has started transmission, $T_{m\,cot,p}$ value may be determined by the base station, $T_g$ may be total duration of all gaps of duration greater than 25 us that occur between the DL transmission of the base station and UL transmissions scheduled by the base station, and between any two UL transmissions scheduled by the base station starting from $t_0$.

In an example, the base station may schedule UL transmissions between $t_0$ and $t_0+T_{CO}$ in contiguous subframes/slots/mini-slots/TTIs if they can be scheduled contiguously.

In an example, for an UL transmission on a carrier that follows a transmission by the base station on that carrier within a duration of $T_{short\_ul}$=25 us, the UE may use a second Type channel access procedure for the UL transmission.

In an example, if the base station indicates second Type channel access procedure for the UE in the DCI, the base station may indicate the channel access priority class used to obtain access to the channel in the DCI.

In an example, the UE may transmit the transmission using first Type channel access procedure after first sensing the channel to be idle during the slot durations of a defer duration $T_d$; and after the counter N is zero in step 4. In an example, the counter N may be adjusted by sensing the channel for additional slot duration(s) according to a procedure.

In an example, if the UE has not transmitted a transmission including PUSCH or SRS on a carrier on which unlicensed Scell(s) transmission(s) are performed, the UE may transmit a transmission including PUSCH or SRS on the carrier, if the channel is sensed to be idle at least in a slot duration $T_{sl}$ when the UE is ready to transmit the transmission including PUSCH or SRS, and if the channel has been sensed to be idle during all the slot durations of a defer duration $T_d$ immediately before the transmission including PUSCH or SRS. If the channel has not been sensed to be idle in a slot duration $T_{sl}$ when the UE first senses the channel after it is ready to transmit, or if the channel has not been sensed to be idle during any of the slot durations of a defer duration $T_d$ immediately before the intended transmission including PUSCH or SRS, the UE may proceeds to step 1 after sensing the channel to be idle during the slot durations of a defer duration $T_d$.

In an example, the defer duration $T_d$ may consist of duration $T_f$=16 us immediately followed by $m_p$ consecutive slot durations where each slot duration is $T_{sl}$=9 us, and $T_f$ may include an idle slot duration $T_{sl}$ at start of $T_f$.

In an example, a slot duration $T_{sl}$ may be considered to be idle if the UE senses the channel during the slot duration, and the power detected by the UE for at least 4 us within the slot duration is less than energy detection threshold $X_{Thresh}$. Otherwise, the slot duration $T_{sl}$ may be considered to be busy.

In an example, $CW_{min,p} \le CW_p \le CW_{max,p}$ may be the contention window. In an example, $CW_{min,p}$ and $CW_{max,p}$ may be chosen before the channel access procedure. In an example, $m_p$, $CW_{min,p}$, and $CW_{max,p}$ may be based on channel access priority class signaled to the UE, as shown in FIG. 16.

In an example, if the UL UE uses second Type channel access procedure for a transmission including PUSCH, the UE may transmit the transmission including PUSCH immediately after sensing the channel to be idle for at least a sensing interval $T_{short\_ul}$=25 us. In an example, $T_{short\_ul}$ may consists of a duration $T_f$=16 us immediately followed by one slot duration $T_{sl}$=9 us and $T_f$ may include an idle slot duration $T_{sl}$ at start of $T_f$. The channel may be considered to be idle for $T_{short\_ul}$ if it is sensed to be idle during the slot durations of $T_{short\_ul}$.

In an example, if the UE transmits transmissions using a first Type channel access procedure that are associated with channel access priority class p on a carrier, the UE may maintain the contention window value $CW_p$ and may adjust $CW_p$ for those transmissions before the channel access procedure.

In an example, if the UE receives an UL grant or an AUL-DFI, the contention window size for the priority classes may be adjusted as following:

if the NDI value for at least one HARQ process associated with HARQ_ID_ref is toggled, or if the HARQ-ACK value(s) for at least one of the HARQ processes associated with HARQ_ID_ref received in the earliest AUL-DFI after $n_{ref}$+3 indicates ACK: for every priority class p∈{1,2,3,4} set $CW_p=CW_{min,p}$. Otherwise, $CW_p$ may be increased for every priority class p∈{1,2,3,4} to the next higher allowed value.

In an example, if there exist one or more previous transmissions {$T_0, \ldots, T_n$} using the first Type channel access procedure, from the start subframe(s)/slot(s)/mini-slot(s)/TTI(s) of the previous transmission(s) of which, N or more subframes/slots/mini-slots/TTIs have elapsed and neither UL grant nor AUL-DFI was received, where N=max (Contention Window Size adjustment timer X, $T_i$ burst length+1) if X>0 and N=0 otherwise, for each transmission $T_i$, $CW_p$ is adjusted as following:

increase $CW_p$ for every priority class p∈{1,2,3,4} to the next higher allowed value; The $CW_p$ is adjusted once. Otherwise if the UE transmits transmissions using first Type channel access procedure before N subframes/slots/mini-slots/TTIs have elapsed from the start of previous UL transmission burst using first Type channel access procedure and neither UL grant nor AUL-DFI is received, the $CW_p$ is unchanged.

In an example, if the UE receives an UL grant or an AUL-DFI indicates feedback for one or more previous transmissions $\{T_0, \ldots, T_n\}$ using first Type channel access procedure, from the start subframe(s)/slot(s)/mini-slot(s)/TTI(s) of the previous transmission(s) of which, N or more subframes/slots/mini-slots/TTIs have elapsed and neither UL grant nor AUL-DFI was received, where N=max (Contention Window Size adjustment timer X, $T_i$ burst length+1) if X>0 and N=0 otherwise, the UE may recompute $CW_p$ as follows: the UE reverts $CW_p$ to the value used to transmit at $n_{T0}$ using first Type channel access procedure; the UE updates $CW_p$ sequentially in the order of the transmission $\{T_0, \ldots, T_n\}$. If the NDI value for at least one HARQ process associated with HARQ_ID_ref is toggled, or if the HARQ-ACK value(s) for at least one of the HARQ processes associated with HARQ_ID_ref received in the earliest AUL-DFI after $n_{Ti}+3$ indicates ACK. For every priority class $p \in \{1,2,3,4\}$ set $CW_p = CW_{min,p}$ Otherwise, increase $CW_p$ for every priority class $p \in \{1,2,3,4\}$ to the next higher allowed value.

If the UE transmits transmissions using first Type channel access procedure before N subframes/slots/mini-slots/TTIs have elapsed from the start of previous UL transmission burst using first Type channel access procedure and neither UL grant nor AUL-DFI is received, the $CW_p$ may be unchanged.

In an example, the HARQ_ID_ref may be the HARQ process ID of UL-SCH in reference subframe/slot/mini-slot/TTI $n_{ref}$. The reference subframe/slot/mini-slot/TTI $n_{ref}$ may be determined as follows: If the UE receives an UL grant or an AUL-DFI in subframe/slot/mini-slot/TTI $n_{ref}$, subframe/slot/mini-slot/TTI $n_w$ may be the most recent subframe/slot/mini-slot/TTI before subframe/slot/mini-slot/TTI $n_g-3$ in which the UE has transmitted UL-SCH using first Type channel access procedure. In an example, if the UE transmits transmissions including UL-SCH without gaps starting with subframe/slot/mini-slot/TTI $n_0$ and in subframes/slots/mini-slots/TTIs $n_0, n_1, \ldots, n_w$, and the UL-SCH in subframe/slot/mini-slot/TTI $n_0$ is not PUSCH Mode 1 that starts in the second slot of the subframe/slot/mini-slot/TTI, reference subframe/slot/mini-slot/TTI $n_{ref}$ may be subframe/slot/mini-slot/TTI $n_0$. In an example, if the UE transmits transmissions including a first PUSCH Mode without gaps starting with second slot of subframe/slot/mini-slot/TTI $n_0$ and in subframe/slot/mini-slot/TTI $n_0, n_1, \ldots, n_w$, and the, reference subframe/slot/mini-slot/TTI $n_{ref}$ is subframe/slot/mini-slot/TTI $n_0$ and $n_1$, otherwise, reference subframe/slot/mini-slot/TTI $n_{ref}$ may be subframe/slot/mini-slot/TTI $n_w$.

In an example, HARQ_ID_ref may be the HARQ process ID of UL-SCH in reference subframe/slot/mini-slot/TTI $n_{Ti}$. The reference subframe/slot/mini-slot/TTI $n_{Ti}$ may be determined as the start subframe/slot/mini-slot/TTI of a transmission $T_i$ using a first Type channel access procedure and of which, N subframes/slots/mini-slots/TTIs have elapsed and neither UL grant nor AUL-DFI was received.

In an example, if the AUL-DFI with a first DCI format is indicated to a UE that is activated with AUL transmission and a second transmission mode is configured for the UE for grant-based uplink transmissions, the spatial HARQ-ACK bundling may be performed by logical OR operation across multiple codewords for the HARQ process not configured for autonomous UL transmission.

In an example, if $CW_p$ changes during an ongoing channel access procedure, the UE may draw a counter $N_{init}$ and applies it to the ongoing channel access procedure.

In an example, the UE may keep the value of $CW_p$ unchanged for every priority class $p \in \{1,2,3,4\}$, if the UE is scheduled to transmit transmissions without gaps including PUSCH in a set of subframes/slots/mini-slots/TTIs $n_0$, $n_1, \ldots, n_{w-1}$ using a first Type channel access procedure, and if the UE is not able to transmit any transmission including PUSCH in the set of subframes/slots/mini-slots/TTIs.

In an example, the UE may keep the value of $CW_p$ for every priority class $p \in \{1,2,3,4\}$ the same as that for the last scheduled transmission including PUSCH using first Type channel access procedure, if the reference subframe/slot/mini-slot/TTI for the last scheduled transmission is also $n_{ref}$.

In an example, if $CW_p = CW_{max,p}$, the next higher allowed value for adjusting $CW_p$ is $CW_{max,p}$.

In an example, if the $CW_p = CW_{max,p}$ is consecutively used K times for generation of $N_{init}$, $CW_p$ may be reset to $CW_{min,p}$ for that priority class p for which $CW_p = CW_{max,p}$ is consecutively used K times for generation of $N_{init}$. In an example, K may be selected by UE from the set of values $\{1, 2, \ldots, 8\}$ for a priority class $p \in \{1,2,3,4\}$.

In an example, a UE accessing a carrier on which LAA Scell(s) transmission(s) are performed, may set the energy detection threshold ($X_{Thresh}$) to be less than or equal to the maximum energy detection threshold $X_{Thresh\_max}$.

In an example, if the UE is configured with higher layer parameter maxEnergyDetectionThreshold, $X_{Thresh\_max}$ may be set equal to the value signaled by the higher layer parameter. Otherwise, the UE may determine $X'_{Thresh\_max}$ according to a first procedure for determining energy detection threshold. In an example, if the UE is configured with higher layer parameter energyDetectionThresholdOffset, $X_{Thresh\_max}$ may be set by adjusting $X'_{Thresh\_max}$ according to the offset value signaled by the higher layer parameter. Otherwise, the UE may set $X_{Thresh\_max} = X'_{Thresh\_max}$.

In an example, the first procedure for determining the energy detection threshold may be as follows: if the higher layer parameter absenceOfAnyOtherTechnology indicates TRUE, $$X'_{Thresh\_max} = \min\left\{\frac{T_{max}}{X_r}\right\}$$

where $X_r$ is Maximum energy detection threshold defined by regulatory requirements in dBm when such requirements are defined, otherwise $X_r = T_{max}$. Otherwise, $X'$max $$\left\{\begin{array}{l} -72 + 10 \cdot \log10(BWMHz/20\ MHz) \to dBm, \\ \min\left\{\begin{array}{l} T_{max}, \\ TA(P_H + 10 \cdot \log10(BWMHz/20\ MHz) \to -P_{TX})_{max} \end{array}\right\} \end{array}\right\}_{Thres\_max},$$

where $T_A = 10$ dB, $P_H = 23$ dBm; $P_{TX}$ may be the set to the value of PCMAX_H,c; TdBm log 1 $(3.16228 \cdot 10^{-8}$ (mW/MHz)·BWMHz (MHz)$)_{max}$; BWMHz may be the single carrier bandwidth in MHz.

Fifth generation (5G) new radio (NR) may support configuration of one or more bandwidth parts for a cell. In an example, the channel bandwidth per NR carrier/cell may be up to 100 MHz for sub 6 GHz and 400 MHz for above 6 GHz. NR on unlicensed spectrum (NR-U) may support transmissions with wide bandwidths, (e.g., several hundreds of MHz bandwidth). When a device senses a channel over a wide bandwidth, the likelihood of sensing a clear channel is lower (e.g., compared with sensing a narrower bandwidth channel), especially during high load conditions. NR-U may support transmissions with dynamic bandwidths, (e.g., ranging from 10 MHz to 400 MHz or more). In an example, a carrier may be considered a wideband carrier when the bandwidth is greater than a first value, (e.g., 20 MHz, 40 MHz, and/or the like). In an example, a bandwidth part may be considered a wideband bandwidth part when the bandwidth is greater than a first value, (e.g., 20 MHz, 40 MHz, and/or the like). A base station may transmit RRC messages to configure one or more cells. In an example, a cell may comprise multiple sub-bands. In an example, a cell may comprise one or more BWPs. A BWP may comprise multiple sub-bands. A cell comprises downlink and uplink control and data channels. A sub-band comprises multiple contiguous resource blocks of a cell/carrier.

Various mechanisms may be used for a wireless device to perform wideband transmission, such as for example: carrier aggregation (CA), wideband carrier transmissions, combinations thereof, and/or the like. In existing CA transmissions (similar to LTE-based LAA), the device may perform an LBT procedure per component carrier or cell so that the wireless device transmits on a component carrier (CC) or cell when the channel of the CC or cell is clear. In an example, when a wireless device is configured with a wideband carrier, the wireless device may perform an LBT procedure per sub-band and aggregate resources from clear sub-bands via at least one physical channel. In an example, in wideband carrier transmissions, a device may perform an LBT procedure over the wideband and transmit over the wideband carrier via at least one physical channel when the wideband carrier is clear. In an example, different UEs may communicate on different bandwidth sizes and transmit with different numbers of RBs or sub-bands depending on their LBT outcomes. There are multiple LBT types for different categories (e.g., LBT CAT2 procedure and LBT CAT4 procedure). For example, an LBT CAT2 procedure may be performed during a short period of time (e.g., 25 microseconds), and an LBT CAT4 procedure may be performed over a longer period of time including counter operation periods and/or timer windows.

In an example, a base station may configure multiple unlicensed component carriers including wideband carriers (e.g., using carrier aggregation (CA) mechanism(s) for unlicensed carriers). In an example existing implementation, a UE may perform an LBT procedure over a wide bandwidth (e.g., a wideband carrier/cell) of one or more carriers/cells. This process may be simple to implement and may utilize at least a wideband carrier if the LBT procedure is successful. This approach may be inefficient because performing LBT for a carrier that has a wide bandwidth may result in increased LBT failure probability. For example, a wideband LBT procedure of wideband carrier/cell or BWP may fail due to interfering transmissions over certain sub-band(s) of the wide bandwidth carrier/cell or BWP. For example, an LTE-LAA or Wi-Fi transmission with a 20 MHz bandwidth may interfere a wide bandwidth carrier with 40 MHz bandwidth. In an example existing implementation, a wireless device may perform an LBT procedure with a back-off (e.g., an LBT CAT4, long LBT) across different sub-bands of a wideband carrier/cell or a wideband BWP. This may lower the possibility of indicating a clear channel, and may increase UE processing requirements and battery power consumption of the LBT procedure. In an example existing implementation, a wireless device may perform a short LBT procedure (e.g., an LBT CAT2) across different sub-bands of a wideband carrier/cell or a bandwidth part. This may increase the possibility of indicating a clear channel when the channel is not clear resulting in higher false LBT result.

Implementation existing of sub-band based LBT procedures when a carrier/cell or a BWP comprises multiple sub-bands may result in increased battery power consumption, excessive LBT failures, or false LBT results. There has been some implementation to enhance LBT process by dynamically adjusting the sub-band size of a carrier/cell/BWP or grouping of sub-bands of a carrier/cell/BWP during the LBT process. The existing implementation may take a long processing time without efficiency of improving LBT process and power consumption.

There is a need for an efficient channel access mechanism (LBT procedure) when a wideband carrier/cell or a BWP comprises multiple sub-bands. There is a need for an efficient channel access mechanism (LBT procedure) when multiple wideband carriers/cells (comprising multiple sub-bands) are aggregated using carrier aggregation. There is a need for an efficient channel access mechanism when at least one wideband carrier/cell/BWP is configured in an unlicensed band. A wideband carrier/cell/BWP may comprise multiple sub-bands. Example embodiments provide enhanced channel access mechanisms by implementing different types of LBTs on different sub-bands of a carrier/cell/BWP. Implementation of different types of LBTs to determine whether the channel of a carrier/cell/BWP, comprising multiple sub-bands, is clear may result in a faster LBT process, lower battery power consumption and a reliable LBT outcome. Example embodiments determine the result of the LBT process of a channel of a carrier/cell/BWP based on both a first type of LBT and a second type of LBT for different sub-bands of the carrier/cell/BWP. The first type of LBT is an LBT with a back-off (e.g., LBT CAT4) and the second type of LBT is a one-shot LBT (e.g., LBT CAT2). Example embodiments provide enhanced channel access mechanisms for transmission on a wideband unlicensed carrier and carrier aggregation with multiple wideband unlicensed carriers.

Figure 19:
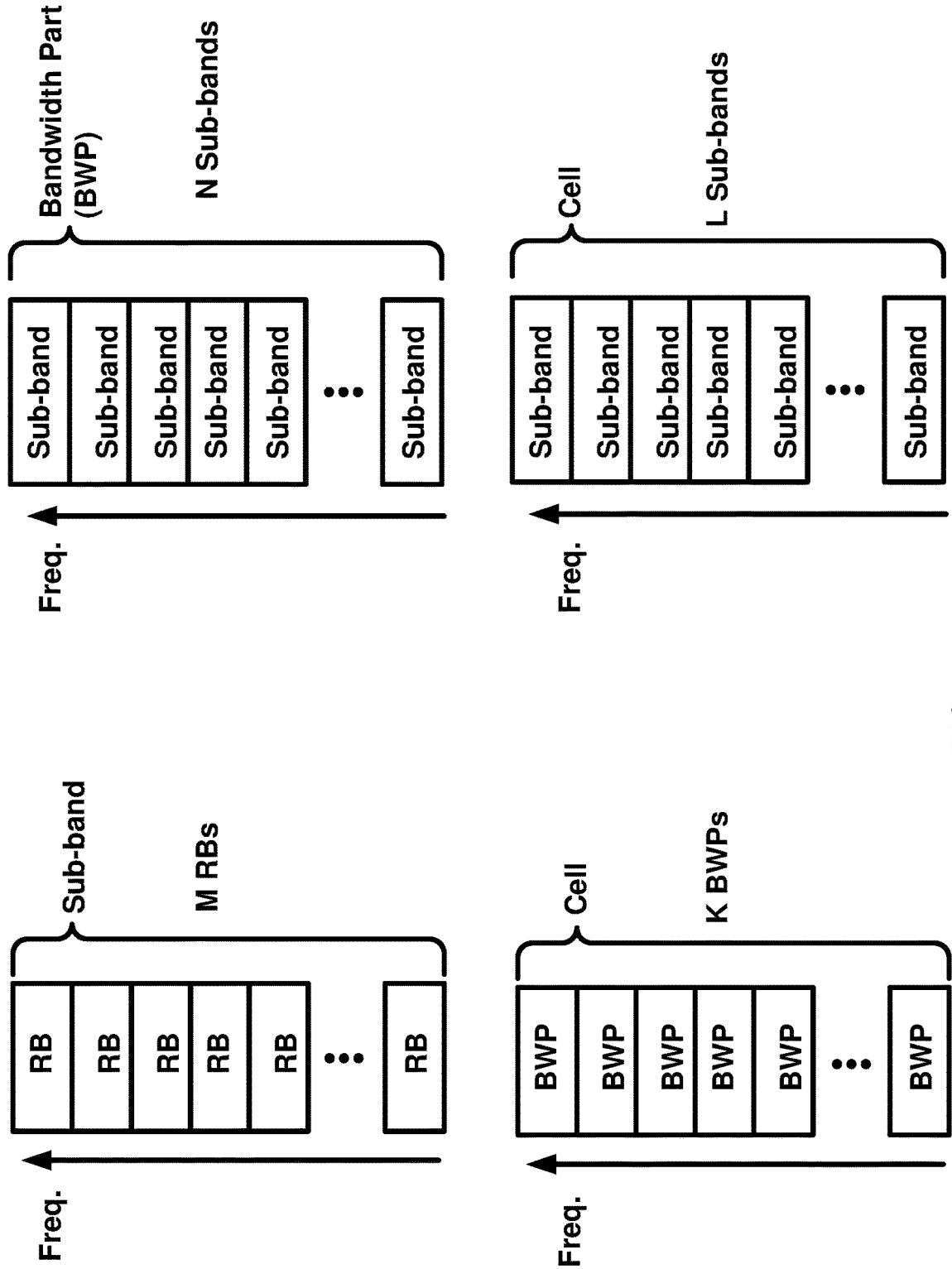
FIG. 19 is a diagram of an example resource relationship as per an aspect of an embodiment of the present disclosure.
Figure 20A:
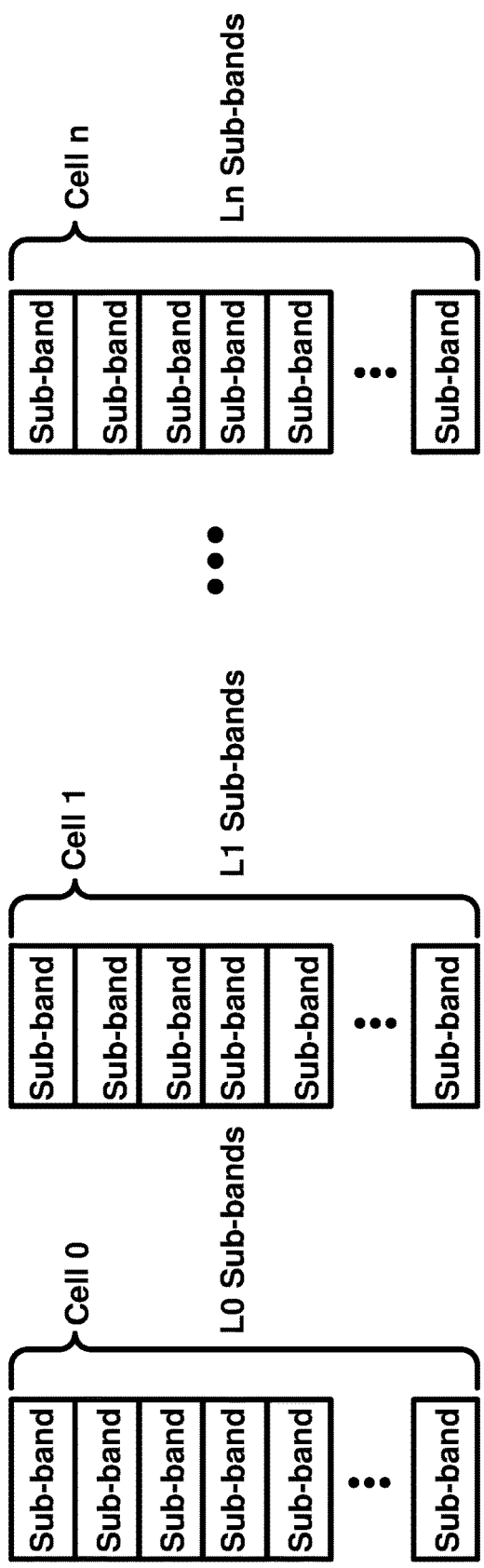
FIG. 20A is a diagram of an example sub-bands comprised in a cell as per an aspect of an embodiment of the present disclosure.
Figure 20B:
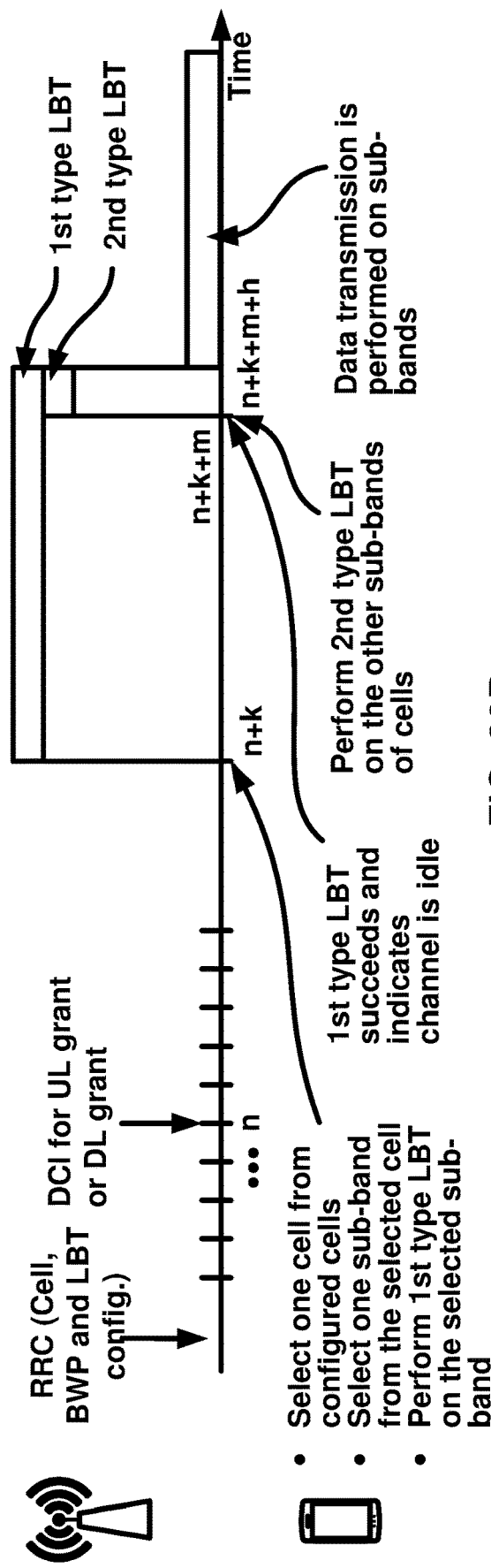
FIG. 20B is a diagram of an example Listen Before Talk (LBT) in multiple carriers wide bandwidth communication as per an aspect of an embodiment of the present disclosure.

In an example embodiment, FIG. 19 may show a relationship among resource blocks (RBs), sub-band(s), BWP(s), and cell(s). A sub-band may comprise M resource block(s) (RBs). A BWP may comprise N sub-bands. A cell may comprise K BWPs. A cell may comprise L sub-bands. M, N, K, L may be positive integers greater than zero. In an example, when N=1, a sub-band may be a BWP. An example embodiment is shown in FIG. 20A and FIG. 20B. A cell may comprise multiple sub-bands and different cells may comprise a different or same number of sub-bands as shown in FIG. 20A. A sub-band may comprise one or more RBs of a band. A sub-band bandwidth may, for example, be 20 MHz. In an example embodiment, cell 0 may comprise L0 sub-bands, where L0 may be a positive integer greater than zero. Cell 1 may comprise L1 sub-bands, where L1 may be a positive integer greater than zero. Cell n may comprise Ln sub-bands, where Ln may be a positive integer greater than zero.

Figure 18:
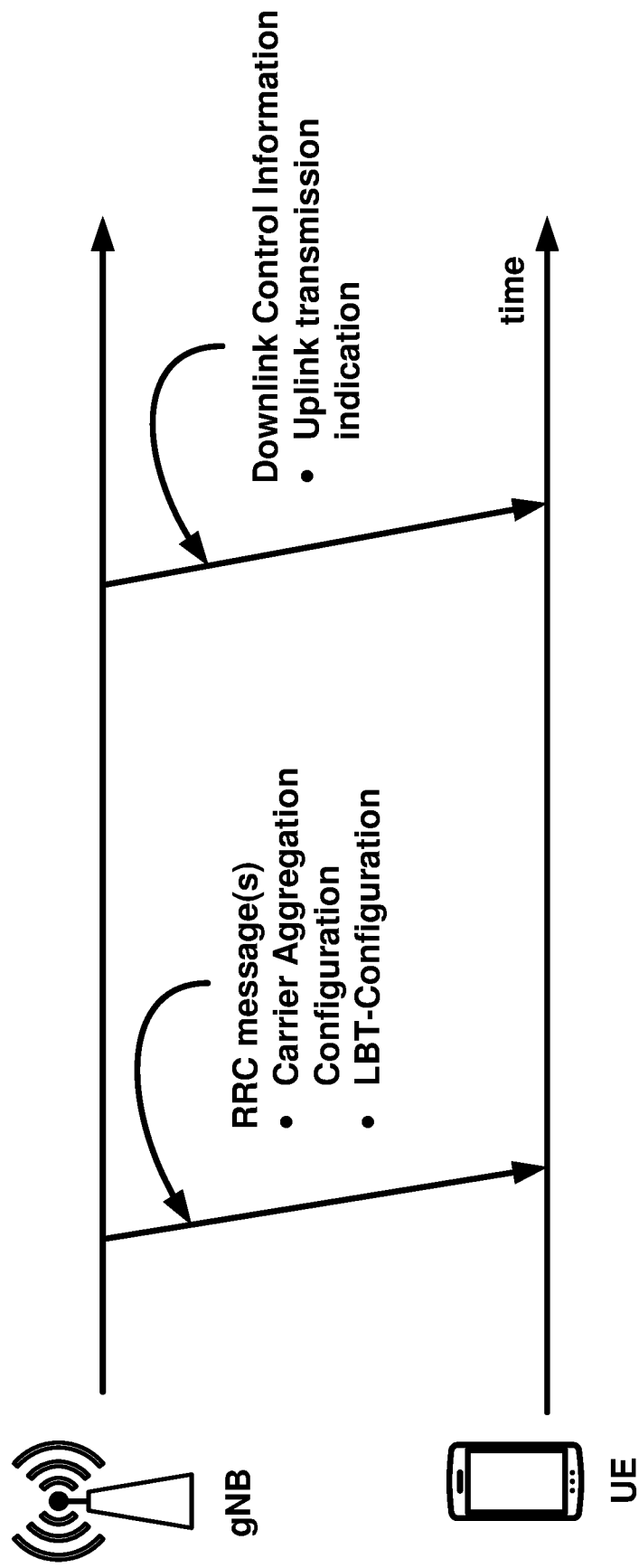
FIG. 18 is a diagram of an example RRC configuration as per an aspect of an embodiment of the present disclosure.

In an example, as shown in FIG. 20B, the wireless device may receive RRC message(s) from a gNB. The RRC message(s) may comprise configuration parameters of a plurality of cells (carrier aggregation configuration). The RRC message(s) may comprise listen before talk (LBT) configuration parameters. The RRC message(s) may comprise bandwidth part (BWP) configuration parameters. The configuration of carrier aggregation (CA) may comprise bandwidth class, active cell identification, downlink and uplink physical channel and signal parameters, and/or power control parameters. The listen before talk (LBT) configuration parameters may indicate a maximum energy detection threshold, an energy detection threshold offset, and/or maximum LBT times threshold. The bandwidth part (BWP) configuration parameters may comprise a BWP identification, a downlink and uplink channel configuration, and/or a radio link monitoring configuration. The wireless device may receive at least one DCI from a gNB to indicate an uplink (UL) grant and/or a downlink (DL) grant (or assignment), as shown in FIG. 18. The at least one DCI may indicate a same starting time for transmission on sub-bands of one or more cells. The at least one DCI may comprise: one or more resource assignment on sub-bands of one or more cells, modulation and coding parameters, LBT parameters (e.g., LBT priority and/or LBT type), a timing offset, and/or power control parameters.

In an example, as shown in FIG. 20B, the wireless device may select one cell from the configured cell(s). The selection may be a random selection (e.g., with uniform distribution). The selection may be no more frequent than once during a limited time duration, for example, during one or more seconds. The wireless device may select one sub-band from the selected cell. The selection may be a random selection (e.g., with uniform distribution). The selection may be no more frequent than once during a limited time duration, for example, during one or more seconds. The wireless device may perform a first type listen before talk (LBT) on the selected sub-band (e.g., from time n+k to time n+k+m). The first type listen before talk (LBT) may be a listen before talk with a back off, for example, listen before talk Category 4 (e.g., LBT with random back-off with a contention window of variable size) or Category 3 (e.g., LBT with random back-off with a contention window of fixed size).

In an example, as shown in FIG. 20B, when the first type listen before talk (LBT) succeeds on the selected sub-band and indicates the channel is idle (e.g., at time n+k+m), the wireless device may hold the channel for the selected sub-band. The wireless device may perform a second type listen before talk (LBT) on the other sub-bands of the configured cell(s) (e.g., from time n+k+m to time n+k+m+h). In an example, the wireless device may perform the second type LBT on each of the other sub-bands of the configured cell(s). In an example, the second type listen before talk (LBT) may be a listen before talk without a back off, for example, listen before talk Category 2 (e.g., LBT without random back-off) or one shot listen before talk (LBT) (e.g., energy detection during a limited time duration, for example, 25 µs, 16 µs, or more or less time duration). In an example, the first type LBT duration may be longer than the one-shot LBT duration. When the second type listen before talk (LBT) succeeds on the other sub-bands of the configured cell(s) (e.g., at time n+k+m+h), the wireless device may transmit data (e.g., from time n+k+m+h) on the selected sub-band and the other sub-bands associated with a successful LBT. When the second type listen before talk (LBT) fails on one or more of other sub-bands of the configured cell(s) at time n+k+m+h, the wireless device may perform data transmission on a sub-band with a clear channel (e.g., indicated by the first type LBT and/or the second type LBT) from time n+k+m+h.

In an example, as shown in FIG. 20B, when the first type listen before talk (LBT) fails on the selected sub-band and indicates the channel is busy on the selected sub-band at time n+k+m, the wireless device may perform the first type listen before talk (LBT) on the selected sub-band. In an example, when the first type listen before talk (LBT) fails on the selected sub-band and indicates the channel is busy on the selected sub-band at time n+k+m, the wireless device may perform the first type listen before talk (LBT) on another selected sub-band (e.g., randomly selected by the wireless device from the sub-bands of the selected cell). After the first type listen before talk (LBT) succeeds on a selected sub-band and indicates the channel on the selected sub-band is idle, the wireless device may perform the second type listen before talk (LBT) on the other sub-bands of the configured cell(s). In an example, after the first type listen before talk (LBT) succeeds on the selected sub-band and indicates the channel on the selected sub-band is idle, the wireless device may perform the second type LBT on each of the other sub-bands of the configured cell(s). In an example, when the first type listen before talk (LBT) on a selected sub-band fails continuously more than a configured maximum LBT times threshold and indicates the channel is busy on the selected sub-band, the wireless device may stop LBT procedures and channel access. A gNB may transmit one or more RRC messages to the wireless device. The one or more RRC messages may comprise a parameter indicating a maximum LBT times and/or a counter threshold. In an example, n, k, m and h may be positive integers (with greater than zero) multiple Ts (e.g., basic time unit for New Radio).

The wireless device may transmit to the gNB one or more transport blocks via the one or more cells of the plurality of cell(s) when LBT procedures indicates a clear channel (e.g., on the selected sub-band and one or more of other sub-bands of the configured cell(s)). In an example, when a second type listen before talk (LBT) fails on one or more of other sub-bands of the configured cell(s), the wireless device may perform data transmission on a sub-band with a clear channel (e.g., the selected sub-band with the first type LBT successful and/or one or more sub-bands of the other sub-bands of the configured cell(s) with the second type LBT successful). In an example, an LBT may indicate a clear channel on one or more sub-bands of a first cell, and may indicate a busy channel on one or more other sub-bands of the first cell. The wireless device may transmit one or more transport blocks on the one or more sub-bands with a clear channel. The wireless device may not transmit one or more transport blocks on the one or more other sub-bands with busy channel. The wireless device may construct multiple versions of one or more transport blocks, for example, a first one or more transport blocks for transmission via a first number of sub-bands, and a second one or more transport blocks for transmission via a second number of sub-bands. The wireless device may perform data puncturing or rate matching to construct one or more transport blocks via the second number of sub-bands (e.g., the second number is smaller than the first number).

In an example, the wireless device may transmit one or more first number of transport blocks on the first number of sub-bands. The wireless device may transmit one or more second number of transport blocks on the second number of sub-bands. In an example, the wireless device may transmit via a cell, in response to the LBT succeeding on the sub-bands that the LBT is performed. In an example, the wireless device may not transmit if the LBT of one of the sub-bands fails.

In an example, the wireless device may receive at least one message comprising configuration parameters of a plurality of unlicensed cells. The configuration parameters may comprise: one or more parameters of the plurality of cells. Each cell of a plurality of unlicensed cells may comprises one or more sub-bands, and one or more listen-before-talk parameters. In an example, the wireless device may receive at least one downlink control information indicating uplink transmissions on a plurality of first cells of the plurality of cells. The uplink transmissions on the plurality of the first cells may have the same starting time. In an example, the wireless device may select a first cell of the plurality of first cells. In an example, the wireless device may select a first sub-band of the first cell. In an example, the wireless device may perform a first type listen-before-talk on the first sub-band. In an example, the wireless device may determine that the first type listen-before-talk may indicate a clear channel on the first sub-band. In an example, the wireless device may perform a second type listen-before-talk on one or more other sub-bands of the first cell and one or more sub-bands of other cells in the plurality of first cells except the first cell. In an example, the wireless device may transmit uplink transmissions on the plurality of first cells in response to the first type listen-before talk indicates a clear channel and the second type listen-before-talk indicates a clear channel. In an example, a sub-band may comprise a plurality of continuous resource block (RB) or non-continuous resource block (RB). In an example, the first type listen-before-talk may be based on a back off parameter and a first listen-before-talk duration and the second type listen-before-talk may be based on one-shot listen-before-talk duration and the first listen-before-talk duration may be longer than the one-shot listen-before-talk duration. In an example, the listen-before-talk parameters may indicate a maximum energy detection threshold or an energy detection threshold offset. In an example, the selecting a first cell of the plurality of first cells may comprise randomly selecting, with uniform distribution, the first cell. In an example, the selecting a first cell of the plurality of first cells may comprise selecting the first cell no more frequently than once during a limited time duration. In an example, the selecting the first sub-band of the first cell may comprise randomly selecting, with uniform distribution, the first sub-band. In an example, the selecting the first sub-band of the first cell may comprise selecting the first sub-band no more frequently than once during a limited time duration. In an example, the performing the second type listen-before-talk on the one or more the other sub-bands of the first cell may comprise performing the second type listen-before-talk with the same limited time duration on the one or more the other sub-bands of the first cell. In an example, the performing the second type listen-before-talk on the one or more other sub-bands of the first cell may comprise performing the second type listen-before-talk on multiple sub-bands with different limited time durations. In an example, the performing the second type listen-before-talk on the one or more sub-bands of the other cells in the plurality of first cells except the first cell may comprise performing the second type listen-before-talk with the same limited time duration. In an example, the performing the second type listen-before-talk on the one or more sub-bands of the other cells in the plurality of first cells except the first cell may comprise performing the second type listen-before-talk on multiple sub-bands with different limited time durations. In an example, the transmitting uplink transmissions on the plurality of first cells when the listen-before talk indicates a clear channel may comprise transmitting data via PUSCH, PUCCH, PRACH or transmitting SRS signal. In an example, the sub-band may have a first bandwidth. In an example, the uplink transmission on the first cell may be via a first bandwidth part of the first cell. In an example, the at least one downlink control information may indicate a plurality of first bandwidth parts of the plurality of the first cells. In an example, a bandwidth part of a first cell in the plurality of first cells may comprise a plurality of first sub-bands. In an example, the at least one downlink control information may indicate one or more second listen-before-talk parameters. In an example, the configuration parameters may indicate one or more second parameters of a plurality of bandwidth parts of the plurality of cells.

Figure 21A:
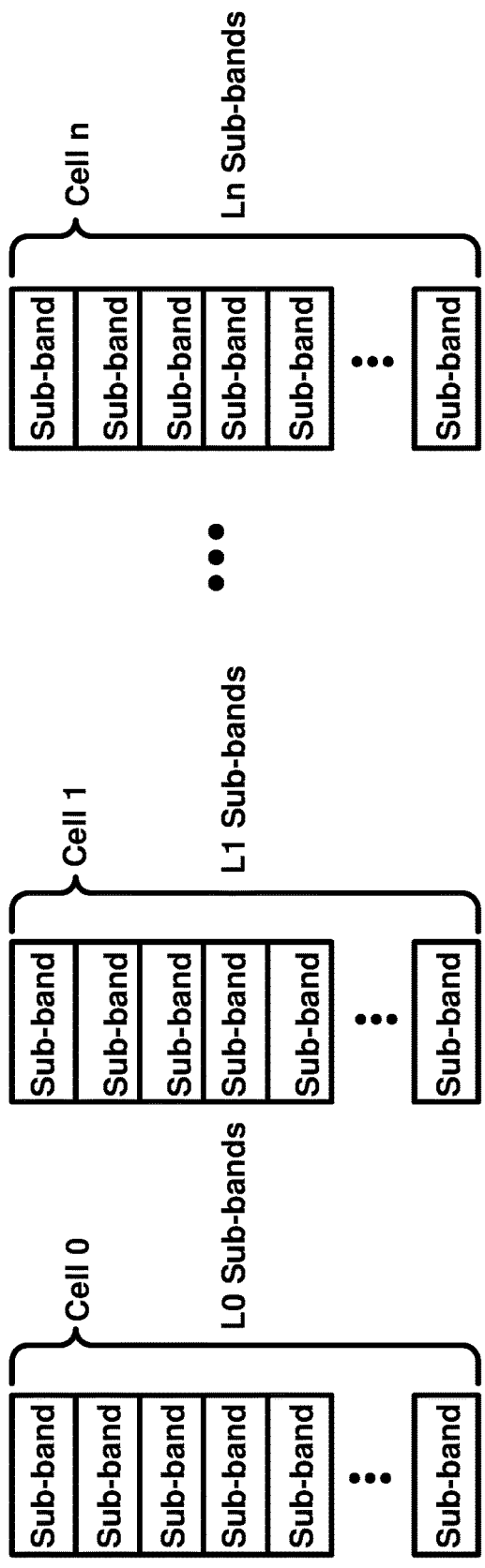
FIG. 21A is a diagram of an example sub-bands comprised in a cell as per an aspect of an embodiment of the present disclosure
Figure 21B:
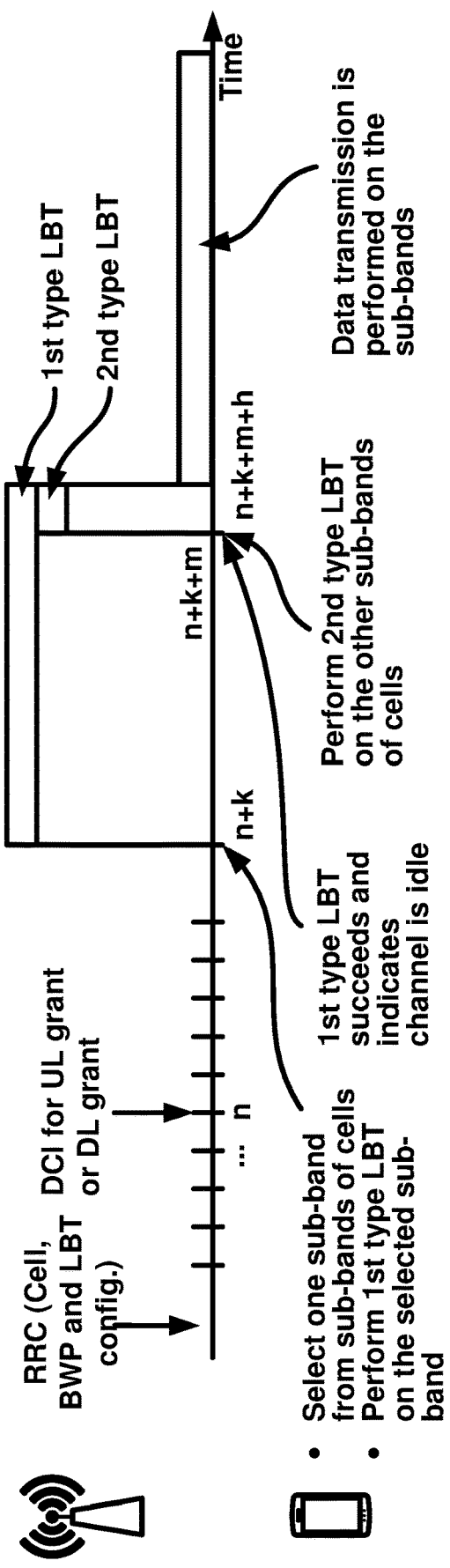
FIG. 21B is a diagram of an example Listen Before Talk (LBT) in multiple carriers wide bandwidth communication as per an aspect of an embodiment of the present disclosure.

An example embodiment is shown in FIG. 21A and FIG. 21B. In an example, a cell may comprise multiple sub-bands and different cells may comprise different or same number of sub-bands as shown in FIG. 21A. A sub-band comprises of one or more resource blocks of a band, for example, a sub-band bandwidth may be 20 MHz. For example, cell 0 may comprise L0 sub-bands, where L0 may be a positive integer greater than zero, and cell 1 may comprise L1 sub-bands, where L1 may be a positive integer greater than zero. Cell n may comprise Ln sub-bands, where Ln may be a positive integer greater than zero. In an example, FIG. 19 may show a relationship among resource block(s) (RBs), sub-band(s), BWP(s), and cell(s). A sub-band may comprise M RBs. A BWP may comprise N sub-bands. A cell may comprise K BWPs. A cell may comprise L sub-bands. M, N, K, L may be positive integers greater than zero. In an example, when N=1, a sub-band may be a BWP.

In an example, as shown in FIG. 21B, the wireless device may receive RRC message(s) from a gNB. The message(s) may comprise: configuration parameters of a plurality of cells (carrier aggregation configuration); listen before talk (LBT) configuration parameters; and bandwidth part (BWP) configuration parameters. The configuration of carrier aggregation (CA) may comprise bandwidth class, active cell identification, downlink and uplink physical channel and signal parameters, and/or power control parameters. The listen before talk (LBT) configuration parameters may comprise maximum energy detection threshold, energy detection threshold offset and/or maximum LBT times threshold. The bandwidth part (BWP) configuration parameters may comprise BWP identification, downlink and uplink channel configuration and radio link monitoring configuration. The wireless device may receive at least one DCI from a gNB to indicate UL grant and/or a DL grant (or assignment), as shown in FIG. 18. The at least one DCI may indicate a same starting time for transmission on sub-bands of one or more cells. The at least one DCI may comprise one or more resource assignment on sub-bands of the one or more cells, modulation and coding parameters, LBT parameters (e.g., LBT priority and/or LBT type), timing offset, and/or power control parameters.

In an example, as shown in FIG. 21B, the wireless device may select one sub-band from sub-bands of configured cell(s). The selection may be a random selection (e.g., with uniform distribution). The selection may be no more frequent than once during a limited time duration, for example, during one or more seconds. The wireless device may perform the first type listen before talk (LBT) on the selected sub-band (e.g., from time n+k to time n+k+m). The first type listen before talk (LBT) may be listen before talk with back off, for example, listen before talk Category 4 (e.g., LBT with random back-off with a contention window of variable size) or Category 3 (e.g., LBT with random back-off with a contention window of fixed size).

In an example, as shown in FIG. 21B, when the first type listen before talk (LBT) succeeds on the selected sub-band and indicate the channel is idle (e.g., at time n+k+m), the wireless device may hold the channel for the selected sub-band. The wireless device may perform the second type listen before talk (LBT) on the other sub-bands of the configured cell(s) (e.g., from time n+k+m to time n+k+m+h). In an example, the wireless device may perform the second type LBT on each of the other sub-bands of the configured cell(s). In an example, the second type listen before talk (LBT) may be listen before talk without back off, for example, listen before talk Category 2 (e.g., LBT without random back-off) or one shot listen before talk (LBT) (e.g., energy detection during a limited time duration, for example, 25 μs, 16 μs, or more or less time duration). In an example, the first type LBT duration may be longer than the one-shot LBT duration. When the second type listen before talk (LBT) succeeds on the other sub-bands of the configured cell(s) (e.g., at time n+k+m+h), the wireless device may transmit data (e.g., from time n+k+m+h) on the selected sub-band and the other sub-bands associated with a successful LBT. When the second type listen before talk (LBT) fails on one or more of other sub-bands of the configured cell(s) (e.g., at time n+k+m+h), the wireless device may perform data transmission on a sub-band with a clear channel (e.g., indicated by the first type LBT and/or the second type LBT), for example, from time n+k+m+h.

In an example, as shown in FIG. 21B, when the first type listen before talk (LBT) fails on the selected sub-band and indicate the channel is busy (e.g., at time n+k+m), the wireless device may perform the first type listen before talk (LBT) on the selected sub-band. In an example, when the first type listen before talk (LBT) fails on the selected sub-band and indicate the channel is busy (e.g., at time n+k+m), the wireless device may perform the first type listen before talk (LBT) on another selected sub-band. After the first type listen before talk (LBT) succeeds on a selected sub-band and indicate the channel is idle, the wireless device may perform the second type listen before talk (LBT) on the other sub-bands of the configured cell(s). In an example, after the first type listen before talk (LBT) succeeds on the selected sub-band and indicate the channel is idle, the wireless device may perform the second type LBT on each of the other sub-bands of the configured cell(s). In an example, when the first type listen before talk (LBT) on a selected sub-band fails continuously more than a configured maximum LBT times threshold and indicate the channel is busy, the wireless device may stop LBT procedures and the channel access. A gNB may transmit one or more RRC messages to the wireless device. The one or more RRC messages may comprise a parameter indicating a maximum LBT times and/or a counter threshold. In an example, n, k, m and h may be positive integers (with greater than zero) multiple Ts (e.g., basic time unit for New Radio).

The wireless device may transmit to the gNB one or more transport blocks via one or more cells of the plurality of cells when LBT procedure(s) indicate a clear channel (e.g., on the selected sub-band and one or more of other sub-bands of the one or more cells). In an example, when a second type listen before talk (LBT) fails on one or more of other sub-bands of the configured cell(s), the wireless device may perform data transmission on a sub-band with a clear channel (e.g., the selected sub-band with the first type LBT successful and/or one or more sub-bands of the other sub-bands of the configured cell(s) with the second type LBT successful). In an example, LBT may indicate a clear channel on one or more sub-bands of the configured cell(s) and may indicate a busy channel on one or more other sub-bands of the configured cell(s). In an example, the wireless device may transmit on the one or more sub-bands with clear channel. The wireless device may not transmit on the one or more other sub-bands with busy channel. The wireless device may construct multiple versions of one or more transport blocks, for example, a first one or more transport blocks for transmission via a first number of sub-bands, and a second one or more transport blocks for transmission via a second number of sub-bands. The wireless device may perform data puncturing or rate matching to constructing one or more transport blocks via the second number of sub-bands (e.g., the second number is smaller than the first number).

In an example, the wireless device may transmit one or more first number of transport blocks on the first number of sub-bands. The wireless device may transmit one or more second number of transport blocks on the second number of sub-bands. In an example, the wireless device may transmit via a cell, in response to LBT succeeding on the sub-bands that LBT is performed. The wireless device may not transmit if one or the LBT of one of the sub-bands fails.

In an example, the wireless device may receive at least one message comprising configuration parameters of a plurality of unlicensed cells. The configuration parameters may comprise: one or more parameters of the plurality of unlicensed cells. Each cell of the plurality of cells may comprises one or more sub-bands, and one or more listen-before-talk parameters. In an example, the wireless device may receive at least one downlink control information indicating uplink transmissions on a plurality of first cells of the plurality of cells. The uplink transmissions on the plurality of the first cells may have the same starting time. In an example, the wireless device may select a first sub-band of a first cell of the plurality of first cells. In an example, the wireless device may perform a first type listen-before-talk on the first sub-band. In an example, the wireless device may determine that the first type listen-before-talk may indicate a clear channel on the first sub-band. In an example, the wireless device may perform a second type listen-before-talk on one or more other sub-bands of the first cell and one or more sub-bands of other cells in the plurality of first cells except the first cell. In an example, the wireless device may transmit uplink transmissions on the plurality of first cells in response to the first type listen-before talk indicates a clear channel and the second type listen-before-talk indicates a clear channel. In an example, a sub-band may comprise a plurality of continuous physical resource block (PRB) or non-continuous physical resource block (PRB). In an example, the first type listen-before-talk may be based on a back off parameter and a first listen-before-talk duration and the second type listen-before-talk may be based on one-shot listen-before-talk duration and the first listen-before-talk duration may be longer than the one-shot listen-before-talk duration. In an example, the listen-before-talk parameters may indicate a maximum energy detection threshold or an energy detection threshold offset. In an example, the selecting the first sub-band of the first cell may comprise randomly selecting, with uniform distribution, the first sub-band. In an example, the selecting the first sub-band of the first cell may comprise selecting the first sub-band no more frequently than once during a limited time duration. In an example, the performing the second type listen-before-talk on the one or more the other sub-bands of the first cell may comprise performing the second type listen-before-talk with the same limited time duration on the one or more other sub-bands of the first cell. In an example, the performing the second type listen-before-talk on the one or more other sub-bands of the first cell may comprise performing the second type listen-before-talk on multiple sub-bands with different limited time durations. In an example, the performing the second type listen-before-talk on the one or more sub-bands of the other cells in the plurality of first cells except the first cell may comprise performing the second type listen-before-talk with the same limited time duration. In an example, the performing the second type listen-before-talk on the one or more sub-bands of the other cells in the plurality of first cells except the first cell may comprise performing the second type listen-before-talk on multiple sub-bands with different limited time durations. In an example, the transmitting uplink transmissions on the plurality of first cells when the listen-before talk indicates a clear channel may comprise transmitting data via PUSCH, PUCCH, PRACH or transmitting SRS signal. In an example, the sub-band may have a first bandwidth. In an example, the uplink transmission on the first cell may be via a first bandwidth part of the first cell. In an example, the at least one downlink control information may indicate a plurality of first bandwidth parts of the plurality of the first cells. In an example, a bandwidth part of a first cell in the plurality of first cells may comprise a plurality of first sub-bands. In an example, the at least one downlink control information may indicate one or more second listen-before-talk parameters. In an example, the configuration parameters indicate one or more second parameters of a plurality of bandwidth parts of the plurality of cells.

An example embodiment is shown in FIG. 22A and FIG. 22B. In an example, a cell may comprise multiple sub-bands. The cell may comprise multiple sub-band blocks (SBBs). A sub-band block (SBB) may comprise multiple sub-bands as shown in FIG. 22A. A sub-band may comprise of one or more resource blocks (RB s) of a band, for example, a sub-band bandwidth may be 20 MHz. For example, a cell may comprise L sub-bands. L may be a positive integer greater than zero. A cell may comprise K sub-band blocks (SBBs). K may be a positive integer greater than zero. A sub-band block may comprise N sub-bands. N may be a positive integer greater than zero. A sub-band block (SBB) may be a bandwidth part (BWP). When N=1, a sub-band may be a sub-band block. When a sub-band block (SBB) is a bandwidth part (BWP), a cell may comprise K bandwidth parts (BWPs). K may be a positive integer greater than zero.

In an example, as shown in FIG. 22B, the wireless device may receive RRC message(s) from a gNB. The message(s) may comprise: configuration parameters of a plurality of cells (carrier aggregation configuration); listen before talk (LBT) configuration parameters; bandwidth part (BWP) configuration parameters; and/or sub-band block (SBB) configuration. The configuration of carrier aggregation (CA) may comprise bandwidth class, active cell identification, downlink and uplink physical channel and signal parameters, and/or power control parameters. The listen before talk (LBT) configuration parameters may comprise maximum energy detection threshold, energy detection threshold offset and/or maximum LBT times threshold. The bandwidth part (BWP) configuration parameters may comprise BWP identification, downlink and uplink channel configuration and radio link monitoring configuration. The sub-band block (SBB) configuration parameters may comprise SBB identification, number of sub-bands in an SBB and associated sub-band index. The wireless device may receive at least one DCI from a gNB to indicate an UL grant and/or a DL grant (or assignment), as shown in FIG. 18. The at least one DCI may indicate a same starting time for transmission on sub-bands of one or more cells. The at least one DCI may comprise one or more resource assignment on sub-bands of the one or more cells, modulation and coding parameters, LBT parameters (e.g., LBT priority and/or LBT type), timing offset, and/or power control parameters.

In an example, as shown in FIG. 22B, the wireless device may select one sub-band block (SBB) from the configured cell(s). The selection may be based on a random selection (e.g., with uniform distribution). The selection may be no more frequent than once during a limited time duration, for example, during one or more seconds. The wireless device may select one sub-band from the selected sub-band block (SBB). In example, when one SBB is activated (or configured) for a cell, the wireless device may select one sub-band from the one SBB of the cell. The selection may be a random selection (e.g., with uniform distribution). The selection may be no more frequent than once during a limited time duration, for example, during one or more seconds. The wireless device may perform a first type listen before talk (LBT) on the selected sub-band (e.g., from time n+k to time n+k+m). The first type listen before talk (LBT) may be listen before talk with a back off, for example, listen before talk Category 4 (e.g., LBT with random back-off with a contention window of variable size) or Category 3 (e.g., LBT with random back-off with a contention window of fixed size).

In an example, as shown in FIG. 22B, when the first type listen before talk (LBT) succeeds on the selected sub-band and indicate the channel is idle (e.g., at time n+k+m), the wireless device may hold the channel for the selected sub-band. The wireless device may perform a second type listen before talk (LBT) on the other sub-bands of the configured cell(s) (e.g., from time n+k+m to time n+k+m+h). In an example, the wireless device may perform the second type LBT on each of the other sub-bands of SBB(s) of the configured cell(s). In an example, the second type listen before talk (LBT) may be listen before talk without back off, for example, listen before talk Category 2 (e.g., LBT without random back-off) or one shot listen before talk (LBT) (e.g., energy detection during a limited time duration, for example, 25 µs, 16 µs, or more or less time duration). In an example, the first type LBT duration may be longer than the one-shot LBT duration. When the second type listen before talk (LBT) succeeds on the other sub-bands of the configured cell(s) (e.g., at time n+k+m+h), the wireless device may transmit data (e.g., from time n+k+m+h) on the selected sub-band and the other sub-bands, associated with successful LBT. When the second type listen before talk (LBT) fails on one or more of other sub-bands of the configured cell(s) (e.g., at time n+k+m+h), the wireless device may perform data transmission on sub-bands with a clear channel (e.g., indicated by the first type LBT and/or the second type LBT), for example, from time n+k+m+h.

In an example, as shown in FIG. 22B, when the first type listen before talk (LBT) fails on the selected sub-band and indicate the channel is busy (e.g., at time n+k+m), the wireless device may perform the first type listen before talk (LBT) on the selected sub-band. In an example, when the first type listen before talk (LBT) fails on the selected sub-band and indicate the channel is busy (e.g., at time n+k+m), the wireless device may perform the first type listen before talk (LBT) on another selected sub-band. After the first type listen before talk (LBT) succeeds on a selected sub-band and indicate the channel is idle, the wireless device may perform the second type listen before talk (LBT) on the other sub-bands of the configured cell(s). In an example, after the first type listen before talk (LBT) succeeds on the selected sub-band and indicates the channel is idle, the wireless device may perform the second type LBT on each of the other sub-bands of SBB(s) of the configured cell(s). In an example, when the first type listen before talk (LBT) on a selected sub-band fails continuously more than a configured maximum LBT times threshold and indicate the channel is busy, the wireless device may stop LBT procedures and the channel access. A gNB may transmit one or more RRC messages to the wireless device. The one or more RRC messages may comprise a parameter indicating a maximum LBT times and/or counter threshold. In an example, n, k, m and h may be positive integers (with greater than zero) multiple Ts (e.g., basic time unit for New Radio).

The wireless device may transmit to the gNB one or more transport blocks via the one or more cells when LBT procedures indicates a clear channel (e.g., on the selected sub-band and one or more of other sub-bands of SBB(s) of the configured cell(s)). In an example, when a second type listen before talk (LBT) fails on one or more of other sub-bands of the configured cell(s), the wireless device may perform data transmission on a sub-band with a clear channel (e.g., on the selected sub-band and one or more of other sub-bands of SBB(s) of the configured cell(s)). In an example, LBT may indicate a clear channel on one or more sub-bands of a cell, and may indicate a busy channel on one or more other sub-bands of the cell. In an example, the wireless device may transmit on the one or more sub-bands with clear channel. The wireless device may not transmit on the one or more other sub-bands with busy channel. The wireless device may construct multiple versions of one or more transport blocks, for example, a first one or more transport blocks for transmission via a first number of sub-bands, and a second one or more transport blocks for transmission via a second number of sub-bands. The wireless device may perform data puncturing or rate matching to constructing one or more transport blocks via the second number of sub-bands (e.g., the second number is smaller than the first number).

In an example, the wireless device may transmit one or more first number of transport blocks on the first number of sub-bands. The wireless device may transmit one or more second number of transport blocks on the second number of sub-bands. In an example, the wireless device may transmit transport blocks via a cell, in response to LBT succeeding on the sub-bands that LBT is performed. The wireless device may not transmit transport blocks via the cell if the LBT of one of the sub-bands fails.

In an example, the wireless device may receive at least one message comprising configuration parameters of a plurality of unlicensed cells. The configuration parameters may comprise: one or more parameters of the plurality of cells. Each cell of a plurality of unlicensed cells may comprises one or more sub-bands, one or more sub-band blocks (SBBs) and one or more listen-before-talk parameters. In an example, the wireless device may receive at least one downlink control information indicating uplink transmissions on a plurality of first cells of the plurality of cells. The uplink transmissions on the plurality of the first cells may have the same starting time. In an example, the wireless device may select a first sub-band block (SBB) of the plurality of first cells. In an example, the wireless device may select a first sub-band of the first sub-band block (SBB). In an example, the wireless device may perform a first type listen-before-talk on the first sub-band. In an example, the wireless device may determine that the first type listen-before-talk may indicate a clear channel on the first sub-band. In an example, the wireless device may perform a second type listen-before-talk on one or more other sub-bands of the first sub-band block (SBB) and one or more sub-bands of other sub-band blocks (SBBs) in the plurality of first cells. In an example, the wireless device may transmit uplink transmissions on the plurality of first cells in response to the first type listen-before talk indicates a clear channel and the second type listen-before-talk indicates a clear channel. In an example, a sub-band may comprise a plurality of continuous resource blocks or non-continuous resource blocks. In an example, the first type listen-before-talk may be based on a back off parameter and a first listen-before-talk duration and the second type listen-before-talk may be based on one-shot listen-before-talk duration and the first listen-before-talk duration may be longer than the one-shot listen-before-talk duration. In an example, the listen-before-talk parameters may indicate a maximum energy detection threshold and/or an energy detection threshold offset. In an example, the selecting a first sub-band block (SBB) of the plurality of first cells may comprise randomly selecting, with uniform distribution, the first sub-band block (SBB). In an example, the selecting a first sub-band block (SBB) of the plurality of first cells may comprise selecting the first sub-band block (SBB) no more frequently than once during a limited time duration. In an example, the selecting the first sub-band of the first sub-band block (SBB) may comprise randomly selecting, with uniform distribution, the first sub-band. In an example, the selecting the first sub-band of the first sub-band block (SBB) may comprise selecting the first sub-band no more frequently than once during a limited time duration. In an example, the performing the second type listen-before-talk on the one or more the other sub-bands of the first sub-band block (SBB) may comprise performing the second type listen-before-talk with the same limited time duration on the one or more other sub-bands of the first sub-band block (SBB). In an example, the performing the second type listen-before-talk on the one or more other sub-bands of the first sub-band block (SBB) may comprise performing the second type listen-before-talk on multiple sub-bands of the first sub-band block (SBB) with different limited time durations. In an example, the performing the second type listen-before-talk on the one or more sub-bands of the other sub-band blocks (SBBs) in the plurality of first cells, except the first sub-band block (SBB), may comprise performing the second type listen-before-talk with the same limited time duration. In an example, the performing the second type listen-before-talk on the more sub-bands of the other sub-band blocks (SBBs) in the plurality of first cells, except the first sub-band block (SBB), may comprise performing the second type listen-before-talk with different limited time duration. In an example, the transmitting uplink transmissions on the plurality of first cells when the listen-before talk indicates a clear channel may comprise transmitting data via PUSCH, PUCCH, PRACH or transmitting SRS signal. In an example, the sub-band may have a first bandwidth. In an example, the uplink transmission on the first sub-band block (SBB) may be via a first bandwidth part of the first sub-band block (SBB). In an example, the at least one downlink control information may indicate a plurality of first bandwidth parts of the plurality of the first cells. In an example, a bandwidth part of a first sub-band block (SBB) in the plurality of first cells may comprise a plurality of first sub-bands. In an example, a first sub-band block (SBB) may be a bandwidth part. In an example, the at least one downlink control information may indicate one or more second listen-before-talk parameters. In an example, the configuration parameters indicate one or more second parameters of a plurality of bandwidth parts of the plurality of cells.

Figure 23A:
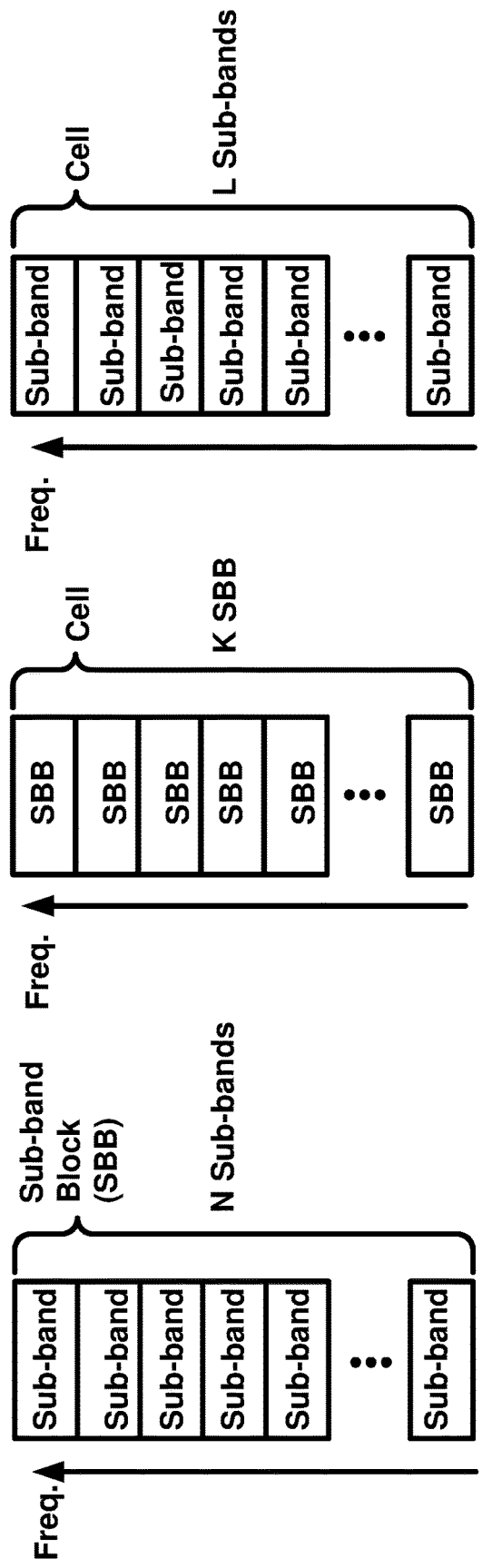
FIG. 23A is a diagram of an example sub-bands comprised in a cell as per an aspect of an embodiment of the present disclosure.
Figure 23B:
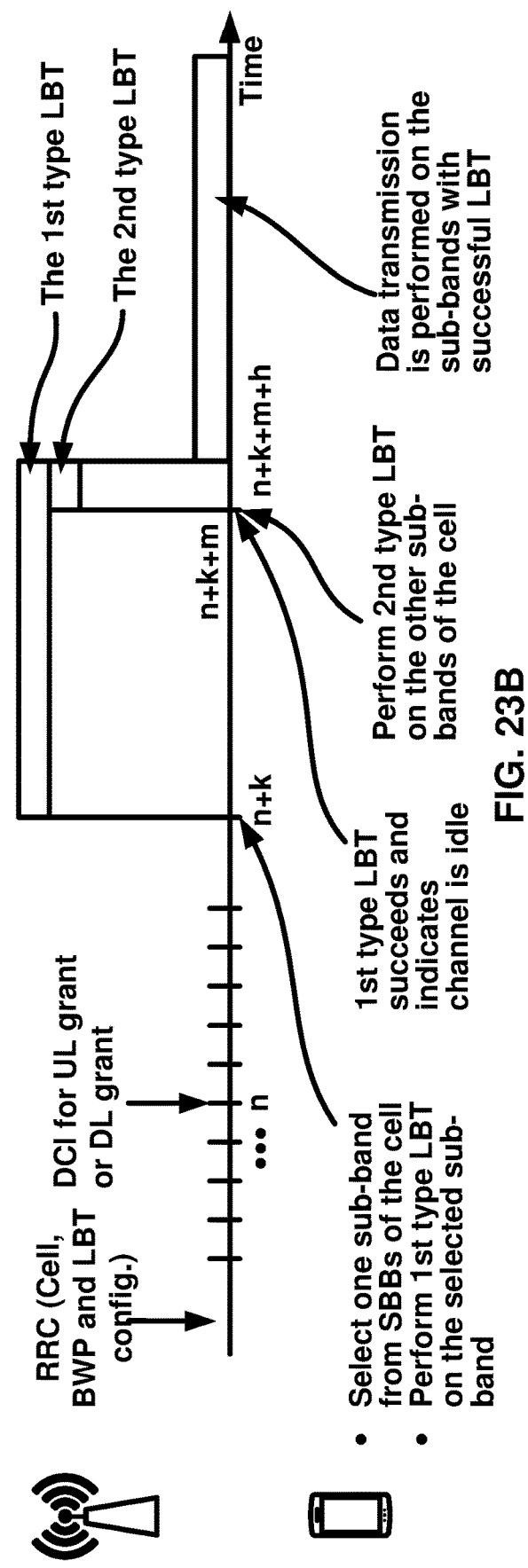
FIG. 23B is a diagram of an example Listen Before Talk (LBT) in single carrier wide bandwidth communication as per an aspect of an embodiment of the present disclosure.

An example embodiment is shown in FIG. 23A and FIG. 23B. In an example, a cell may comprise multiple sub-bands. The cell may comprise multiple sub-band blocks (SBBs). A sub-band block (SBB) may comprise multiple sub-bands as shown in FIG. 23A. A sub-band may comprise of one or more resource blocks (RB s) of a band, for example, a sub-band bandwidth may be 20 MHz. For example, a cell may comprise L sub-bands. L may be a positive integer greater than zero. A cell may comprise K sub-band blocks (SBBs). K may be a positive integer greater than zero. A sub-band block (SBB) may comprise N sub-bands. N may be a positive integer greater than zero. A sub-band block (SBB) may be a bandwidth part (BWP). When N=1, a sub-band may be a sub-band block. When a sub-band block (SBB) may be a bandwidth part (BWP), a cell may comprise K bandwidth parts (BWPs). K may be a positive integer greater than zero.

In an example, as shown in FIG. 23B, the wireless device may receive RRC message(s) from a gNB. The message(s) may comprise: configuration parameters of a plurality of cells (carrier aggregation configuration); listen before talk (LBT) configuration parameters; bandwidth part (BWP) configuration parameters; and/or sub-band block (SBB) configuration. The configuration of carrier aggregation (CA) may comprise bandwidth class, active cell identification, downlink and uplink physical channel and signal parameters, and/or power control parameters. The listen before talk (LBT) configuration parameters may comprise maximum energy detection threshold, energy detection threshold offset and/or maximum LBT times threshold. The bandwidth part (BWP) configuration parameters may comprise BWP identification, downlink and uplink channel configuration and radio link monitoring configuration. The sub-band block (SBB) configuration parameters may comprise SBB identification, number of sub-bands in an SBB and associated sub-band index. The wireless device may receive at least one DCI from a gNB to indicate an UL grant and a DL grant (or assignment), as shown in FIG. 18. The at least one DCI may indicate a same starting time for transmission on sub-bands of one or more cells. The at least one DCI may comprise one or more resource assignment on sub-bands of the one or more cells, modulation and coding parameters, LBT parameters (e.g., LBT priority and/or LBT type), timing offset, and/or power control parameters.

In an example, as shown in FIG. 23B, the wireless device may select one sub-band from configured (or activated by a MAC CE or a DCI) sub-band blocks (SBBs) of the configured cell(s). The selection may be a random selection (e.g., with uniform distribution). The selection may be no more frequent than once during a limited time duration, for example, during one or more seconds. The wireless device may perform a first type listen before talk (LBT) on the selected sub-band (e.g., from time n+k to time n+k+m). The first type listen before talk (LBT) may be listen before talk with back off, for example, listen before talk Category 4 (e.g., LBT with random back-off with a contention window of variable size) or Category 3 (e.g., LBT with random back-off with a contention window of fixed size).

In an example, as shown in FIG. 23B, when the first type listen before talk (LBT) succeeds on the selected sub-band and indicate the channel is idle (e.g., at time n+k+m), the wireless device may hold the channel for the selected sub-band. The wireless device may perform the second type listen before talk (LBT) on the other sub-bands of the configured cell(s) (e.g., from time n+k+m to time n+k+m+h). In an example, the wireless device may perform the second type LBT on each of the other sub-bands of SBB(s) of the configured cell(s). In an example, the second type listen before talk (LBT) may be listen before talk without back off, for example, listen before talk Category 2 (e.g., LBT without random back-off) or one shot listen before talk (LBT) (e.g., energy detection during a limited time duration, for example, 25 µs, 16 µs, or more or less time duration). In an example, the first type LBT duration may be longer than the one-shot LBT duration. When the second type listen before talk (LBT) succeeds on the other sub-bands of the configured cell(s) (e.g., at time n+k+m+h), the wireless device may transmit data (e.g., from time n+k+m+h) on the selected sub-band and the other sub-bands associated with successful LBT. When the second type listen before talk (LBT) fails on one or more of other sub-bands of the configured cell(s) at time n+k+m+h, the wireless device may perform data transmission on sub-bands with a clear channel (e.g., indicated by the first type LBT and/or the second type LBT) from time n+k+m+h.

In an example, as shown in FIG. 23B, when the first type listen before talk (LBT) fails on the selected sub-band and indicate the channel is busy (e.g., at time n+k+m), the wireless device may perform the first type listen before talk (LBT) on the selected sub-band. In an example, when the first type listen before talk (LBT) fails on the selected sub-band and indicate the channel is busy (e.g., at time n+k+m), the wireless device may perform the first type listen before talk (LBT) on another selected sub-band. After the first type listen before talk (LBT) succeeds on a selected sub-band and indicates the channel is idle, the wireless device may perform a second type listen before talk (LBT) on the other sub-bands of the configured cell(s). In an example, after the first type listen before talk (LBT) succeeds on the selected sub-band and indicates the channel is idle, the wireless device may perform the second type LBT on each of the other sub-bands of SBB(s) of the configured cell(s). In an example, when the first type listen before talk (LBT) on a selected sub-band fails continuously more than a configured maximum LBT times threshold and indicate the channel is busy, the wireless device may stop LBT procedures and the channel access. A gNB may transmit one or more RRC messages to the wireless device. The one or more RRC messages may comprise a parameter indicating a maximum LBT times/counter threshold. In an example, n, k, m and h may be positive integers (with greater than zero) multiple Ts (e.g. basic time unit for New Radio).

The wireless device may transmit to the gNB one or more transport blocks via the one or more cells when LBT procedures indicates a clear channel (e.g., on the selected sub-band and one or more of other sub-bands of the one or more cells). In an example, when a second type listen before talk (LBT) fails on one or more of other sub-bands of the configured cell(s), the wireless device may perform data transmission on sub-band with a clear channel (e.g., on the selected sub-band and one or more of other sub-bands of the configured cell(s)). In an example, LBT may indicate a clear channel on one or more sub-bands of a cell, and may indicate a busy channel on one or more other sub-bands of the cell. In an example, the wireless device may transmit on the one or more sub-bands with clear channel. The wireless device may not transmit on the one or more other sub-bands with busy channel. The wireless device may construct multiple versions of one or more transport blocks, for example, a first one or more transport blocks for transmission via a first number of sub-bands, and a second one or more transport blocks for transmission via a second number of sub-bands. The wireless device may perform data puncturing or rate matching to constructing one or more transport blocks vis the second number of sub-bands (e.g., the second number is smaller than the first number).

In an example, the wireless device may transmit one or more first number of transport blocks on the first number of sub-bands. The wireless device may transmit one or more second number of transport blocks on the second number of sub-bands. In an example, the wireless device may transmit via a cell, in response to LBT succeeding on the sub-bands that LBT is performed. The wireless device may not transmit if the LBT of one of the sub-bands fails.

In an example, the wireless device may receive at least one message comprising configuration parameters of a plurality of unlicensed cells. The configuration parameters may comprise: one or more parameters of the plurality of cells. Each cell of a plurality of unlicensed cells may comprises: one or more sub-bands, one or more sub-band blocks (SBBs) and one or more listen-before-talk parameters. In an example, the wireless device may receive at least one downlink control information indicating uplink transmissions on a plurality of first cells of the plurality of cells. The uplink transmissions on the plurality of the first cells may have the same starting time. In an example, the wireless device may select a first sub-band of the configured sub-band blocks (SBBs). In an example, the wireless device may perform a first type listen-before-talk on the first sub-band. In an example, the wireless device may determine that the first type listen-before-talk may indicate a clear channel on the first sub-band. In an example, the wireless device may perform a second type listen-before-talk on one or more sub-bands of the configured sub-band blocks (SBBs) in the plurality of first cells. In an example, the wireless device may transmit uplink transmissions on the plurality of first cells in response to the first type listen-before talk indicates a clear channel and the second type listen-before-talk indicates a clear channel. In an example, a sub-band may comprise a plurality of continuous resource block (RB) or non-continuous resource block (RB). In an example, the first type listen-before-talk may be based on a back off parameter and a first listen-before-talk duration and the second type listen-before-talk may be based on one-shot listen-before-talk duration and the first listen-before-talk duration may be longer than the one-shot listen-before-talk duration. In an example, the listen-before-talk parameters may indicate a maximum energy detection threshold or an energy detection threshold offset. In an example, the selecting the first sub-band of the configured sub-band blocks (SBBs) may comprise randomly selecting, with uniform distribution, the first sub-band. In an example, the selecting the first sub-band of the configured sub-band blocks (SBBs) may comprise selecting the first sub-band no more frequently than once during a limited time duration. In an example, the performing the second type listen-before-talk on the one or more other sub-bands of the configured sub-band blocks (SBBs) may comprise performing the second type listen-before-talk with the same limited time duration on the one or more the other sub-bands of the configured sub-band blocks (SBBs). In an example, the performing the second type listen-before-talk on the one or more other sub-bands of the configured sub-band blocks (SBBs) may comprise performing the second type listen-before-talk on the other sub-bands of the configured sub-band blocks (SBBs) with different limited time durations. In an example, the transmitting uplink transmissions on the plurality of first cells when the listen-before talk indicates a clear channel may comprise transmitting data via PUSCH, PUCCH, PRACH or transmitting SRS signal. In an example, the sub-band may have a first bandwidth. In an example, the uplink transmission on the configured sub-band blocks (SBBs) may be via a first bandwidth part of the configured sub-band blocks (SBBs). In an example, the at least one downlink control information may indicate a plurality of first bandwidth parts of the plurality of the first cells. In an example, a bandwidth part of a first sub-band block (SBB) in the plurality of first cells may comprise a plurality of first sub-bands. In an example, a first sub-band block (SBB) may be a bandwidth part. In an example, the at least one downlink control information may indicate one or more second listen-before-talk parameters.

In an example, the configuration parameters indicate one or more second parameters of a plurality of bandwidth parts of the plurality of cells.

An example embodiment is shown in FIG. 24A and FIG. 24B. In an example, a cell may comprise multiple sub-bands. The cell may comprise multiple sub-band blocks (SBBs). A sub-band block (SBB) may comprise multiple sub-bands as shown in FIG. 24A. A sub-band may comprise of one or more resource blocks (RB s) of a band, for example, a sub-band bandwidth may be 20 MHz. For example, a cell may comprise L sub-bands. L may be a positive integer greater than zero. A cell may comprise K sub-band blocks (SBBs). K may be a positive integer greater than zero. A sub-band block (SBB) may comprise N sub-bands. N may be a positive integer greater than zero. A sub-band block (SBB) may be a bandwidth part (BWP). When N=1, a sub-band may be a sub-band block. When a sub-band block (SBB) may be a bandwidth part (BWP), a cell may comprise K bandwidth parts (BWPs). K may be a positive integer greater than zero.

In an example, as shown in FIG. 24B, the wireless device may receive RRC message(s) from a gNB. The RRC message(s) may comprise: configuration parameters of a plurality of cells (carrier aggregation configuration); listen before talk (LBT) configuration parameters; bandwidth part (BWP) configuration parameters; and/or sub-band block (SBB) configuration. The configuration of carrier aggregation (CA) may comprise bandwidth class, active cell identification, downlink and uplink physical channel and signal parameters, and/or power control parameters. The listen before talk (LBT) configuration parameters may comprise maximum energy detection threshold, energy detection threshold offset and/or maximum LBT times threshold. The bandwidth part (BWP) configuration parameters may comprise BWP identification, downlink and uplink channel configuration and radio link monitoring configuration. The sub-band block (SBB) configuration parameters may comprise SBB identification, number of sub-bands in SBB and associated sub-band index. The wireless device may receive at least one DCI from a gNB to indicate an UL grant and a DL grant (or assignment), as shown in FIG. 18. The at least one DCI may indicate a same starting time for transmission on sub-bands of one or more cells. The at least one DCI may comprise one or more resource assignment on sub-bands of the one or more cells, modulation and coding parameters, LBT parameters (e.g. LBT priority and/or LBT type), timing offset, and/or power control parameters.

In an example, as shown in FIG. 24B, wireless device may select one sub-band from each configured (or activated by a MAC CE or a DCI) sub-band block (SBB) of cell(s). The selection may be a random selection (e.g. with uniform distribution). The selection may be no more frequent than once during a limited time duration, for example, during one or more seconds. The wireless device may perform a first type listen before talk (LBT) on the selected sub-bands (e.g., from time n+k to time n+k+m). In an example, the wireless device may perform the first type listen before talk (LBT) on each of the selected sub-bands (e.g., from time n+k to time n+k+m) of cell(s). The first type listen before talk (LBT) may be listen before talk with back off, for example, listen before talk Category 4 (e.g., LBT with random back-off with a contention window of variable size) or Category 3 (e.g., LBT with random back-off with a contention window of fixed size).

In an example, as shown in FIG. 24B, when the first type listen before talk (LBT) succeeds on the selected sub-bands and indicate the channel is idle (e.g., at time n+k+m), the wireless device may hold the channel for the selected sub-bands associated with successful LBT. The wireless device may perform a second type listen before talk (LBT) on the other sub-bands of the configured cell(s) (e.g., from time n+k+m to time n+k+m+h). In an example, the wireless device may perform the second type LBT on each of the other sub-bands of the configured cell(s). In an example, the second type listen before talk (LBT) may be listen before talk without back off, for example, listen before talk Category 2 (e.g., LBT without random back-off) or one shot listen before talk (LBT) (e.g., energy detection during a limited time duration, for example, 25 µs, 16 µs, or more or less time duration). In an example, the first type LBT duration may be longer than the one-shot LBT duration. When the second type listen before talk (LBT) succeeds on the other sub-bands of the configured cell(s) (e.g., at time n+k+m+h), the wireless device may transmit data (e.g., from time n+k+m+h) on the selected sub-bands and the other sub-bands, which are associated with successful LBT. When the second type listen before talk (LBT) fails on one or more of other sub-bands of the configured cell(s) (e.g., at time n+k+m+h), the wireless device may perform data transmission on sub-bands with a clear channel (e.g., on the selected sub-bands and one or more of other sub-bands of the configured cell(s)), for example, from time n+k+m+h.

In an example, as shown in FIG. 24B, when the first type listen before talk (LBT) fails on one or more of the selected sub-bands and indicate the channel is busy (e.g., at time n+k+m), the wireless device may perform the first type listen before talk (LBT) on the one or more selected sub-bands. In an example, when the first type listen before talk (LBT) fails on one or more of the selected sub-bands and indicate the channel is busy (e.g., at time n+k+m), the wireless device may perform the first type listen before talk (LBT) on another selected sub-band of the associated sub-band block (SBB). After the first type listen before talk (LBT) succeeds on a selected sub-band and indicate the channel is idle, the wireless device may perform the second type listen before talk (LBT) on the other sub-bands of the configured cell(s). In an example, after the first type listen before talk (LBT) succeeds on the selected sub-bands and indicates the channel is idle, the wireless device may perform the second type LBT on each of the other sub-bands of the configured cell(s). In an example, when the first type listen before talk (LBT) on a selected sub-band fails continuously more than a configured maximum LBT times threshold and indicate the channel is busy, the wireless device may stop LBT procedures and the channel access. A gNB may transmit one or more RRC messages to the wireless device. The one or more RRC messages may comprise a parameter indicating a maximum LBT times and/or counter threshold. In an example, n, k, m and h may be positive integers (with greater than zero) multiple Ts (e.g. basic time unit for New Radio).

The wireless device may transmit to the gNB one or more transport blocks via the one or more cells when LBT procedures indicates a clear channel (e.g., on one or more of the selected sub-bands and one or more of other sub-bands of the configured cell(s)). In an example, when a second type listen before talk (LBT) fails on one or more of other sub-bands of the configured cell(s), the wireless device may perform data transmission on sub-band with a clear channel (e.g., on the selected sub-bands and one or more of other sub-bands of the configured cell(s) associated with successful LBT). In an example, LBT may indicate a clear channel on one or more sub-bands of the configured cell(s), and may indicate a busy channel on one or more other sub-bands of the configured cell(s). In an example, the wireless device may transmit on the one or more sub-bands with clear channel. The wireless device may not transmit on the one or more other sub-bands with busy channel. The wireless device may construct multiple versions of one or more transport blocks, for example, a first one or more transport blocks for transmission via a first number of sub-bands, and a second one or more transport blocks for transmission via a second number of sub-bands. The wireless device may perform data puncturing or rate matching to constructing one or more transport blocks via the second number of sub-bands (e.g. the second number is smaller than the first number).

In an example, the wireless device may transmit one or more first number of transport blocks on a first number of sub-bands. The wireless device may transmit one or more second number of transport blocks on a second number of sub-bands. In an example, the wireless device may transmit via a cell, in response to LBT succeeding on the sub-bands that LBT is performed. The wireless device may not transmit if the LBT of one of the sub-bands fails.

In an example, the wireless device may receive at least one message comprising configuration parameters of a plurality of unlicensed cells. The configuration parameters may comprise: one or more parameters of the plurality of cells. Each cell of a plurality of unlicensed cells may comprises one or more sub-bands, one or more sub-band blocks (SBBs), and/or one or more listen-before-talk parameters. In an example, the wireless device may receive at least one downlink control information indicating uplink transmissions on a plurality of first cells of the plurality of cells. The uplink transmissions on the plurality of the first cells may have the same starting time. In an example, the wireless device may select a first sub-band of a configured sub-band block (SBB) of the cell. In an example, the wireless device may perform a first type listen-before-talk on the first sub-bands. In an example, the wireless device may determine that the first type listen-before-talk may indicate a clear channel on the first sub-bands. In an example, the wireless device may perform a second type listen-before-talk on one or more sub-bands of the configured sub-band blocks (SBBs) in the plurality of first cells. In an example, the wireless device may transmit uplink transmissions on the plurality of first cells in response to the first type listen-before talk indicates a clear channel and the second type listen-before-talk indicates a clear channel. In an example, a sub-band may comprise a plurality of continuous resource block (RB) or non-continuous resource block (RB). In an example, the first type listen-before-talk may be based on a back off parameter and a first listen-before-talk duration and the second type listen-before-talk may be based on one-shot listen-before-talk duration and the first listen-before-talk duration may be longer than the one-shot listen-before-talk duration. In an example, the listen-before-talk parameters may indicate a maximum energy detection threshold or an energy detection threshold offset. In an example, the selecting the first sub-bands of the configured sub-band blocks (SBBs) may comprise randomly selecting, with uniform distribution, the first sub-bands. In an example, the selecting the first sub-bands of the configured sub-band blocks (SBBs) may comprise selecting the first sub-bands no more frequently than once during a limited time duration. In an example, the performing the second type listen-before-talk on the one or more other sub-bands of the configured sub-band blocks (SBBs) may comprise performing the second type listen-before-talk with the same limited time duration on the one or more other sub-bands of the configured sub-band blocks (SBBs). In an example, the performing the second type listen-before-talk on the one or more other sub-bands of the configured sub-band blocks (SBBs) may comprise performing the second type listen-before-talk on the other sub-bands of the configured sub-band blocks (SBBs) with different limited time durations. In an example, the transmitting uplink transmissions on the plurality of first cells when the listen-before talk indicates a clear channel may comprise transmitting data via PUSCH, PUCCH, PRACH or transmitting SRS signal. In an example, the sub-band may have a first bandwidth. In an example, the uplink transmission on the configured sub-band blocks (SBBs) may be via a first bandwidth part of the configured sub-band blocks (SBBs). In an example, the at least one downlink control information may indicate a plurality of first bandwidth parts of the plurality of the first cells. In an example, a bandwidth part of the configured sub-band blocks (SBBs) in the plurality of first cells may comprise a plurality of the first sub-band. In an example, a sub-band block (SBB) may be a bandwidth part. In an example, the at least one downlink control information may indicate one or more second listen-before-talk parameters. In an example, the configuration parameters indicate one or more second parameters of a plurality of bandwidth parts of the plurality of cells.

An example embodiment is shown in FIG. 25A and FIG. 25B. In an example, a cell may comprise multiple sub-bands. The cell may comprise multiple sub-band blocks (SBBs). A sub-band block (SBB) may comprise multiple sub-bands as shown in FIG. 25A. A sub-band may comprise one or more resource blocks (RBs) of a band, for example, a sub-band bandwidth may be 20 MHz. For example, a cell may comprise L sub-bands. L may be a positive integer greater than zero. A cell may comprise K sub-band blocks (SBBs). K may be a positive integer greater than zero. A sub-band block (SBB) may comprise N sub-bands. N may be a positive integer greater than zero. A sub-band block (SBB) may be a bandwidth part (BWP). When N=1, a sub-band may be a sub-band block (SBB). When a sub-band block (SBB) may be a bandwidth part (BWP), a cell may comprise K bandwidth parts (BWPs). K may be a positive integer greater than zero.

In an example, as shown in FIG. 25B, the wireless device may receive RRC message(s) from a gNB. The message(s) may comprise: configuration parameters of a plurality of cells (carrier aggregation configuration); listen before talk (LBT) configuration parameters; bandwidth part (BWP) configuration parameters; and/or sub-band block (SBB) configuration. The configuration of carrier aggregation (CA) may comprise bandwidth class, active cell identification, downlink and uplink physical channel and signal parameters, and/or power control parameters. The listen before talk (LBT) configuration parameters may comprise maximum energy detection threshold, energy detection threshold offset and/or maximum LBT times threshold. The bandwidth part (BWP) configuration parameters may comprise BWP identification, downlink and uplink channel configuration and radio link monitoring configuration. The sub-band block (SBB) configuration parameters may comprise SBB identification, number of sub-bands in SBB and associated sub-band index. The wireless device may receive at least one DCI from a gNB to indicate an UL grant and a DL grant (or assignment), as shown in FIG. 18. The at least one DCI may indicate a same starting time for transmission on sub-bands of one or more cells. The at least one DCI may comprise one or more resource assignment on sub-bands of one or more cells, modulation and coding parameters, LBT parameters (e.g. LBT priority and/or LBT type), timing offset, and/or power control parameters.

In an example, as shown in FIG. 25B, wireless device may select one sub-band block (SBB) from a configured cell. The selection may be a random selection (e.g., with uniform distribution). The selection may be no more frequent than once during a limited time duration, for example, during one or more seconds. The wireless device may select one sub-band from the selected sub-band block (SBB). The selection may be a random selection (e.g. with uniform distribution). The selection may be no more frequent than once during a limited time duration, for example, during one or more seconds. The wireless device may perform a first type listen before talk (LBT) on the selected sub-band (e.g., from time n+k to time n+k+m). The first type listen before talk (LBT) may be listen before talk with back off, for example, listen before talk Category 4 (e.g., LBT with random back-off with a contention window of variable size) or Category 3 (e.g., LBT with random back-off with a contention window of fixed size).

In an example, as shown in FIG. 25B, when the first type listen before talk (LBT) succeeds on the selected sub-band and indicate the channel is idle (e.g., at time n+k+m), the wireless device may hold the channel for the selected sub-band and may perform a second type listen before talk (LBT) with an SBB bandwidth (e.g., from time n+k+m to n+k+m+h) on the other sub-band blocks (SBBs) of the configured cell. The second type listen before talk (LBT) may be listen before talk without back off, for example, listen before talk Category 2 (e.g., LBT without random back-off) or one shot listen before talk (LBT) (e.g., energy detection during a limited time duration, for example, 25 μs, 16 μs, or more or less time duration). In an example, the first type LBT duration may be longer than the one-shot LBT duration. When the second type listen before talk (LBT) succeeds on the other sub-band blocks (SBBs) of the configured cell (e.g., at time n+k+m+h), the wireless device may hold the channel for the sub-band blocks (SBBs) associated with successful LBT. When the second type listen before talk (LBT) with SBB bandwidth fails on the other sub-band blocks (SBBs) of the configured cell (e.g., at time n+k+m+h), the wireless device may perform the second type listen before talk (LBT) with sub-band bandwidth (e.g., from time n+k+m+h to n+k+m+2h) on the sub-band blocks (SBBs) associated with failure LBT. The wireless device may perform the second type LBT (e.g., from time n+k+m+h to n+k+m+2h) with sub-band bandwidth on the other sub-bands of the selected sub-band block (SBB). When listen before talk (LBT) with SBB bandwidth or sub-band bandwidth succeeds, the wireless device may perform data transmission via the one or more cells (e.g., from time n+k+m+2h) on the selected sub-band and the other sub-bands or SBBs, associated with successful LBT. When the second type listen before talk (LBT) fails on the other sub-bands of the configured cell, the wireless device may perform data transmission on the selected sub-band of the selected sub-band block (SBB) (e.g., from time n+k+m+2h).

In an example, as shown in FIG. 25B, when the first type listen before talk (LBT) fails on the selected sub-band and indicate the channel is busy (e.g., at time n+k+m), the wireless device may perform the first type listen before talk (LBT) on the selected sub-band. In an example, when the first type listen before talk (LBT) fails on the selected sub-band and indicate the channel is busy (e.g., at time n+k+m), the wireless device may perform the first type listen before talk (LBT) on another selected sub-band. After the first type listen before talk (LBT) succeeds on the selected sub-band and indicates the channel is idle, the wireless device may perform the second type listen before talk (LBT) with SBB bandwidth on the other sub-band blocks (SBBs) of the configured cell. When the first type listen before talk (LBT) on the selected sub-band fails continuously more than a configured maximum LBT times threshold and may indicate the channel is busy, the wireless device may stop LBT procedures and the channel access. A gNB may transmit one or more RRC messages to the wireless device. The one or more RRC messages may comprise a parameter indicating a maximum LBT times/counter threshold. In an example, n, k, m and h may be positive integers (with greater than zero) multiple Ts (e.g. basic time unit for New Radio).

An example embodiment is shown in FIG. 26A and FIG. 26B. In an example, a cell may comprise multiple sub-bands. The cell may comprise multiple sub-band blocks (SBBs). A sub-band block (SBB) may comprise multiple sub-bands as shown in FIG. 26A. A sub-band may comprise of one or more resource blocks (RB s) of a band, for example, a sub-band bandwidth may be 20 MHz. For example, a cell may comprise L sub-bands. L may be a positive integer greater than zero. A cell may comprise K sub-band blocks (SBBs). K may be a positive integer greater than zero. A sub-band block (SBB) may comprise N sub-bands. N may be a positive integer greater than zero. A sub-band block (SBB) may be a bandwidth part (BWP). When N=1, a sub-band may be a sub-band block. When a sub-band block (SBB) may be a bandwidth part (BWP), a cell may comprise K bandwidth parts (BWPs). K may be a positive integer greater than zero.

In an example, as shown in FIG. 26B, the wireless device may receive RRC message(s) from a gNB. The message(s) may comprise: configuration parameters of a plurality of cells (carrier aggregation configuration); listen before talk (LBT) configuration parameters; bandwidth part (BWP) configuration parameters; and/or sub-band block (SBB) configuration. The configuration of carrier aggregation (CA) may comprise bandwidth class, active cell identification, downlink and uplink physical channel and signal parameters, and/or power control parameters. The listen before talk (LBT) configuration parameters may comprise maximum energy detection threshold, energy detection threshold offset and/or maximum LBT times threshold. The bandwidth part (BWP) configuration parameters may comprise BWP identification, downlink and uplink channel configuration and radio link monitoring configuration. The sub-band block (SBB) configuration parameters may comprise SBB identification, number of sub-bands in SBB and associated sub-band index. The wireless device may receive at least one DCI from a gNB to indicate an UL grant and a DL grant (or assignment), as shown in FIG. 18. The at least one DCI may indicate a same starting time for transmission on sub-bands of one or more cells. The at least one DCI may comprise one or more resource assignment on sub-bands of one or more cells, modulation and coding parameters, LBT parameters (e.g. LBT priority and/or LBT type), timing offset, and/or power control parameters.

In an example, as shown in FIG. 26B, the wireless device may perform listen before talk (LBT), with sub-band block (SBB) bandwidth, on the configured sub-band blocks (SBBs) or the dynamically indicated sub-band blocks (SBBs) of the cell (e.g., from time n+k). In an example, the wireless device may perform the clear channel assessment (CCA) with sub-band block (SBB) bandwidth, on the configured sub-band blocks (SBBs) or the dynamically indicated sub-band blocks (SBBs) of the cell (e.g., from time n+k). The listen before talk (LBT) may be a first type listen before talk (LBT) or a second listen before talk (LBT). The first type listen before talk (LBT) may be listen before talk (LBT) with back off, for example, listen before talk Category 4 (e.g., LBT with random back-off with a contention window of variable size) or Category 3 (e.g., LBT with random back-off with a contention window of fixed size). The second type listen before talk (LBT) may be listen before talk (LBT) without back off, for example, listen before talk (LBT) Category 2 (e.g., LBT without random back-off) or one shot listen before talk (LBT) (e.g., energy detection during a limited time duration, for example, 25 μs, 16 μs, or more or less time duration). In an example, the first type LBT duration may be longer than the one-shot LBT duration.

In an example, as shown in FIG. 26B, when the listen before talk (LBT) with sub-band block bandwidth succeeds, the wireless device may perform listen before talk (LBT) with sub-band block bandwidth (e.g., from time n+k+m). In an example, when the listen before talk (LBT) with sub-band block (SBB) bandwidth succeeds, the wireless device may perform the clear channel assessment (CCA) with sub-band block (SBB) bandwidth, on the sub-band block (SBB) (e.g., from time n+k+m). When the listen before talk (LBT) with sub-band block bandwidth fails, the wireless device may perform multiple listen before talk (LBT) with sub-band bandwidth on the sub-band block (SBB) with unsuccessful LBT (e.g., from time n+k+m). In an example, when the listen before talk (LBT) with sub-band block bandwidth fails, the wireless device may perform multiple clear channel assessment (CCA) with sub-band bandwidth on the sub-band block (e.g., from time n+k+m). The listen before talk (LBT) may be the first type of listen before talk (LBT) or the second type of listen before talk (LBT). When the listen before talk (LBT) with sub-band block bandwidth or sub-band bandwidth succeeds (e.g., at time n+k+h), the wireless device may perform data transmission on the sub-band block or sub-band associated with successful listen before talk (LBT). In an example, the time n+k and n+k+m may be within the same slot or different slots. In an example, the time n+k and n+k+m may be within the same maximum channel occupancy time (MCOT). In an example, the time n+k and n+k+m may be within different maximum channel occupancy times (MCOTs). In an example, n, k, m and h may be positive integers (with greater than zero) multiple Ts (e.g. basic time unit for New Radio). In an example, h is no less than m.

According to various embodiments, a device such as, for example, a wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 27:
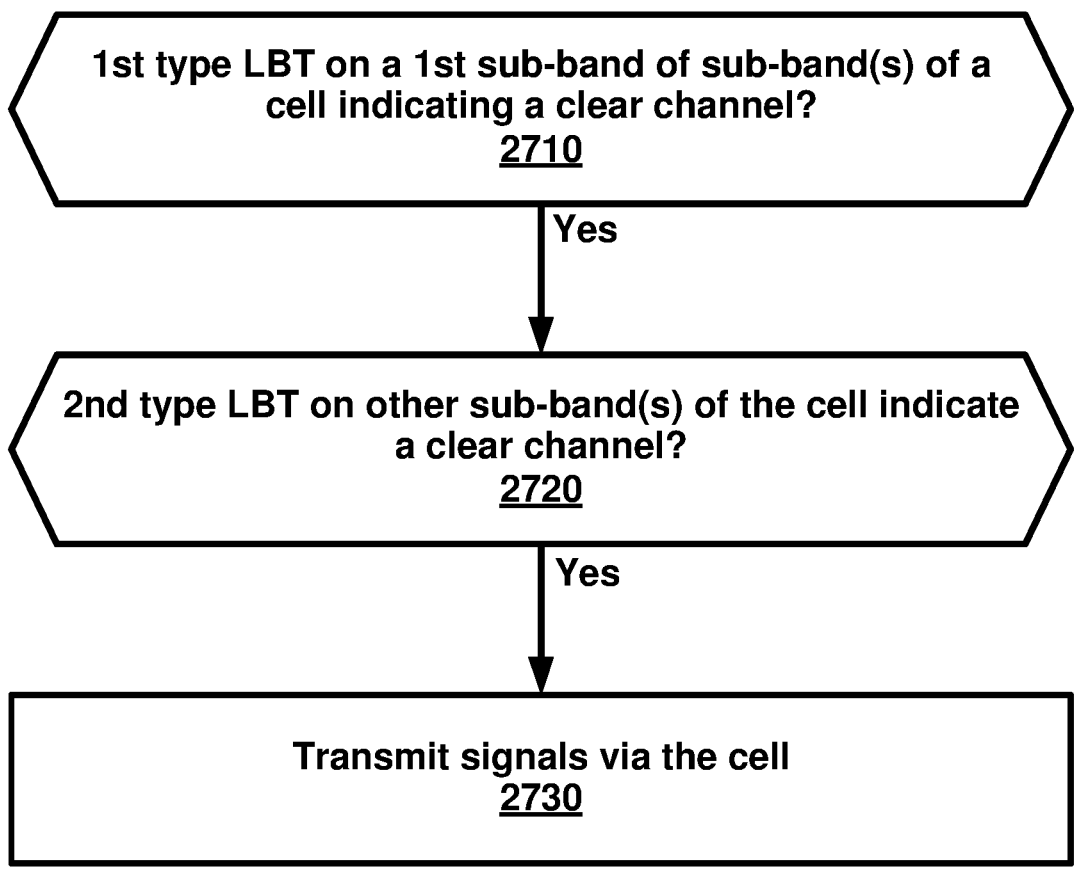
FIG. 27 is a flow diagram as per an aspect of an example embodiment of the present disclosure.

FIG. 27 is a flow diagram as per an aspect of an example embodiment of the present disclosure. Signals may be transmitted at 2730 via a cell based on: a first type listen-before-talk (LBT) on a first sub-band of sub-bands of the cell indicating a clear channel (at 2710), and a second type LBT on one or more other sub-bands of the cell indicating a clear channel (at 2720).

According to an embodiment, a wireless device may perform a first type listen-before-talk (LBT) on a first sub-band of sub-bands of a cell. The wireless device may perform a second type LBT on one or more other sub-bands of the cell. The wireless device may transmit signals via the cell based on the first type LBT and the second type LBT indicating a clear channel.

According to an embodiment, a base station may perform a first type listen-before-talk (LBT) on a first sub-band of sub-bands of a cell. The base station may perform a second type LBT on one or more other sub-bands of the cell. The base station may transmit downlink signals via the cell based on the first type LBT and the second type LBT indicating a clear channel.

According to an embodiment, a wireless device may receive an uplink grant for a cell. The cell may comprise sub-bands. The wireless device may perform a first type listen-before-talk (LBT) on a first sub-band of the sub-bands. The wireless device may perform a second type LBT on one or more other sub-bands of the cell. The wireless device may transmit uplink signals via the cell based on the first type LBT and the second type LBT indicating a clear channel.

According to an embodiment, a wireless device may receive an uplink grant for a cell. The cell may comprise sub-bands. A first type listen-before-talk (LBT) may be performed on a first sub-band of the sub-bands. A second type LBT may be performed on one or more other sub-bands of the cell. Uplink signals may be transmitted via the cell based on the first type LBT and the second type LBT indicating a clear channel.

According to an embodiment, a wireless device may receive a downlink control information. The downlink control information may indicate an uplink grant. The uplink grant may be for transmission of uplink signals via a cell. The cell may comprise sub-bands. A first type listen-before-talk (LBT) may be performed on a first sub-band of the sub-bands of the cell. A second type LBT may be performed on one or more other sub-bands. The one or more other sub-bands may be different from the first sub-band of the cell. The uplink signals may be transmitted via the cell based on the first type LBT and the second type LBT indicating a clear channel.

According to an embodiment, a wireless device may receive a downlink control information. The downlink control information may indicate an uplink grant for transmission of uplink signals via a cell. The cell may comprise sub-bands. The wireless device may select a first sub-band from the sub-bands of the cell. The wireless device may perform a first type listen-before-talk (LBT) on the first sub-band. The wireless device may perform a second type LBT on one or more other sub-bands of the cell. The one or more other sub-bands may be different from the first sub-band. The wireless device may transmit the uplink signals via the cell based on: the first type LBT indicating that the first sub-band of the cell is clear; and the second type LBT indicating that the one or more other sub-bands of the cell are clear.

According to an embodiment, the wireless device may select the cell from a plurality of cells. The plurality of cells may be configured for the wireless device. Each of the plurality of cells may comprise one or more respective sub-bands. The selecting the cell from the plurality of cells may comprise randomly selecting the cell from the plurality of cells. The randomly selecting the cell from the plurality of cells may comprise randomly selecting, with uniform distribution, the cell from the plurality of cells. The randomly selecting the cell from the plurality of cells may comprise selecting the cell, from the plurality of the cells, no more frequently than once during a time duration. The time duration may comprise one or more seconds. The wireless device may perform the second type LBT on sub-bands of other cells, different from the cell, of the plurality of cells. The wireless device may transmit uplink signals via at least one of the other cells of the plurality of cells based on: the first type LBT indicating that the first sub-band of the cell is clear; and the second type LBT indicating that at least one sub-band of the sub-bands is clear.

According to an embodiment, the wireless device may randomly select the first sub-band from the sub-bands of the cell. The randomly selecting the first sub-band from the sub-bands of the cell may comprise randomly selecting, with uniform distribution, the first sub-band from the sub-bands of the cell. The randomly selecting the first sub-band from the sub-bands of the cell may comprise selecting the first sub-band, from the sub-bands of the cell, no more frequently than once during a time duration. The time duration may comprise one or more seconds.

According to an embodiment, the performing the second type LBT on the one or more other sub-bands of the cell may comprise performing the second type LBT on each sub-band of the one or more other sub-bands of the cell. The first type LBT may be an LBT with random back-off parameters and/or a first LBT duration. The second type LBT may be a one-shot LBT based on a one-shot LBT duration without a random back-off. The first LBT duration may be longer than the one-shot LBT duration. Each of the sub-bands of the cell may comprise a plurality of consecutive physical resource blocks. The wireless device may receive an LBT parameter configuration message. The LBT parameter configuration message may comprise: a maximum energy detection threshold; or an energy detection threshold offset. The first type LBT and the second type LBT may use: a same maximum energy detection threshold; or a same energy detection threshold offset.

According to an embodiment, the performing the second type LBT on the one or more other sub-bands of the cell may comprise performing the second type LBT with a same time duration on the one or more other sub-bands of the cell. The transmitting the uplink signals via the cell may comprise transmitting transport blocks via a physical uplink shared channel of the cell. The transmitting the uplink signals via the cell may comprise transmitting the uplink signals via a bandwidth part of the cell. The downlink control information may indicate a bandwidth part of the cell. The bandwidth part of the cell may comprise one or more sub-bands of the cell. Each of the sub-bands of the cell may comprise a same bandwidth. Each of the sub-bands of the cell may comprise a same number of physical resource blocks.

According to an embodiment, the downlink control information may comprise a bandwidth part indicator field indicating a bandwidth part. The downlink control information may comprise a frequency resource assignment field indicating resource blocks of the first sub-band and the one or more other sub-bands of the cell. The downlink control information may comprise a timing information field indicating time domain resource of the first sub-band and the one or more other sub-bands of the cell. The transmitting the uplink signals may comprise transmitting one or more transport blocks via radio resources of the first sub-band. The transmitting the uplink signals may comprise transmitting one or more transport blocks via radio resources of one or more other sub-bands of the cell. The wireless device may receive a plurality of uplink grants for a plurality of cells. The plurality of uplink grants may comprise the uplink grant. The plurality of cells may comprise the cell.

According to an embodiment, the first type LBT may be performed in response to receiving the uplink grant. The second type LBT may be performed in response to receiving the uplink grant. and the second type LBT may be performed in response to receiving the uplink grant. The cell may comprise one or more bandwidth parts. A bandwidth part of the one or more bandwidth parts may comprise the sub-bands. The transmitting the uplink signals may comprise transmitting one or more transport blocks via radio resources of the first sub-band. The transmitting the uplink signals may comprise transmitting one or more transport blocks via radio resources of the one or more other sub-bands of a bandwidth part of the cell.

According to an embodiment, a wireless device may transmit signals via a bandwidth part (BWP) based on a first type listen-before-talk (LBT) on a first sub-band of sub-bands of the BWP indicating a clear channel. A wireless device may transmit signals via a bandwidth part (BWP) based on a second type LBT on one or more other sub-bands of the BWP indicating a clear channel.

According to an embodiment, a wireless device may perform a first type listen-before-talk (LBT) on a first sub-band of sub-bands of a bandwidth part (BWP) of a cell. The wireless device may perform a second type LBT on one or more other sub-bands of the BWP. The wireless device may transmit signals via the BWP based on the first type LBT and/or the second type LBT indicating a clear channel.

According to an embodiment, a base station may perform a first type listen-before-talk (LBT) on a first sub-band of sub-bands of a bandwidth part (BWP). The base station may perform a second type LBT on one or more other sub-bands of the BWP. The base station may transmit downlink signals via the BWP based on the first type LBT and/or the second type LBT indicating a clear channel.

According to an embodiment, a wireless device may receive an uplink grant for a bandwidth part (BWP) of a cell. The BWP may comprise sub-bands. The wireless device may perform a first type listen-before-talk (LBT) on a first sub-band of the BWP. The wireless device may perform a second type LBT on one or more other sub-bands of the BWP. The wireless device may transmit uplink signals via the BWP based on the first type LBT and/or the second type LBT indicating a clear channel.

According to an embodiment, a wireless device may receive a downlink control information. The downlink control information may indicate an uplink grant for transmission of uplink signals via a bandwidth part (BWP) of a cell. The BWP may comprise sub-bands. The wireless device may perform a first type listen-before-talk (LBT) on a first sub-band of the sub-bands of the BWP. The wireless device may perform a second type LBT on one or more other sub-bands, different from the first sub-band, of the BWP. The wireless device may transmit the uplink signals via the BWP based on the first type LBT and/or the second type LBT indicating a clear channel.

According to an embodiment, a wireless device may receive a downlink control information. The downlink control information may indicate an uplink grant for transmission of uplink signals via a bandwidth part (BWP) of a cell. The BWP may comprise a plurality of sub-bands. The wireless device may select a first sub-band from the plurality of sub-bands of the BWP. The wireless device may perform a first type listen-before-talk (LBT) on the first sub-band. The wireless device may perform a second type LBT on one or more other sub-bands of the BWP. The one or more other sub-bands may be different from the first sub-band. The wireless device may transmit the uplink signals via the BWP, based on: the first type LBT indicating that the first sub-band of the BWP is clear; and/or the second type LBT indicating that the one or more other sub-bands of the BWP are clear.

According to an embodiment, a wireless device or a base station may transmit signals via a second sub-band of sub-bands of a cell based on: a first type listen-before-talk (LBT) on a first sub-band of the sub-bands indicating a clear channel; and/or a second type LBT on the second sub-band indicating a clear channel.

According to an embodiment, a wireless device may perform a first type listen-before-talk (LBT) on a first sub-band of sub-bands of a cell. The wireless device may perform a second type LBT on one or more other sub-bands of the cell. The wireless device may transmit uplink signals via at least one sub-band of the one or more other sub-bands based on: the first type LBT indicating that the first sub-band is clear; and/or the second type LBT indicating that the at least one sub-band is clear.

According to an embodiment, a wireless device may receive an uplink grant for a cell. The cell may comprise sub-bands. The wireless device may perform a first type listen-before-talk (LBT) on a first sub-band of the sub-bands of the cell. The wireless device may perform a second type LBT on one or more other sub-bands, different from the first sub-band, of the cell. The wireless device may transmit uplink signals via at least one sub-band of the one or more other sub-bands based on: the first type LBT indicating that the first sub-band is clear; and/or the second type LBT indicating that the at least one sub-band is clear.

According to an embodiment, a wireless device may receive a downlink control information. The downlink control information may indicate an uplink grant for transmission of uplink signals via a cell. The cell may comprise sub-bands. The wireless device may select a first sub-band from the sub-bands of the cell. The wireless device may perform a first type listen-before-talk (LBT) on the first sub-band. The wireless device may perform a second type LBT on one or more other sub-bands of the cell. The one or more other sub-bands may be different from the first sub-band. The wireless device may transmit, based on the uplink grant and/or first type LBT indicating a clear channel, first uplink signals via the first sub-band of the cell. The wireless device may transmit, based on the uplink grant, second uplink signals via at least one second sub-band of the one or more other sub-bands based on: the first type LBT indicating that the first sub-band is clear; and/or the second type LBT indicating that the at least one second sub-band of the cell is clear.

According to an embodiment, the wireless device may not transmit, based on the uplink grant, third uplink signals via at least one third sub-band of the one or more other sub-bands based on: the first type LBT indicating that the first sub-band is busy; or the second type LBT indicating that the at least one third sub-band of the cell is busy. The wireless device may not transmit, based on the uplink grant, third uplink signals via at least one third sub-band of the one or more other sub-bands based on the second type LBT indicating that the at least one third sub-band of the cell is busy.

According to an embodiment, the wireless device may select the cell from a plurality of cells. The plurality of cells may be configured for the wireless device. Each of the plurality of cells may comprise one or more respective sub-bands. The selecting the cell from the plurality of cells may comprise randomly selecting the cell from the plurality of cells. The randomly selecting the cell from the plurality of cells may comprise randomly selecting, with uniform distribution, the cell from the plurality of cells. The randomly selecting the cell from the plurality of cells may comprise selecting the cell, from the plurality of the cells, no more frequently than once during a time duration. The time duration may comprise one or more seconds. The wireless device may perform the second type LBT on sub-bands of other cells, different from the cell, of the plurality of cells. The wireless device may transmit uplink signals via at least one of the other cells of the plurality of cells based on: the first type LBT indicating that the first sub-band of the cell is clear; and/or the second type LBT indicating that at least one sub-band of the sub-bands is clear.

According to an embodiment, the wireless device may randomly select the first sub-band from the sub-bands of the cell. The randomly selecting the first sub-band from the sub-bands of the cell may comprise randomly selecting, with uniform distribution, the first sub-band from the sub-bands of the cell. The randomly selecting the first sub-band from the sub-bands of the cell further may comprise selecting the first sub-band, from the sub-bands of the cell, no more frequently than once during a time duration. The time duration may comprise one or more seconds.

According to an embodiment, the performing the second type LBT on the one or more other sub-bands of the cell may comprise performing the second type LBT on each sub-band of the one or more other sub-bands of the cell. The first type LBT may be an LBT with random back-off parameters and/or a first LBT duration. The second type LBT may be a one-shot LBT based on a one-shot LBT duration without a random back-off. The first LBT duration may be longer than the one-shot LBT duration. Each of the sub-bands of the cell may comprise a plurality of consecutive physical resource blocks.

According to an embodiment, the wireless device may receive an LBT parameter configuration message. The LBT parameter configuration message may comprise: a maximum energy detection threshold; or an energy detection threshold offset. The first type LBT and/or the second type LBT may use: a same maximum energy detection threshold; or a same energy detection threshold offset. The performing the second type LBT on the one or more other sub-bands of the cell may comprise performing the second type LBT with a same time duration on the one or more other sub-bands of the cell. The transmitting the first uplink signals may comprise transmitting one or more transport blocks via a physical uplink shared channel of the cell. The transmitting the second uplink signals may comprise transmitting one or more transport blocks via a physical uplink shared channel of the cell.

According to an embodiment, the transmitting the first uplink signals may comprise transmitting the first uplink signals via a bandwidth part of the cell. The transmitting the second uplink signals may comprise transmitting the second uplink signals via a bandwidth part of the cell. The downlink control information may indicate a bandwidth part of the cell. The bandwidth part of the cell may comprise one or more sub-bands of the cell. Each of the sub-bands of the cell may comprise a same bandwidth. Each of the sub-bands of the cell may comprise a same number of physical resource blocks.

According to an embodiment, the downlink control information may comprise a bandwidth part indicator field indicating a bandwidth part. The downlink control information may comprise a frequency resource assignment field indicating resource blocks of the first sub-band and the one or more other sub-bands of the cell. The downlink control information may comprise a timing information field indicating time domain resource of the first sub-band and/or the one or more other sub-bands of the cell. The transmitting the first uplink signals and/or the second uplink signals may comprise transmitting one or more transport blocks via radio resources of the first sub-band and/or the at least one second sub-band of the one or more other sub-bands of the cell. The wireless device may receive a plurality of uplink grants for a plurality of cells. The plurality of uplink grants may comprise the uplink grant. The plurality of cells may comprise the cell. The first type LBT and the second type LBT may be performed in response to receiving the uplink grant.

According to an embodiment, the cell may comprise one or more bandwidth parts. A bandwidth part, of the one or more bandwidth parts, may comprise the sub-bands. The transmission of the first uplink signals and the second uplink signals may comprise transmitting one or more transport blocks via radio resources of the first sub-band and/or the at least one second sub-band of the one or more other sub-bands of a bandwidth part of the cell.

According to an embodiment, a wireless device or a base station may transmit signals via a second sub-band of sub-bands of a bandwidth part based on: a first type listen-before-talk (LBT) on a first sub-band of the sub-bands indicating a clear channel; and/or a second type LBT on the second sub-band indicating a clear channel.

According to an embodiment, a wireless device may perform a first type listen-before-talk (LBT) on a first sub-band of sub-bands of a bandwidth part (BWP) of a cell. The wireless device may perform a second type LBT on one or more other sub-bands of the BWP. The wireless device may transmit uplink signals via at least one sub-band of the one or more other sub-bands based on: the first type LBT indicating that the first sub-band is clear; and/or the second type LBT indicating that the at least one sub-band is clear.

According to an embodiment, a wireless device may receive an uplink grant for a bandwidth part (BWP) of a cell. The cell may comprise sub-bands. The wireless device may perform a first type listen-before-talk (LBT) on a first sub-band of the sub-bands of the BWP.

The wireless device may perform a second type LBT on one or more other sub-bands, different from the first sub-band, of the BWP. The wireless device may transmit uplink signals via at least one sub-band of the one or more other sub-bands based on: the first type LBT indicating that the first sub-band is clear; and/or the second type LBT indicating that the at least one sub-band is clear.

According to an embodiment, a wireless device may receive a downlink control information. The downlink control information may indicate an uplink grant for transmission of uplink signals via a bandwidth part (BWP) of a cell. The BWP may comprise sub-bands. The wireless device may select a first sub-band from the sub-bands of the BWP. The wireless device may perform a first type listen-before-talk (LBT) on the first sub-band. The wireless device may perform a second type LBT on one or more other sub-bands of the BWP. The one or more other sub-bands may be different from the first sub-band. The wireless device may transmit, based on the uplink grant and first type LBT indicating a clear channel, first uplink signals via the first sub-band of the BWP. The wireless device may transmit, based on the uplink grant, second uplink signals via at least one second sub-band of the one or more other sub-bands based on: the first type LBT indicating that the first sub-band is clear; and/or the second type LBT indicating that the at least one second sub-band of the BWP is clear.

According to an embodiment, the wireless device may not transmit, based on the uplink grant, third uplink signals via at least one third sub-band of the one or more other sub-bands based on: the first type LBT indicating that the first sub-band is busy; or the second type LBT indicating that the at least one third sub-band of the BWP is busy. The wireless device may not transmit, based on the uplink grant, third uplink signals via at least one third sub-band of the one or more other sub-bands based on the second type LBT indicating that the at least one third sub-band of the BWP is busy.

According to an embodiment, the wireless device may select the cell from a plurality of cells configured for the wireless device. Each of the plurality of cells may comprise one or more respective sub-bands. The selecting the cell from the plurality of cells may comprise randomly selecting the cell from the plurality of cells. The randomly selecting the cell from the plurality of cells may comprise randomly selecting, with uniform distribution, the cell from the plurality of cells. The randomly selecting the cell from the plurality of cells may further comprise selecting the cell, from the plurality of the cells, no more frequently than once during a time duration. The time duration may comprise one or more seconds. The wireless device may perform the second type LBT on sub-bands of BWPs of other cells, different from the cell, of the plurality of cells. The wireless device may transmit uplink signals via at least one BWP of the other cells of the plurality of cells based on: the first type LBT indicating that the first sub-band of the BWP is clear; and the second type LBT indicating that at least one sub-band of the sub-bands is clear.

According to an embodiment, the selecting the first sub-band from the sub-bands of the BWP may comprise randomly selecting the first sub-band from the sub-bands of the BWP. The randomly selecting the first sub-band from the sub-bands of the BWP may comprise randomly selecting, with uniform distribution, the first sub-band from the sub-bands of the BWP. The randomly selecting the first sub-band from the sub-bands of the BWP may further comprise selecting the first sub-band, from the sub-bands of the BWP, no more frequently than once during a time duration. The time duration may comprise one or more seconds.

According to an embodiment, the performing the second type LBT on the one or more other sub-bands of the BWP may comprise performing the second type LBT on each sub-band of the one or more other sub-bands of the BWP. According to an embodiment, the first type LBT may be an LBT with random back-off parameters and a first LBT duration. According to an embodiment, the second type LBT may be a one-shot LBT based on a one-shot LBT duration without a random back-off. According to an embodiment, the first LBT duration may be longer than the one-shot LBT duration. According to an embodiment, each of the sub-bands of the BWP may comprise a plurality of consecutive physical resource blocks.

According to an embodiment, the wireless device may receive an LBT parameter configuration message. The LBT parameter configuration message may comprise: a maximum energy detection threshold; or/and an energy detection threshold offset. The first type LBT and the second type LBT may use: a same maximum energy detection threshold; or a same energy detection threshold offset. The performing the second type LBT on the one or more other sub-bands of the BWP may comprise performing the second type LBT with a same time duration on the one or more other sub-bands of the BWP. The transmitting the first uplink signals may comprise transmitting one or more transport blocks via a physical uplink shared channel of the BWP. The transmitting the second uplink signals may comprise transmitting one or more transport blocks via a physical uplink shared channel of the BWP.

According to an embodiment, the downlink control information may indicate a bandwidth part of the cell. The bandwidth part of the cell may comprise one or more sub-bands. Each of the sub-bands of the BWP may comprise a same bandwidth. Each of the sub-bands of the BWP may comprise a same number of physical resource blocks. The downlink control information may comprise: a bandwidth part indicator field indicating a BWP; and/or a frequency resource assignment field indicating resource blocks of the first sub-band and the one or more other sub-bands of the BWP; and/or a timing information field indicating time domain resource of the first sub-band and the one or more other sub-bands of the BWP.

According to an embodiment, the transmitting the first uplink signals and/or the second uplink signals may comprise transmitting one or more transport blocks via radio resources of the first sub-band and the at least one second sub-band of the one or more other sub-bands of the BWP. The wireless device may receive a plurality of uplink grants for a plurality of cells. The plurality of uplink grants may comprise the uplink grant. The plurality of cells may comprise the cell. The first type LBT and the second type LBT may be performed in response to receiving the uplink grant. The cell may comprise one or more bandwidth parts. A bandwidth part, of the one or more bandwidth parts, may comprise the sub-bands. The transmitting the first uplink signals and the second uplink signals may comprise transmitting one or more transport blocks via radio resources of the first sub-band and the at least one second sub-band of the one or more other sub-bands of the BWP of the cell.

According to an embodiment, a wireless device may perform a first type listen-before-talk (LBT) on a first sub-band of one or more sub-bands of a cell. The wireless device may perform a second type LBT on one or more other sub-bands of cells. The wireless device may transmit uplink signals via the cells, based on at least one of: the first type LBT indicating that the first sub-band of the cell is clear; and/or the second type LBT indicating that the one or more other sub-bands of the cells are clear.

According to an embodiment, a wireless device or a base station may transmit signals via a second sub-band of a second cell of cells, based on: a first type listen-before-talk (LBT) on a first sub-band of a first cell indicating a clear channel; and/or a second type LBT on the second sub-band of the second cell indicating a clear channel.

According to an embodiment, a wireless device may perform a first type listen-before-talk (LBT) on a first sub-band of one or more sub-bands of a cell. The wireless device may perform a second type LBT on one or more other sub-bands of cells. The wireless device may transmit uplink signals via at least one second sub-band of the cells, based on: the first type LBT indicating that the first sub-band of the cell is clear; and/or the second type LBT indicating that the at least one second sub-band of the cells is clear.

According to an embodiment, a wireless device may perform a first type listen-before-talk (LBT) on a first sub-band of one or more sub-bands of a cell. The wireless device may perform a second type LBT on one or more other sub-bands of cells. The wireless device may transmit uplink signals via the cells, based on: the first type LBT indicating that the first sub-band of the cell is clear; and/or the second type LBT indicating that the one or more other sub-bands of the cells are clear.

According to an embodiment, a wireless device may receive at least one downlink control information (DCI). The at least one DCI may indicate at least one uplink grant for transmission of uplink signals via cells. Each of the cells may comprise one or more sub-bands. The wireless device may select a cell from the cells in response to the receiving the at least one DCI. The wireless device may perform a first type listen-before-talk (LBT) on a first sub-band of the one or more sub-bands of the cell. The wireless device may perform a second type LBT on one or more other sub-bands, different from the first sub-band, of the cells. The wireless device may transmit one or more of the uplink signals via the cells based on: the first type LBT indicating that the first sub-band of the cell is clear; and/or the second type LBT indicating that the one or more other sub-bands of the cells are clear.

According to an embodiment, the selecting the cell from the cells may comprise randomly selecting the cell from the cells. The randomly selecting the cell from the cells may comprise randomly selecting, with uniform distribution, the cell from the cells. The randomly selecting the cell from the cells may further comprise selecting the cell, from the cells, no more frequently than once during a time duration. The time duration may comprise one or more seconds.

According to an embodiment, the wireless device may select the first sub-band from the one or more sub-bands of the cell. The selecting the first sub-band from the one or more sub-bands of the cell may comprise randomly selecting the first sub-band from the one or more sub-bands of the cell. The randomly selecting the first sub-band from the one or more sub-bands of the cell may comprise randomly selecting, with uniform distribution, the first sub-band from the one or more sub-bands of the cell. The randomly selecting the first sub-band from the one or more sub-bands of the cell may further comprise selecting the first sub-band, from the one or more sub-bands of the cell, no more frequently than once during a time duration. The time duration may comprise one or more seconds.

According to an embodiment, the performing the second type LBT on the one or more other sub-bands of the cells may comprise performing the second type LBT on each sub-band of the one or more other sub-bands of the cells. The first type LBT may be an LBT with random back-off parameters and a first LBT duration. The second type LBT may be a one-shot LBT based on a one-shot LBT duration without a random back-off. The first LBT duration may be longer than the one-shot LBT duration.

According to an embodiment, each of the one or more sub-bands of a cell of the cells may comprise a plurality of consecutive physical resource blocks. The wireless device may receive one or more LBT parameter configuration messages. The one or more LBT parameter configuration messages may comprise: one or more maximum energy detection thresholds; or one or more energy detection threshold offsets. The first type LBT and the second type LBT may use: a same maximum energy detection threshold; or a same energy detection threshold offset for a cell of the cells. The performing the second type LBT on the one or more other sub-bands of the cells may comprise performing the second type LBT with a same time duration on the one or more other sub-bands of the cells. The transmitting the one or more of the uplink signals via the cells may comprise transmitting transport blocks via one or more physical uplink shared channels of the cells.

According to an embodiment, the transmitting the one or more of the uplink signals via the cells may comprise transmitting the one or more of the uplink signals via one or more bandwidth parts of the cells. The at least one DCI may indicate one or more bandwidth parts of the cells. Each of the one or more bandwidth parts of the cells may comprise one or more sub-bands of the cell. Each of the one or more sub-bands of a cell of the cells may comprise a same bandwidth. Each of the one or more sub-bands of a cell of the cells may comprise a same number of physical resource blocks.

According to an embodiment, the at least one DCI may comprise: a bandwidth part indicator field indicating a bandwidth part; and a frequency resource assignment field indicating resource blocks of the first sub-band and the one or more other sub-bands of the cells; and/or a timing information field indicating time domain resource of the first sub-band and the one or more other sub-bands of the cells. The transmitting the uplink signals may comprise transmitting one or more transport blocks via radio resources of the first sub-band and the one or more other sub-bands of the cells. The first type LBT and the second type LBT may be performed in response to receiving the at least one uplink grant. The cell may comprise one or more bandwidth parts. A bandwidth part, of the one or more bandwidth parts, may comprise the one or more sub-bands. The transmitting the uplink signals may comprise transmitting one or more transport blocks via radio resources of the first sub-band and the one or more other sub-bands of bandwidth parts of the cells.

According to an embodiment, a wireless device or a base station may transmit signals via a second sub-band of a second bandwidth part (BWP) of a second cell of cells, based on: a first type listen-before-talk (LBT) on a first sub-band of a first BWP of a first cell of the cells indicating a clear channel; and/or a second type LBT on a second sub-band of the second BWP indicating a clear channel.

According to an embodiment, a wireless device may perform a first type listen-before-talk (LBT) on a first sub-band of one or more sub-bands of a bandwidth part (BWP) of one of cells. The wireless device may perform a second type LBT on one or more other sub-bands of BWPs of the cells. The wireless device may transmit uplink signals via at least one second sub-band of the BWPs, based on: the first type LBT indicating that the first sub-band of the BWP is clear; and/or the second type LBT indicating that the at least one second sub-band of the BWPs is clear.

According to an embodiment, a wireless device may perform a first type listen-before-talk (LBT) on a first sub-band of one or more sub-bands of a first bandwidth part (BWP) of one of cells. The wireless device may perform a second type LBT on one or more other sub-bands of BWPs of the cells. The wireless device may transmit uplink signals via the BWPs, based on: the first type LBT indicating that the first sub-band of the first BWP is clear; and/or the second type LBT indicating that the one or more other sub-bands of the BWPs are clear.

According to an embodiment, a wireless device may receive at least one downlink control information (DCI). The at least one DCI may indicate at least one uplink grant for transmission of uplink signals via bandwidth parts (BWPs) of cells. Each of the BWPs may comprise one or more sub-bands. The wireless device may select a cell from the cells in response to the receiving the at least one DCI. The wireless device may perform a first type listen-before-talk (LBT) on a first sub-band of the one or more sub-bands of a first BWP of the cell. The wireless device may perform a second type LBT on one or more other sub-bands, different from the first sub-band, of one or more BWPs of the cells. The wireless device may transmit one or more of the uplink signals via the BWPs, based on: the first type LBT indicating that the first sub-band of the first BWP is clear; and/or the second type LBT indicating that the one or more other sub-bands of the one or more BWPs are clear.

According to an embodiment, a wireless device may comprise: one or more processors; memory storing instructions. The wireless device may receive an uplink grant for a cell comprising sub-bands. The wireless device may perform a first type listen-before-talk (LBT) on a first sub-band of the sub-bands. The wireless device may perform a second type LBT on one or more other sub-bands of the cell. The wireless device may transmit uplink signals via the cell based on at least one of: the first type LBT indicating a clear channel; and/or the second type LBT indicating a clear channel.

According to an embodiment, a wireless device may comprise: one or more processors; memory storing instructions. The wireless device may perform a first type listen-before-talk (LBT) on a first sub-band of one or more sub-bands of a cell. The wireless device may perform a second type LBT on one or more other sub-bands of cells. The wireless device may transmit uplink signals via the cells, based on at least one of: the first type LBT indicating that the first sub-band of the cell is clear; and/or the second type LBT indicating that the one or more other sub-bands of the cells are clear.

According to an embodiment, a base station may select a first sub-band from sub-bands of a cell. The base station may perform a first type listen-before-talk (LBT) on the first sub-band. The base station may perform a second type LBT on one or more other sub-bands of the cell. The one or more other sub-bands may be different from the first sub-band. The base station may transmit downlink signals via the cell, based on: the first type LBT indicating that the first sub-band of the cell is clear; and/or the second type LBT indicating that the one or more other sub-bands of the cell are clear.

According to an embodiment, the base station may select the cell from a plurality of cells. Each of the plurality of cells may comprise one or more respective sub-bands. The selecting the cell from the plurality of cells may comprise randomly selecting the cell from the plurality of cells. The randomly selecting the cell from the plurality of cells may comprise randomly selecting, with uniform distribution, the cell from the plurality of cells. The randomly selecting the cell from the plurality of cells may further comprise selecting the cell, from the plurality of the cells, no more frequently than once during a time duration. The time duration may comprise one or more seconds. The base station may perform the second type LBT on sub-bands of other cells, different from the cell, of the plurality of cells. The base station may transmit downlink signals via the other cells of the plurality of cells based on: the first type LBT indicating that the first sub-band of the cell is clear; and/or the second type LBT indicating that at least one sub-band of the other cells is clear.

According to an embodiment, the selecting the first sub-band from the sub-bands of the cell may comprise randomly selecting the first sub-band from the sub-bands of the cell. The randomly selecting the first sub-band from the sub-bands of the cell may comprise randomly selecting, with uniform distribution, the first sub-band from the sub-bands of the cell. The randomly selecting the first sub-band from the sub-bands of the cell may further comprise selecting the first sub-band, from the sub-bands of the cell, no more frequently than once during a time duration. The time duration may comprise one or more seconds.

According to an embodiment, the performing the second type LBT on the one or more other sub-bands of the cell may comprise performing the second type LBT on each sub-band of the one or more other sub-bands of the cell. The first type LBT may be an LBT with random back-off parameters and/or a first LBT duration. The second type LBT may be a one-shot LBT based on a one-shot LBT duration without a random back-off. The first LBT duration may be longer than the one-shot LBT duration. Each of the sub-bands of the cell may comprise a plurality of consecutive physical resource blocks. The base station may transmit an LBT parameter configuration message. The LBT parameter configuration message may comprise: a maximum energy detection threshold; or an energy detection threshold offset. The first type LBT and the second type LBT may use: a same maximum energy detection threshold; or a same energy detection threshold offset.

According to an embodiment, the performing the second type LBT on the one or more other sub-bands of the cell may comprise performing the second type LBT with a same time duration on the one or more other sub-bands of the cell. The transmitting the downlink signals via the cell may comprise transmitting transport blocks via a physical downlink shared channel of the cell. The transmitting the downlink signals via the cell may comprise transmitting the downlink signals via a bandwidth part of the cell. Each of the sub-bands of the cell may comprise a same bandwidth. Each of the sub-bands of the cell may comprise a same number of physical resource blocks.

According to an embodiment, the transmitting downlink signals may comprise transmitting one or more transport blocks via radio resources of the first sub-band and the one or more other sub-bands of the cell. The cell may comprise one or more bandwidth parts. A bandwidth part, of the one or more bandwidth parts, may comprise the sub-bands. The transmitting downlink signals may comprise transmitting one or more transport blocks via radio resources of the first sub-band and the one or more other sub-bands of a bandwidth part of the cell.

According to an embodiment, a base station may select a cell from cells. Each of the cells may comprise one or more sub-bands. The base station may perform a first type listen-before-talk (LBT) on a first sub-band of the one or more sub-bands of the cell. The base station may perform a second type LBT on one or more other sub-bands, different from the first sub-band, of the cells. The base station may transmit one or more of downlink signals via the cells, based on: the first type LBT indicating that the first sub-band of the cell is clear; and/or the second type LBT indicating that the one or more other sub-bands of the cells are clear.

According to an embodiment, the selecting the cell from the cells may comprise randomly selecting the cell from the cells. The randomly selecting the cell from the cells may comprise randomly selecting, with uniform distribution, the cell from the cells. The randomly selecting the cell from the cells may further comprise selecting the cell, from the cells, no more frequently than once during a time duration. The time duration may comprise one or more seconds.

According to an embodiment, the base station may select the first sub-band from the one or more sub-bands of the cell. The selecting the first sub-band from the one or more sub-bands of the cell may comprise randomly selecting the first sub-band from the one or more sub-bands of the cell. The randomly selecting the first sub-band from the one or more sub-bands of the cell may comprise randomly selecting, with uniform distribution, the first sub-band from the one or more sub-bands of the cell. The randomly selecting the first sub-band from the one or more sub-bands of the cell may further comprise selecting the first sub-band, from the one or more sub-bands of the cell, no more frequently than once during a time duration. The time duration may comprise one or more seconds.

According to an embodiment, the performing the second type LBT on the one or more other sub-bands of the cells may comprise performing the second type LBT on each sub-band of the one or more other sub-bands of the cells. The first type LBT may be an LBT with random back-off parameters and a first LBT duration. The second type LBT may be a one-shot LBT based on a one-shot LBT duration without a random back-off. The first LBT duration may be longer than the one-shot LBT duration. Each of the one or more sub-bands of a cell of the cells may comprise a plurality of consecutive physical resource blocks. The base station may transmit one or more LBT parameter configuration messages. The one or more LBT parameter configuration messages may comprise: one or more maximum energy detection thresholds; or one or more energy detection threshold offsets. The first type LBT and the second type LBT may use: a same maximum energy detection threshold; or a same energy detection threshold offset for a cell of the cells.

According to an embodiment, the performing the second type LBT on the one or more other sub-bands of the cells may comprise performing the second type LBT with a same time duration on the one or more other sub-bands of the cells. The transmitting the one or more of downlink signals via the cells may comprise transmitting transport blocks via one or more physical downlink shared channels of the cells. The transmitting the one or more of downlink signals via the cells may comprise transmitting the one or more of downlink signals via one or more bandwidth parts of the cells. Each of the one or more sub-bands of a cell of the cells may comprise a same bandwidth. Each of the one or more sub-bands of a cell of the cells may comprise a same number of physical resource blocks.

According to an embodiment, the transmitting one or more of downlink signals may comprise transmitting one or more transport blocks via radio resources of the first sub-band and the one or more other sub-bands of the cells. Each of the cells may comprise one or more bandwidth parts. A bandwidth part, of the one or more bandwidth parts, may comprise the one or more sub-bands. The transmitting one or more of downlink signals may comprise transmitting one or more transport blocks via radio resources of the first sub-band and the one or more other sub-bands of bandwidth parts of the cells.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device, a grant scheduling a transmission on sub-bands of a physical uplink shared channel of a cell, wherein the sub-bands comprise a first sub-band and one or more other sub-bands;
   performing, by the wireless device and in response to the grant:
   a first type listen-before-talk (LBT) on the first sub-band; and
   performing, after performing of the first type LBT and immediately before transmission on the first sub-band, a second type LBT on each of the one or more other sub-bands, wherein the first type LBT is LBT with back-off, and the second type LBT is LBT without back-off; and
   transmitting data on a sub-band of the sub-bands, based on a determination that:
   the first type LBT indicates that the first sub-band is clear; and
   the second type LBT indicates that each of the one or more other sub-bands are clear.

2. The method of claim 1, wherein:
   a bandwidth part of the cell comprises the first sub-band and the one or more other sub-bands of the cell; and
   the transmitting of the data comprises transmitting the data via the bandwidth part of the cell.

3. The method of claim 1, wherein a first duration of the first type LBT is different from a second duration of the second type LBT.

4. The method of claim 3, wherein the first duration of the first type LBT is variable and the second duration of the second type LBT is fixed.

5. The method of claim 1, wherein:
   a first duration of the first type LBT is different from a second duration of the second type LBT; and
   the first duration of the first type LBT is variable and the second duration of the second type LBT is fixed.

6. The method of claim 1, wherein:
   the first type LBT is an LBT with random back-off parameters and a first LBT duration; and
   the second type LBT is a one-shot LBT based on a one-shot LBT duration without a random back-off.

7. The method of claim 1, wherein the second type LBT is performed based on the determination that the first type LBT indicates that the first sub-band is clear.

8. The method of claim 1, further comprising:
determining that the second type LBT on one or more second sub-bands of a second cell, performed immediately before the transmission on the first sub-band, indicates that each of one or more second other sub-bands are clear; and
transmitting one or more second transport blocks via a second PUSCH of the second cell based on:
the determining that the first type LBT indicates that the first sub-band is clear; and
the determining that the second type LBT indicates that each of the one or more second sub-bands are clear.

9. The method of claim 1, further comprising receiving an LBT parameter configuration message comprising at least one of:
a maximum energy detection threshold for at least one of the first type LBT or the second type LBT; or
an energy detection threshold offset for at least one of the first type LBT or the second type LBT.

10. A method comprising:
transmitting, by a base station, a grant scheduling a transmission on sub-bands of a physical downlink shared channel of a cell, wherein the sub-bands comprise a first sub-band and one or more other sub-bands;
performing, by the base station:
a first type listen-before-talk (LBT) on the first sub-band; and
a second type LBT on each of the one or more other sub-bands, wherein the first type LBT is LBT with back-off, and the second type LBT is LBT without back-off; and
transmitting data on a sub-band of the sub-bands, based on a determination that:
the first type LBT indicates that the first sub-band is clear; and
the second type LBT indicates that each of the one or more other sub-bands are clear.

11. The method of claim 10, wherein:
a bandwidth part of the cell comprises the first sub-band and the one or more other sub-bands of the cell; and
the transmitting the data comprises transmitting the data via the bandwidth part of the cell.

12. The method of claim 10, wherein a first duration of the first type LBT is different from a second duration of the second type LBT.

13. The method of claim 12, wherein the first duration of the first type LBT is variable and the second duration of the second type LBT is fixed.

14. The method of claim 10, wherein:
the first type LBT is an LBT with random back-off parameters and a first LBT duration; and
the second type LBT is a one-shot LBT based on a one-shot LBT duration without a random back-off.

15. The method of claim 10, wherein the second type LBT is performed based on the determination that the first type LBT indicates that the first sub-band is clear.

16. The method of claim 10, further comprising determining that the second type LBT on one or more second sub-bands of a second cell, performed immediately before the transmission on the first sub-band, indicates that each of the one or more second sub-bands are clear.

17. The method of claim 16, further comprising transmitting one or more second transport blocks via a second PDSCH of the second cell based on:
the determining that the first type LBT indicates that the first sub-band is clear; and
the determining that the second type LBT indicates that each of the one or more second sub-bands are clear.

18. The method of claim 10, wherein the performing the second type LBT on each of the one or more other sub-bands occurs after the first type LBT begins and before transmission on the first sub-band.

19. An apparatus for a wireless device, comprising:
a transceiver configured to receive, from a base station, a grant scheduling a transmission on sub-bands of a physical uplink shared channel of a cell, wherein the sub-bands comprise a first sub-band and one or more other sub-bands;
at least one processor coupled to the transceiver, the at least on processor being configured to:
perform, in response to the grant:
a first type listen-before-talk (LBT) on the first sub-band; and
perform, after performing of the first type LBT and immediately before transmission on the first sub-band, a second type LBT on each of the one or more other sub-bands, wherein the first type LBT is LBT with back-off, and the second type LBT is LBT without back-off; and
transmit data on a sub-band of the sub-bands, based on a determination that:
the first type LBT indicates that the first sub-band is clear; and
the second type LBT indicates that each of the one or more other sub-bands are clear.

* * * * *